(12) United States Patent
Mercado

(10) Patent No.: US 9,557,627 B2
(45) Date of Patent: Jan. 31, 2017

(54) FOLDED CAMERA LENS SYSTEMS

(71) Applicant: Apple Inc., Cupertino, CA (US)

(72) Inventor: Romeo I. Mercado, Fremont, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/291,571

(22) Filed: May 30, 2014

(65) Prior Publication Data

US 2015/0253647 A1 Sep. 10, 2015

Related U.S. Application Data

(60) Provisional application No. 61/949,898, filed on Mar. 7, 2014.

(51) Int. Cl.
*G03B 13/32* (2006.01)
*G02B 13/00* (2006.01)
*H04N 5/225* (2006.01)
*G02B 9/60* (2006.01)

(52) U.S. Cl.
CPC ............. *G03B 13/32* (2013.01); *G02B 13/002* (2013.01); *G02B 13/0045* (2013.01); *G02B 13/0065* (2013.01); *H04N 5/2254* (2013.01); *G02B 9/60* (2013.01)

(58) Field of Classification Search
CPC ................................................. G02B 13/0045
See application file for complete search history.

(56) References Cited

U.S. PATENT DOCUMENTS 6,067,421 A * 5/2000 Kitazawa ............... G02B 7/04
396/133
6,445,513 B2 9/2002 Sato
6,829,011 B1 * 12/2004 Higuchi ............... G02B 7/102
348/340
7,042,656 B2 5/2006 Chen et al.
(Continued)

FOREIGN PATENT DOCUMENTS

CN 101071196 11/2007
JP H09211287 8/1997
WO 2007145194 12/2007

OTHER PUBLICATIONS

U.S. Appl. No. 14/291,544, filed May 30, 2014, Romeo I. Mercado.
(Continued)

*Primary Examiner* — Clayton E Laballe
*Assistant Examiner* — Noam Reisner
(74) *Attorney, Agent, or Firm* — Robert C. Kowert; Meyertons, Hood, Kivlin, Kowert & Goetzel, P.C.

(57) ABSTRACT

A folded lens system may include multiple lenses with refractive power and a light path folding element. Light entering the camera through lens(es) on a first optical path or axis is refracted to the folding element, which changes direction of the light onto a second optical path or axis with lens(es) that refract the light to form an image plane at a photosensor. At least one of the object side and image side surfaces of at least one of the lens elements may be aspheric. Total track length (TTL) of the lens system may be 16.0 mm or less. The lens system may be configured so that the telephoto ration |TTL/fl is greater than 1.0. Materials, radii of curvature, shapes, sizes, spacing, and aspheric coefficients of the optical elements may be selected to achieve quality optical performance and high image resolution in a small form factor camera.

22 Claims, 41 Drawing Sheets

(56) References Cited

U.S. PATENT DOCUMENTS

| | | |
|---|---|---|
| 7,295,386 B2 | 11/2007 | Taniyama |
| 7,345,830 B2 | 3/2008 | Shinohara |
| 7,453,654 B2 | 11/2008 | Shinohara |
| 7,502,181 B2 | 3/2009 | Shinohara |
| 7,626,767 B2 | 12/2009 | Kudo |
| 7,663,814 B2 | 2/2010 | Kitahara |
| 8,184,378 B2 * | 5/2012 | Chia |
| 8,432,619 B2 * | 4/2013 | Huang ............... G02B 13/0045 359/713 |
| 2003/0160902 A1 | 8/2003 | Mihara et al. |
| 2006/0139770 A1 * | 6/2006 | Wang .................... G02B 13/16 359/754 |
| 2008/0273250 A1 | 11/2008 | Nishio |
| 2013/0021677 A1 * | 1/2013 | Kubota ................ G02B 15/177 359/686 |
| 2014/0211328 A1 * | 7/2014 | Hashimoto ........ G02B 13/0045 359/714 |
| 2014/0355134 A1 * | 12/2014 | Sekine ............... G02B 13/0045 359/713 |

OTHER PUBLICATIONS

U.S. Appl. No. 14/069,027, filed Oct. 31, 2013, Romeo I. Mercado.
Office Action from Taiwan Application No. 104106393, Dated Dec. 23, 2015, (English Translation and Taiwan Version), Apple Inc., pp. 1-11.
International Preliminary Report on Patentability from PCT/US2015/015772, Dated Sep. 13, 2016, Apple Inc., pp. 1-8.

* cited by examiner

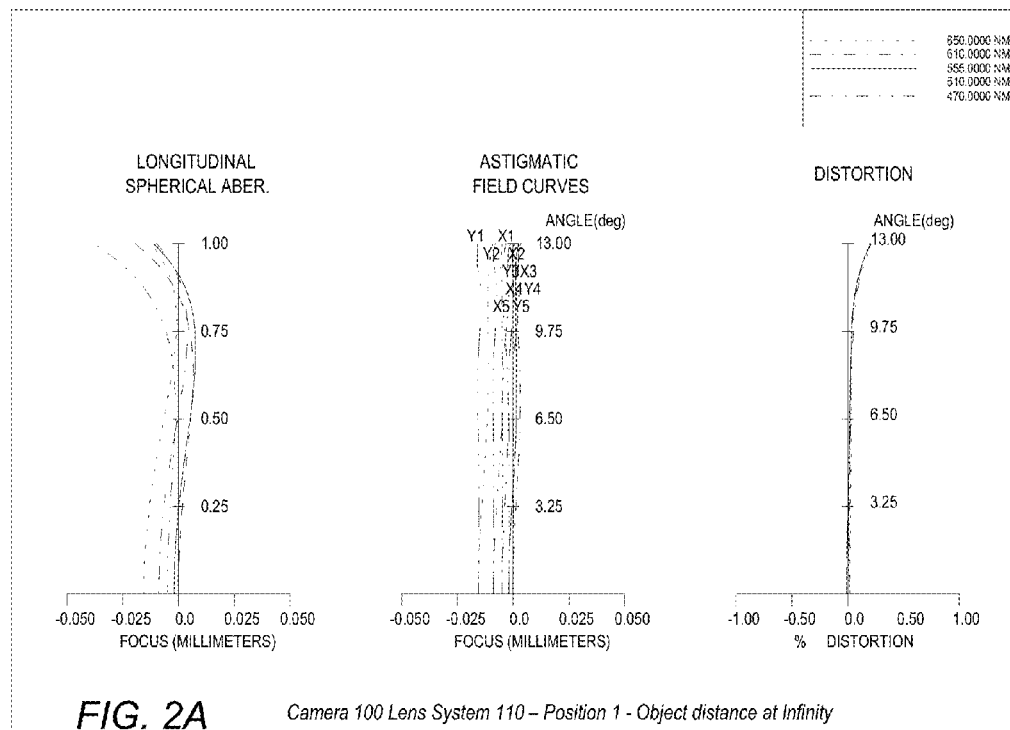
FIG. 2A  Camera 100 Lens System 110 – Position 1 - Object distance at Infinity
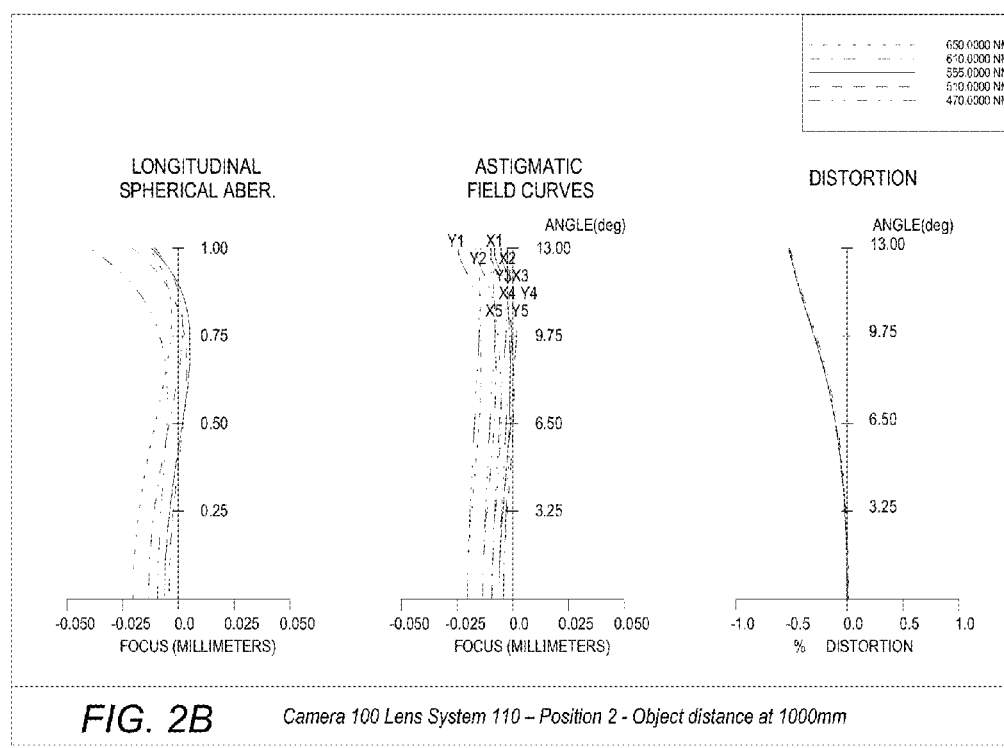
FIG. 2B  Camera 100 Lens System 110 – Position 2 - Object distance at 1000mm

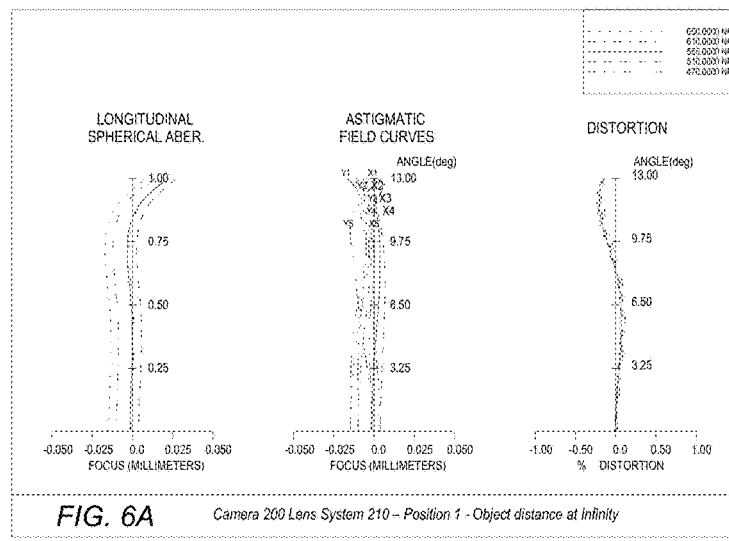
FIG. 6A  Camera 200 Lens System 210 – Position 1 - Object distance at infinity
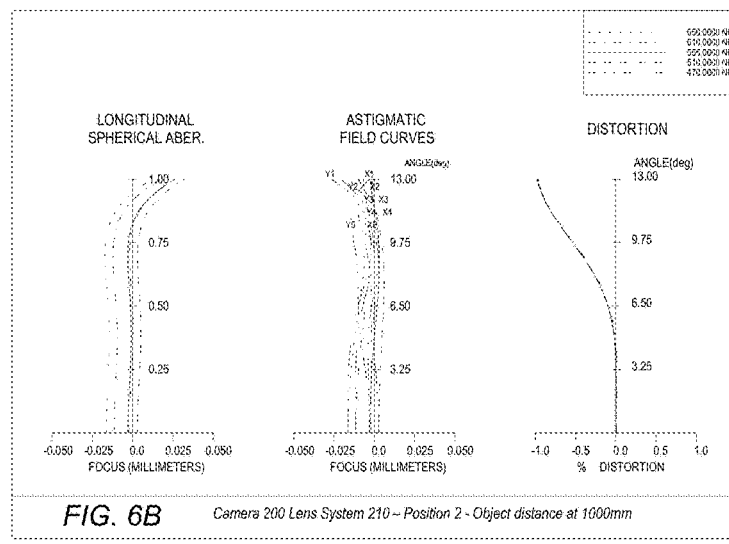
FIG. 6B  Camera 200 Lens System 210 – Position 2 - Object distance at 1000mm

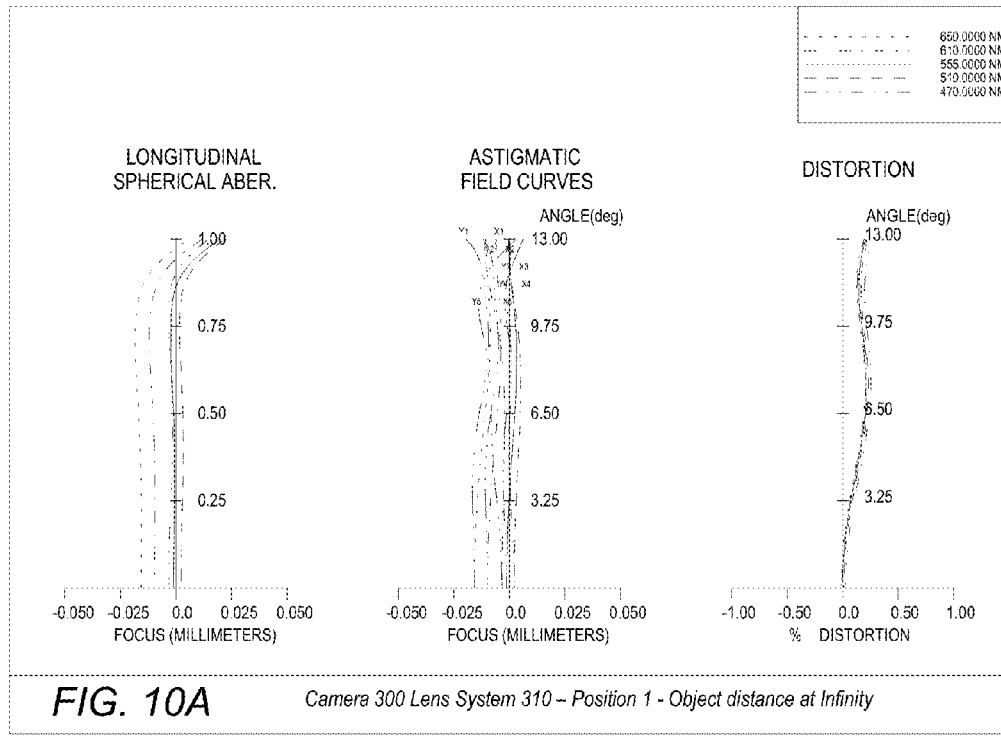
FIG. 10A  Camera 300 Lens System 310 – Position 1 – Object distance at Infinity
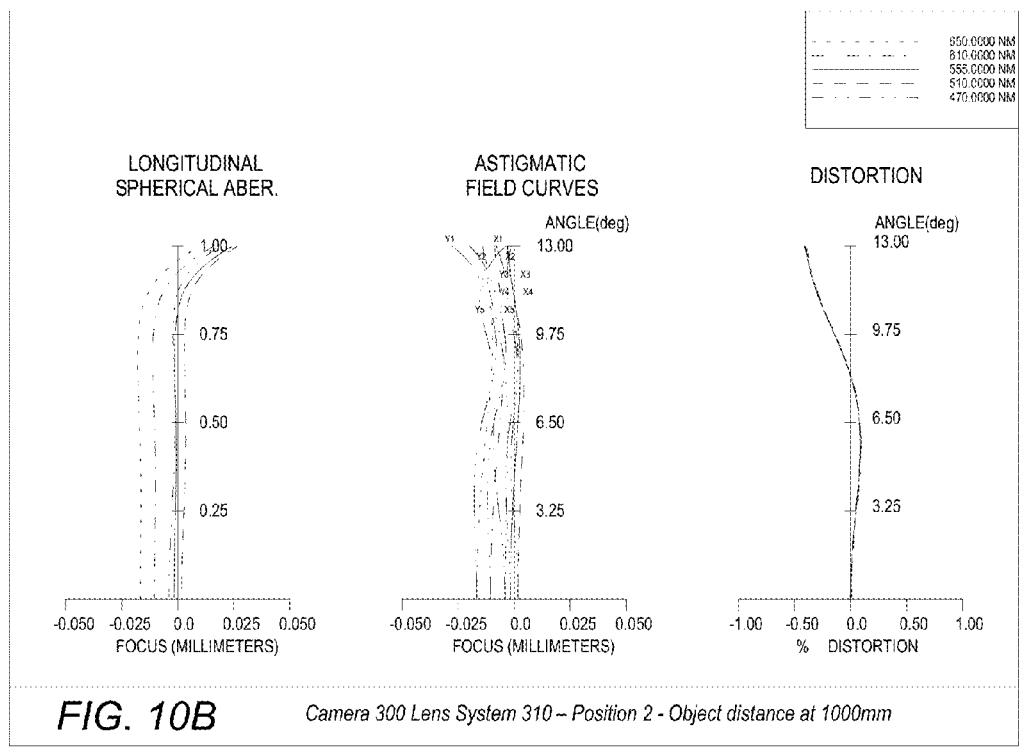
FIG. 10B  Camera 300 Lens System 310 – Position 2 – Object distance at 1000mm

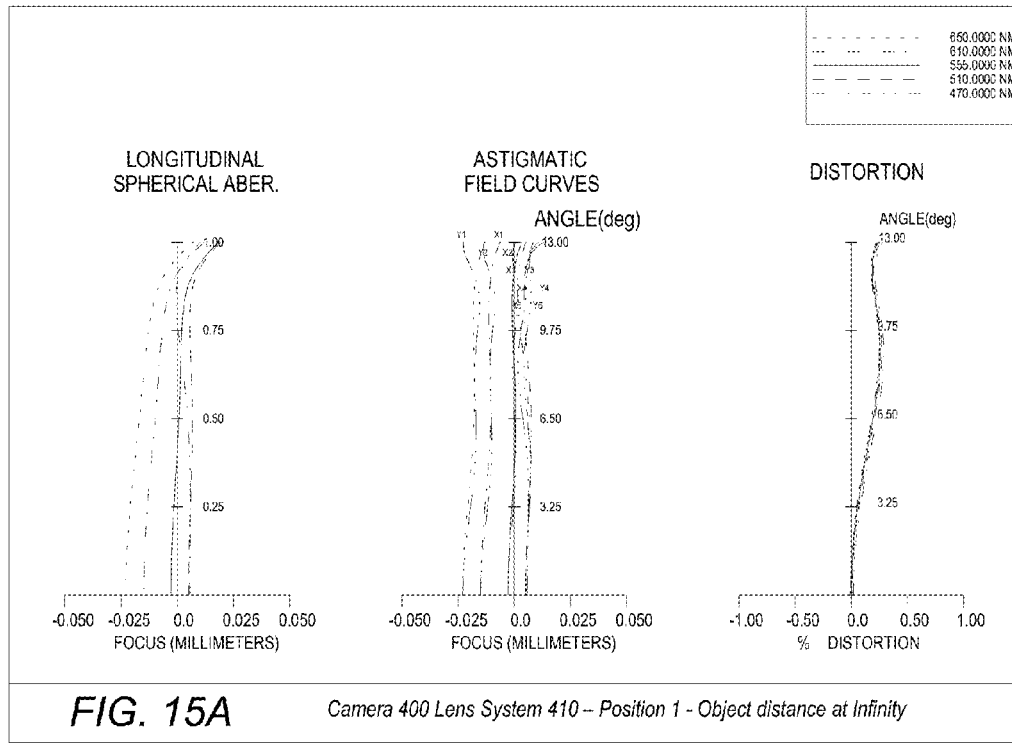
FIG. 15A  Camera 400 Lens System 410 – Position 1 - Object distance at Infinity
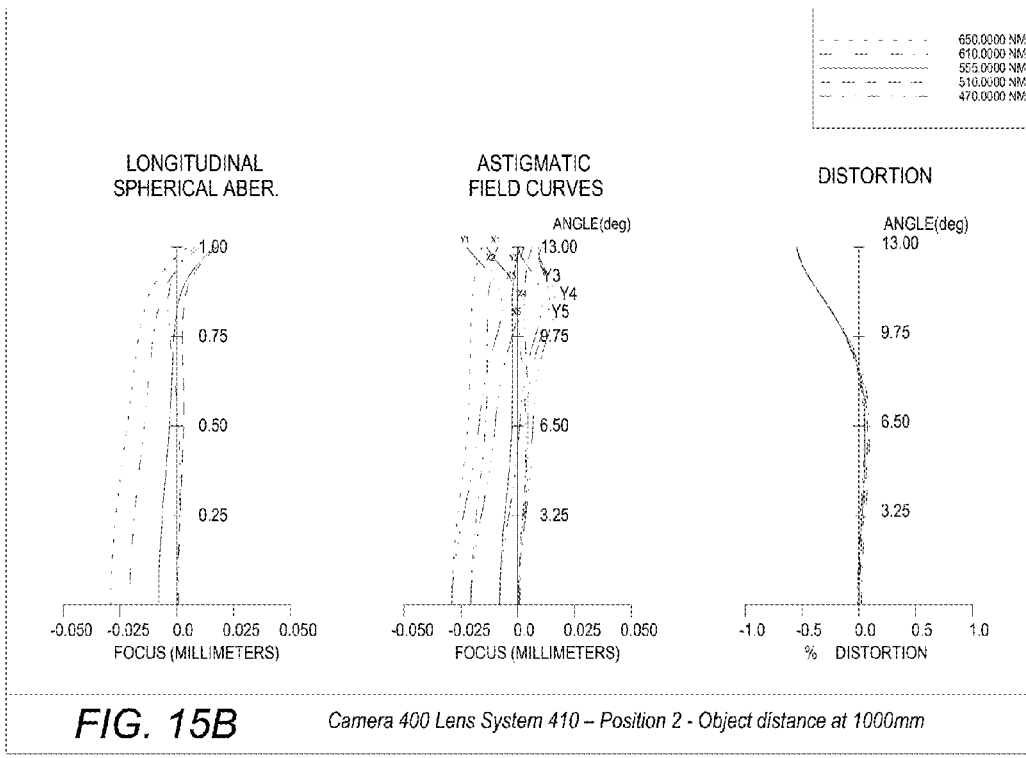
FIG. 15B  Camera 400 Lens System 410 – Position 2 - Object distance at 1000mm

FOLDED CAMERA LENS SYSTEMS

PRIORITY INFORMATION

This application claims benefit of priority of U.S. Provisional Application Ser. No. 61/949,898 entitled "FOLDED LENS SYSTEMS" filed Mar. 7, 2014, the content of which is incorporated by reference herein in its entirety.

BACKGROUND

Technical Field

This disclosure relates generally to camera systems, and more specifically to lens systems for small form factor cameras.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Embodiments of the present disclosure may provide a high-resolution camera in a small package size. A camera is described that includes a photosensor and a compact folded lens system. In embodiments, folding the optical path of the camera lens system may facilitate achieving a small form factor for the camera lens assembly, and may also facilitate achieving a high resolution optical lens system using a relatively small number of lens elements in the small form factor. Embodiments of a camera including the folded lens system may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers. In some embodiments, a camera as described herein may be included in a device along with one or more other cameras, for example a telephoto and/or a wide-field small format camera, which would for example allow the user to select between the different camera formats (normal, telephoto, or wide-field) when capturing images with the device.

Embodiments of the folded lens system are described that may reduce the width of the packaging volume of the lens system for potential application to a ⅓ inch (6.12 mm diagonal) sensor camera. Example embodiments of the folded lens system may have 14-mm EFL (effective focal length), F/2.8, and 26-degree diagonal field of view (DFOV) (6.46 mm image circle diameter, 3.232 mm image circle radius). In at least some embodiments, the image plane or sensor may be moved to focus an object scene from infinity to <1000 mm object distance. At least some embodiments may use a prism as a light path folding mechanism for folding the light optical path. In some embodiments, a lens-prism combination, for example one or more lenses and a prism molded into a composite unit element, may be used as the light path folding mechanism for folding the light optical path.

Embodiments of a folded lens system are described that include five lens elements with refractive power. However, more or fewer lens elements may be used in some embodiments. In various embodiments, a plane mirror or a prism element may be used to fold the light optical path. In at least some embodiments, at least one of the object side and image side surfaces of at least one of the lens elements is aspheric.

In at least some embodiments, the folded lens system includes a folded optical axis (referred to herein as AX), a first group (referred to herein as GR1) of optical elements, a light path folding element (e. g., a prism or plane mirror), a second group (referred to herein as GR2) of optical elements, and a photosensor at the image plane. At least some embodiments may also include an infrared filter and/or a window element. At least some embodiments of a folded lens system may include zooming capabilities for focusing on an object scene at infinity (object distance from camera ≥20 meters) to near object distance (<1 meter). For example, in various embodiments, the first group (GR1), the second group GR2, and/or the photosensor at the image plane may be zoomed, moved or translated for focusing an object scene from far distance (≥20 meters) to near distance (<1 meter).

In at least some embodiments, the lens system may be a fixed folded lens system configured such that the absolute value of the effective focal length f of the lens system is at or about 14 millimeters (mm) (e. g., within a range of 8 mm to about 14 mm), the F-number (focal ratio) is within a range from about 2.4 to about 10, the field of view (FOV) is at or about 26 degrees, and the total track length (TTL) of the unfolded lens system is within a range of ~8 mm to ~16 mm. However, note that values above or below the ranges given herein may be obtained in some embodiments. The total track length (TTL) of a lens system is the distance on the optical axis (AX) between the front vertex at the object side surface of the first (object side) optical element and the image plane. In embodiments of the folded lens system, the unfolded total track length (TTL) of the lens system may be defined as the distance on the folded optical axis (AX) between the front vertex at the object side surface of the first (object side) optical element and the image plane. In other words, the TTL for the folded lens system is the sum of the absolute values of the distances on the folded axis, AX, between the front vertex at the object side surface of the first (object side) lens element and the reflecting surface of light path folding element (mirror or prism) and the absolute value of the distance between the reflecting surface and the image plane. The sum of the absolute values of the distances may be used here since by optical design convention, the algebraic signs of the optical parameters (such as radii of curvatures, distances, focal length, etc.) change signs following a reflecting surface.

In at least some embodiments as described herein, the folded lens system may be configured such that the telephoto ratio |TTL/f| is greater than one:

$$|TTL/f| > 1.0$$

where f is the absolute value of the effective focal length. To be classified as a telephoto lens system, |TTL/f| (the telephoto ratio) should be less than or equal to 1. Thus, embodiments of a folded lens system as described herein may generally provide non-telephoto lens systems. However, note that in some embodiments a folded lens system may be configured or may be adjustable so that the telephoto ratio is less than or equal to one:

$$|TTL/f| \leq 1.0,$$

and thus embodiments may encompass folded telephoto lens systems and/or folded lens systems that are adjustable between the telephoto range and the non-telephoto range. For example, in some embodiments, the folded lens system may be adjustable to provide a telephoto ratio within a range of 0.8 to 1.2.

In at least some embodiments, the folded lens system may be configured such that the effective focal length f of the lens system is 14 mm, and the F-number is 2.8. However, note that the focal length (and/or other parameters) may be scaled or adjusted to meet specifications of optical, imaging, and/or packaging constraints for other camera system applications, for example for larger package size cameras. In addition, in some embodiments, the folded lens system may be adjustable. For example, in some embodiments, the folded lens system may include an adjustable iris or aperture stop. Using an adjustable aperture stop, the F-number (focal ratio, or F/#) may be dynamically varied, for example within a range of 2.8 to 10 or higher. Moreover, in some embodiments, the folded lens system may also include a zooming mechanism for dynamically focusing an object scene from far distance at infinity (i.e., ≥20 meters) to near object distance (i.e., <1 meter).

The refractive lens elements in the various embodiments may be composed of plastic materials. In at least some embodiments, the refractive lens elements may be composed of injection molded optical plastic materials. The fold mirror or prism elements in the various embodiments may be composed of glass or plastic materials. In embodiments with a window element and/or an infrared filter (IR) element, these elements may be composed of glass or plastic materials. However, other suitable transparent optical materials may be used. Also note that, in a given embodiment, different ones of the lens elements may be composed of materials with different optical characteristics, for example different Abbe numbers and/or different refractive indices. Also note that, while the lens elements in the various embodiments are generally illustrated as being circular lenses, in some embodiments one or more of the lenses may be of other shapes, for example oval, rectangular, square, or rectangular with rounded corners.

In at least some embodiments of the folded lens system, the lens element materials may be selected and the refractive power distribution of the lens elements may be calculated to satisfy a lens system effective focal length requirement and to correct the chromatic aberrations and the field curvature or Petzval sum. The monochromatic and chromatic variations of the optical aberrations may be reduced by adjusting the radii of curvature and aspheric coefficients or geometric shapes of the lens elements and axial separations to produce well-corrected and balanced minimal residual aberrations, as well as to reduce the total track length (TTL) and to achieve image quality optical performance and high resolution in a small form factor lens system camera.

BRIEF DESCRIPTION OF THE DRAWINGS

FIGS. 2A and 2B are plots of polychromatic curves of spherical aberration, astigmatism and distortion over the visible band ranging 470 nm to 650 nm for a folded lens system as illustrated in FIGS. 1A and 1B.

FIGS. 6A and 6B are plots of polychromatic curves of spherical aberration, astigmatism and distortion over the visible band ranging 470 nm to 650 nm for a folded lens system as illustrated in FIGS. 5A and 5B.

FIGS. 10A and 10B are plots of polychromatic curves of spherical aberration, astigmatism and distortion over the visible band ranging 470 nm to 650 nm for a folded lens system as illustrated in FIGS. 9A and 9B.

FIGS. 15A and 15B are plots of polychromatic curves of spherical aberration, astigmatism and distortion over the visible band ranging 470 nm to 650 nm for a folded lens system as illustrated in FIGS. 14A and 14B.

Figure 1A:
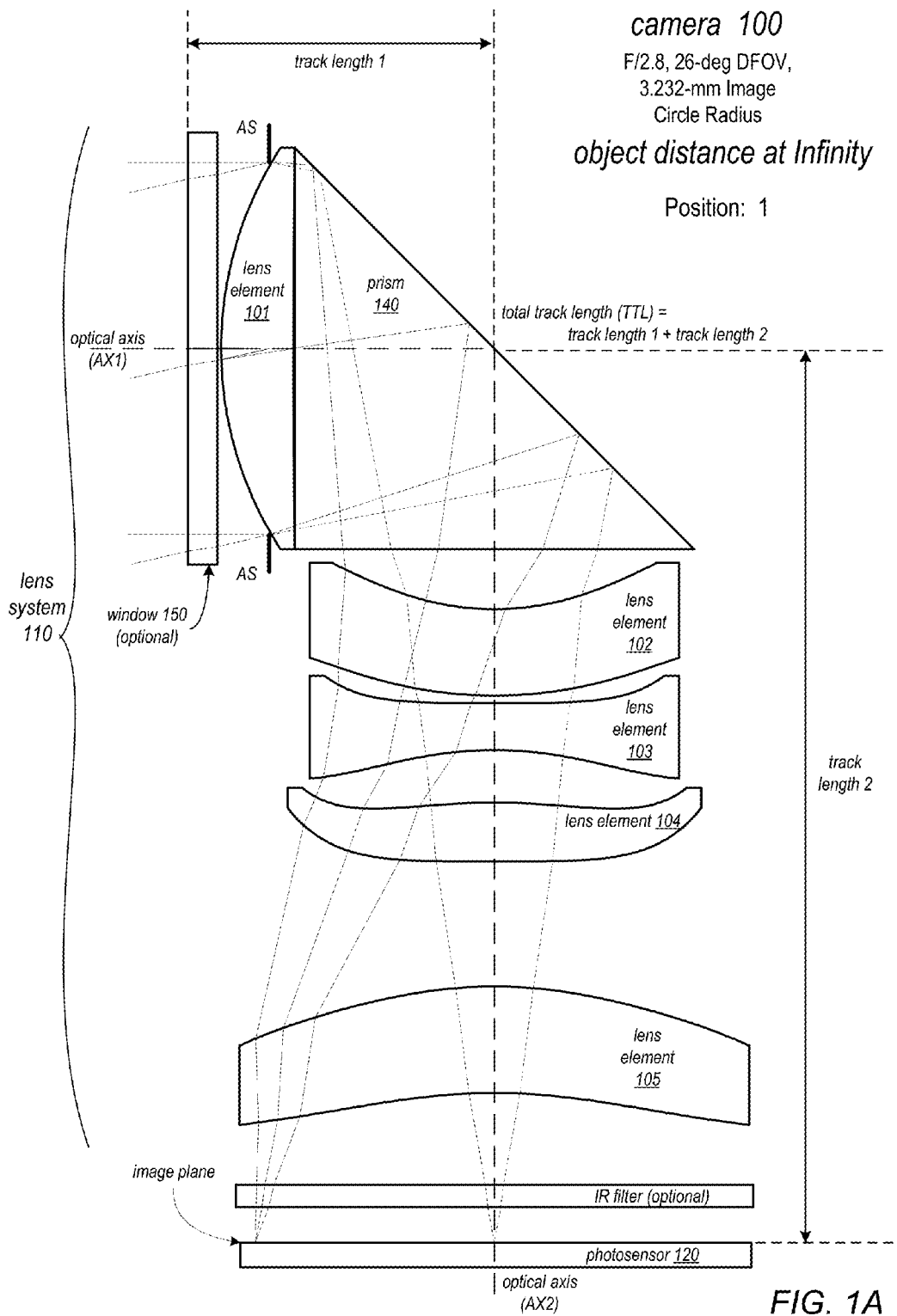
FIGS. 1A and 1B are cross-sectional illustrations of an example embodiment of a compact camera including a folded lens system that includes refractive lens elements and a light path folding element that acts to fold or change the direction of the optical path.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/ circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of small form factor camera including a photosensor and a compact folded lens system are described. Various embodiments of a compact folded lens system including five lens elements are described. However, note that more or fewer optical elements may be used in embodiments. The camera may be implemented in a small package size while still capturing sharp, high resolution images, making embodiments of the camera suitable for use in small and/or mobile multipurpose devices such as cell phones, smartphones, pad or tablet computing devices, laptop, netbook, notebook, subnotebook, ultra book computers, surveillance devices, and so on. However, note that the aspects of the camera (e.g., the lens system and photosensor) may be scaled up or down to provide cameras with larger or smaller package sizes. In addition, embodiments of the camera system may be implemented as stand-alone digital cameras. In addition, to still (single frame capture) camera applications, embodiments of the camera system may be adapted for use in video camera applications.

Embodiments of the folded lens system are described that may reduce the width of the packaging volume of the lens system for potential application to a ⅓ inch (6.12 mm diagonal) sensor camera. Example embodiments of the folded lens system may have 14-mm EFL (effective focal length), F/2.8, and 26-degree diagonal field of view (DFOV) (6.46-mm image circle diameter). In at least some embodiments, the image plane or sensor may be moved to focus an object scene from infinity to <1000 mm object distance. At least some embodiments may use a prism as a light path folding mechanism for folding the light optical path. In some embodiments, a lens-prism combination, for example one or more lenses and a prism molded into a composite unit element, may be used as the light path folding mechanism for folding the light optical path.

Several example embodiments of compact folded lens systems are described, including embodiments with a light path folding element and five refracting lens elements. FIGS. 1A and 1B, 5A and 5B, 9A and 9B, 13, 14A and 14B, 18, and 19A-19E show example embodiments that include a prism as a light path folding element for folding the light optical path and five refracting lens elements. In some embodiments, one or more of the lens elements may be fused, composited, molded, integrated, or otherwise combined with the prism, for example as illustrated in the embodiments of FIGS. 13, 18, and 19A-19E. Note, however, that these examples are not intended to be limiting, and that variations on the arrangements and numbers of the optical components, as well as on other various parameters given for the lens systems, are possible while still achieving similar results. Further note that, while not shown in the Figures, other mechanisms than a prism may be uses as a light path folding element. For example, in some embodiments, a mirror may be used instead of a prism.

The refractive lens elements in the various embodiments may be composed of plastic materials. In at least some embodiments, the refractive lens elements may be composed of injection molded plastic material. The prism (or fold mirror) in the various embodiments may be composed of glass or plastic materials. At least some embodiments may also include an infrared filter and/or a window element. In embodiments with a window element and/or an infrared filter (IR) element, these elements may be composed of glass or plastic materials. However, other transparent optical materials may be used. Also note that, in a given embodiment, different ones of the lens elements may be composed of materials with different optical characteristics, for example different Abbe numbers and/or different refractive indices. Also note that, while the lens elements in the various embodiments are generally illustrated as being circular lenses, in some embodiments one or more of the lenses may be of other shapes, for example oval, rectangular, square, or rectangular with rounded corners.

In each of the example cameras illustrated in the Figures, the example camera includes at least a folded lens system and a photosensor. The photosensor may be an integrated circuit (IC) technology chip or chips implemented according to any of various types of photosensor technology. Examples of photosensor technology that may be used are charge-coupled device (CCD) technology and complementary metal-oxide-semiconductor (CMOS) technology. In at least some embodiments, pixel size of the photosensor may be 1.2 microns or less, although larger pixel sizes may be used. In a non-limiting example embodiment, the photosensor may be manufactured according to a 1280×720 pixel image format to capture 1 megapixel images. However, other larger or smaller pixel formats may be used in embodiments, for example 5 megapixel, 10 megapixel, or larger or smaller formats.

The camera may also include a frontal aperture stop (AS) located at or in front of (i.e., on the object side of) a first lens element. Note that the aperture stop may be closer to or farther away from the lens element than shown in the Figures. Further, in some embodiments, the aperture stop may be located elsewhere in the folded lens system. For example, the aperture stop may be located between the first lens element and the light path folding element.

The camera may also, but does not necessarily, include an infrared (IR) filter located between a last lens element of the lens system and the photosensor. The IR filter may, for example, be composed of a glass material. However, other materials may be used. Note that the IR filter does not affect the effective focal length f of the lens system. The camera may also, but does not necessarily, include a window located between the object field and a first lens element of the lens system. The window may, for example, be composed of a glass material. However, other materials may be used. Note that the window may not affect the effective focal length f of the lens system. Further note that the camera may also include other components than those illustrated and described herein.

In a folded lens system, the light path folding element (e.g. a prism or mirror) with a reflecting surface changes a direction of the incoming light from a first optical axis (AX1) to a second optical axis (AX2). The incoming light from the object field passes through the refracting optical surfaces of the optical elements located on a first optical axis, AX1. A reflecting surface changes the direction of the incoming light from the first optical axis AX1 to a second optical axis, AX2, and the incoming light on the second optical axis passes through the refracting elements to the image plane on the second optical axis. The second optical axis AX2 may be oriented at an angle by the reflecting surface of the fold mirror or prism relative to the first optical axis AX1 to accommodate a desired compact form factor camera system. The angle may generally be 90 degrees to thus provide a right angle fold of the optical axis, but other angles less than or greater than 90 degrees may be used in some embodiments. In the following discussion, the total track length of the folded lens system (TTL) may be defined to be equal to the sum of the distance on AX1 between the front vertex at the object side surface of the first (object side) lens element and the reflecting surface of the fold mirror or prism (track length 1, denoted by TL1), and the distance on AX2 between the reflecting surface of the fold mirror or prism to the image plane (track length 2, denoted by TL2); i.e., TTL=TL1+TL2. Due to the change in algebraic sign of the parameters following a reflecting surface, the absolute value of the distance TL2 will be used to determine the TTL in the above-mentioned definition.

In the camera, the folded lens system forms an image at an image plane (IP) at or near the surface of the photosensor. The image size for a distant object is directly proportional to the effective focal length f of a lens system. The total track length (TTL) of the lens system is the distance on the optical axis (AX) between the front vertex at the object side surface of the first (object side) lens element and the image plane. For a telephoto lens system, the total track length (TTL) is less than the lens system effective focal length (f), and the ratio of the total track length to the focal length |TTL/f| is the telephoto ratio. To be classified as a telephoto lens system, TTL/f is less than or equal to 1. In at least some embodiments as described herein, the folded lens system may be configured such that the telephoto ratio (TTL/f) is greater than one:

|TTL/f|>1.0 where f is the absolute value of the effective focal length. To be classified as a telephoto lens system, |TTL/f| (the telephoto ratio) should be less than or equal to 1. Thus, embodiments may generally provide non-telephoto lens systems. However, note that in some embodiments a folded lens system may be configured or may be adjustable so that the telephoto ratio is less than or equal to one:

|TTL/f|≤1.0, and thus embodiments may encompass telephoto folded lens systems and/or folded lens systems that are adjustable between the telephoto range and the non-telephoto range. For example, in some embodiments, the folded lens system may be adjustable to provide a telephoto ratio within a range of 0.8 to 1.2. However, note that the focal length f, F-number, and/or other parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, F-number, field of view (FOV), imaging performance requirements, and packaging volume or size constraints.

In some embodiments, the folded lens system may be adjustable. For example, in some embodiments, a folded lens system as described herein may include an adjustable iris (entrance) pupil or aperture stop. Using an adjustable aperture stop, the F-number (focal ratio, or f#) may be dynamically varied within a range. For example, if the lens is well-corrected at F/2.8, at a given focal length f and FOV, then the focal ratio may be varied within the range of 2.8 (or lower) to 10 (or higher) by adjusting the aperture stop, assuming that the aperture stop can be adjusted to the desired F-number setting. In some embodiments, the lens system may be used at faster focal ratios (f#<2.8) by adjusting the aperture stop with degraded image quality performance at the same FOV (e. g. 26 degrees), or with reasonably good performance at a smaller FOV.

In some embodiments, the folded lens system may also include a manual and/or automatic focusing mechanism to provide zooming capabilities for focusing an object scene at infinity (object scene distance from camera ≥20 meters) to near object distance (≤1 meter). For example, in some embodiments, a folded lens system as described herein may include an adjustable focusing mechanism to translate or move a group of lens elements to focus objects at distances ranging from infinity (≥20 meters) to (≤1 meter). In some embodiments, the folded lens system may include an adjustable focus mechanism via which the photosensor may be zoomed or moved or actuated for focusing an object scene at distances ranging from greater than 20 meters to less than 1 meter. Note that some embodiments may be configured to move or translate the photosensor and one or more lens elements to achieve focus.

While ranges of values may be given herein as examples for adjustable cameras and folded lens systems in which one or more optical parameters may be dynamically varied (e.g., using an adjustable aperture stop and/or adjustable focus), embodiments of camera systems that include fixed (non-adjustable) folded lens systems in which values for optical and other parameters are within these ranges may be implemented.

Referring to embodiments as illustrated in the Figures, a compact folded lens system (e.g., 110, 210, 310, 410, or 510) of a camera (e.g., 100. 200, 300, 400, or 500) may include five lens elements (101-105 in lens system 110 of FIGS. 1A-1B, 201-205 in lens system 210 of FIGS. 5A and 5B, 301-305 in lens system 300 of FIGS. 9A, 9B, and 13, 401-405 in lens system 410 of FIGS. 14A, 14B, and 18, and 501-505 in lens system 510 of FIGS. 19A-19E) with refractive power, and lens system effective focal length off arranged along a folded optical axis AX from an object side (AX1) to an image side (AX2):
- a first lens element L1 (101, 201, 301, 401, or 501) with focal length f1;
- a light path folding prism (140, 240, 340, 440, or 540) that folds the optical axis from AX1 to AX2;
- a second lens element L2 (102, 202, 302, 402, or 502) with focal length f2;
- a third lens element L3 (103, 203, 303, 403, or 503) with focal length f3;
- a fourth lens element L4 (104, 204, 304, 404, or 504) with focal length f4; and
- a fifth lens element L5 (105, 205, 305, 405, or 505) with focal length f5.

Figure 13:
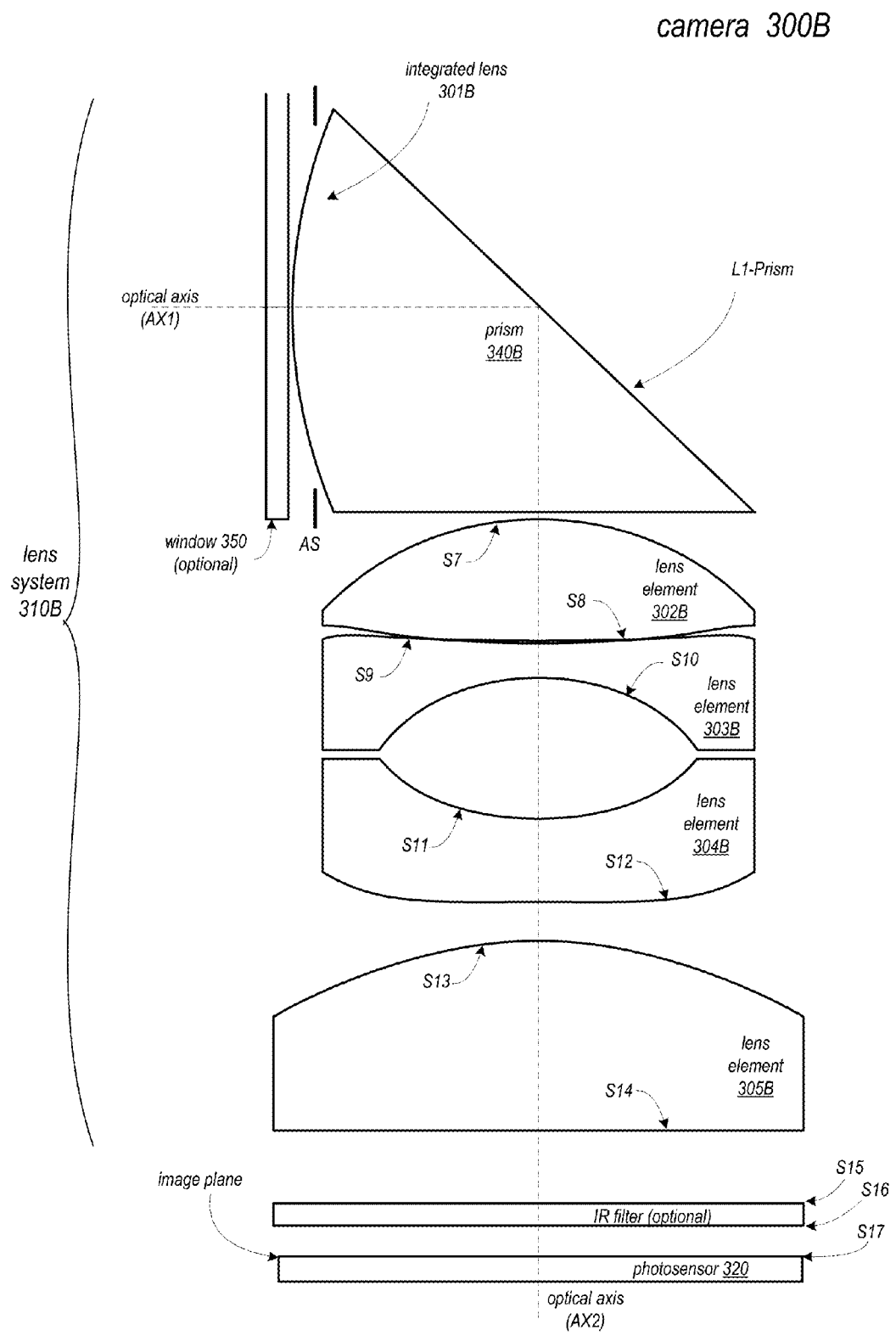
FIG. 13 is a cross-sectional illustration of another example embodiment of a compact camera including a folded lens system that includes refractive lens elements and a light path folding element that acts to fold the optical path, and is a variation of the folded lens system as illustrated in FIGS. 9A and 9B.
Figure 18:
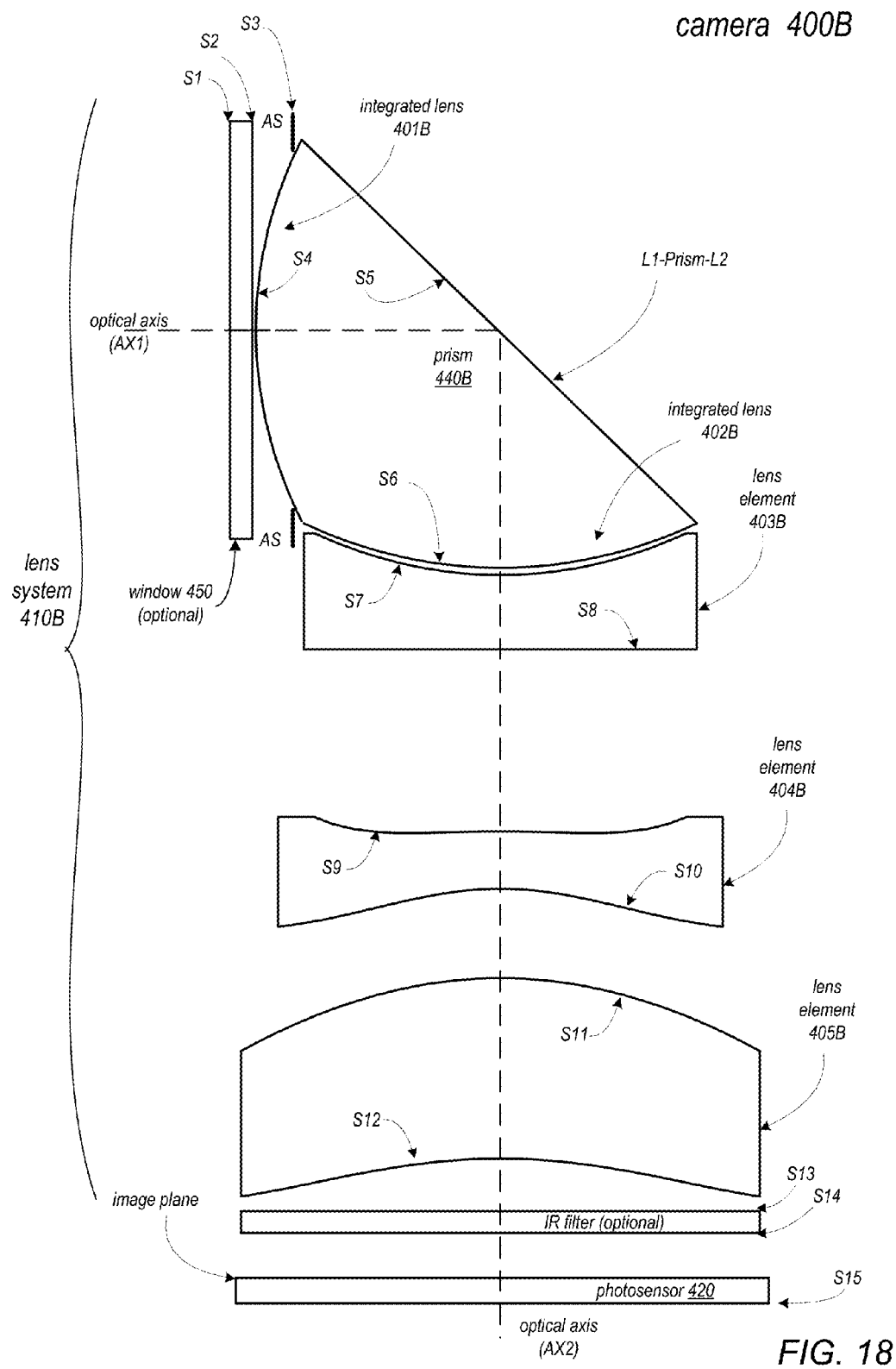
FIG. 18 is a cross-sectional illustration of another example embodiment of a compact camera including a folded lens system that includes refractive lens elements and a light path folding element that acts to fold the optical path, and is a variation of the folded lens system as illustrated in FIGS. 14A and 14B.
Figure 19A:
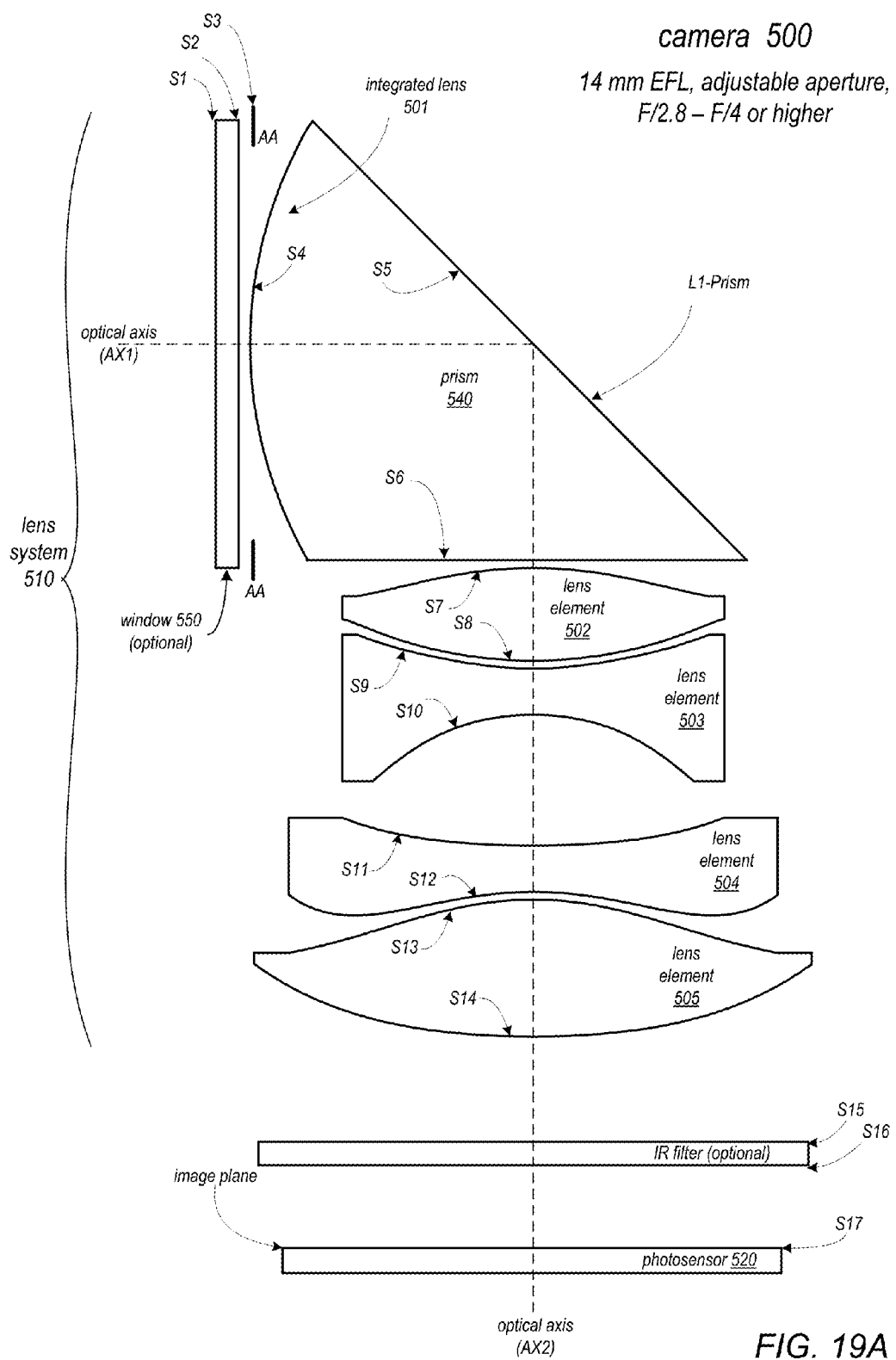
FIGS. 19A through 19E are cross-sectional illustrations of another example embodiment of a compact camera including a folded lens system that includes refractive lens elements and a light path folding element that acts to fold the optical path, and that also includes an adjustable aperture stop.

In addition, in at least some embodiments, at least one of the object side and image side surfaces of at least one of the lens elements is aspheric. In addition, at least some embodiments may include an IR filter, for example located between the fifth lens element and the photosensor. In addition, at least some embodiments may include a window element, for example located between the first lens element and the object plane. In addition, at least some embodiments may include an aperture stop (AS), for example located in front of the first lens element. In some embodiments, for example as illustrated in FIGS. 13 and 19A, the first lens element and prism may be molded as a single combined unit or element. In some embodiments, for example as illustrated in FIG. 18, the first lens element, prism, and second lens element may be molded as a single combined unit or element.

Embodiments of a folded camera lens system as described herein may be configured such that the dioptric power distribution of the lens elements L1-L5 having refractive powers or focal lengths f1-f5 satisfy the following conditions:

$$0.5 < |f1/f| < 0.8,$$

$$0.3 < |f2/f| < 2.0,$$

$$0.2 < |f3/f| < 0.6,$$

$$0.4 < |f4/f| < 1.5,$$

$$0.3 < |f5/f| < 3.0,$$

where f is the effective focal length of the folded lens system.

Figure 1B:
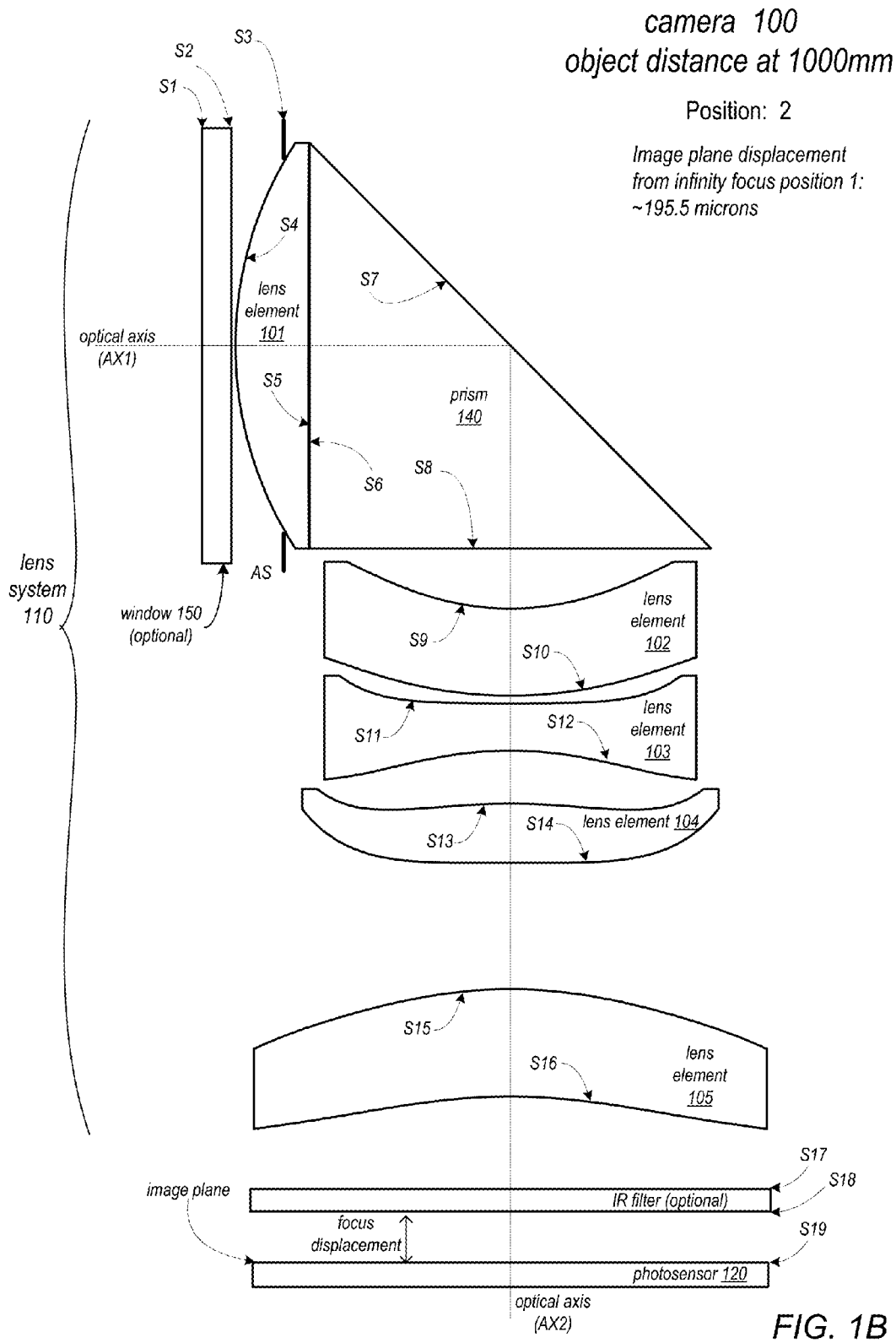

FIGS. 1A and 1B are cross-sectional illustrations of an example embodiment of a compact camera including a folded lens system that includes refractive lens elements and a light path folding element that acts to fold or change the direction of the optical path. FIG. 1A shows the camera 100 at focus position 1 (object distance at infinity), while FIG. 1B shows the camera 100 at focus position 2 (object distance at 1000 mm, image plane displacement from focus position 1 about 195.5 microns). Lens system 110 includes five lens elements (101-105) with refractive power. Arranged along an optical axis AX of the camera 100 from an object side (AX1) to an image side (AX2) are an aperture stop AS, a first lens element L1 (101) having a convex object side surface and focal length f1, a prism 140 that is oriented to change the direction of the incoming light path and to thus fold the optical axis from AX1 to AX2, a second lens element L2 (102) with focal length f2, a third lens element L3 (103) with focal length f3, a fourth lens element L4 (104) with focal length f4, and a fifth lens element L5 (105) with focal length f5. The lens system 110 forms an image at the surface of a photosensor 120. In some embodiments, an infrared (IR) filter may be located between the fifth lens element L5 and the photosensor 120. In some embodiments, a window 150 may be located between the first lens element L1 and the object field. FIG. 1B also shows the surface numbers (S#) of the surfaces of the elements in the camera 100 and lens system 110 as used in the corresponding Tables 1A-1E.

The effective focal length of the lens system 110 is given by f. The total track length (TTL) of the compact folded lens system 110 is the distance along the optical axes AX1 and AX2 between the object side surface of the first element L1 and the image plane, or alternatively between the object side surface of the window 150 and the image plane. Referring to FIGS. 1A and 1B, the TTL is the sum of TL1 and TL2, where TL1 is the axial distance between the front vertex of the object side surface of L1 and the reflecting surface of the prism 140, and TL2 is the axial distance between the reflecting surface of prism 140 and the image plane at photosensor 120. An aperture stop AS, which may for example be located at the front surface of lens element L1, determines the entrance pupil of the lens system 110. The lens system 110 focal ratio of f-number f# is defined as the lens system 110 effective focal length f divided by the entrance pupil diameter. The IR filter may act to block infrared radiation that could damage or adversely affect the photosensor, and may be configured so as to have no effect on the lens system 110 effective focal length f. Similarly, the window may act to protect the lens system, and may be configured so as to have little or no effect on the lens system 110 effective focal length f.

In at least some embodiments, camera 100 and folded lens system 110 are configured to provide 14-mm EFL (effective focal length), F/2.8, 26-degree diagonal field of view (DFOV), and a 3.232-mm image circle radius. In an example, non-limiting embodiment of lens system 110, TL1=~4.15 mm, TL2=~12.0 mm, and TTL=~16.15 mm. In at least some embodiments, folded lens system 110 includes refractive lens elements L1, L2, L3, L4, and L5 (lens elements 101-105), a prism 140; a window 150, and an IR filter arranged along the optical axes AX1 and AX2. In at least some embodiments, L1 (lens element 101), prism 140, window 150, and the IR filter are composed of optical glass materials, and L2, L3, L4, and L5 (lens elements 102-105) are composed of two types of optical plastic materials. In some embodiments, the L1 (101) and prism 140 elements may be cemented or air-spaced. In at least some embodiments, window 150 is 0.4 mm thick and the IR filter is 0.3 mm thick. However, note that the values and parameters as given above are examples and are not intended to be limiting.

Figure 4A:
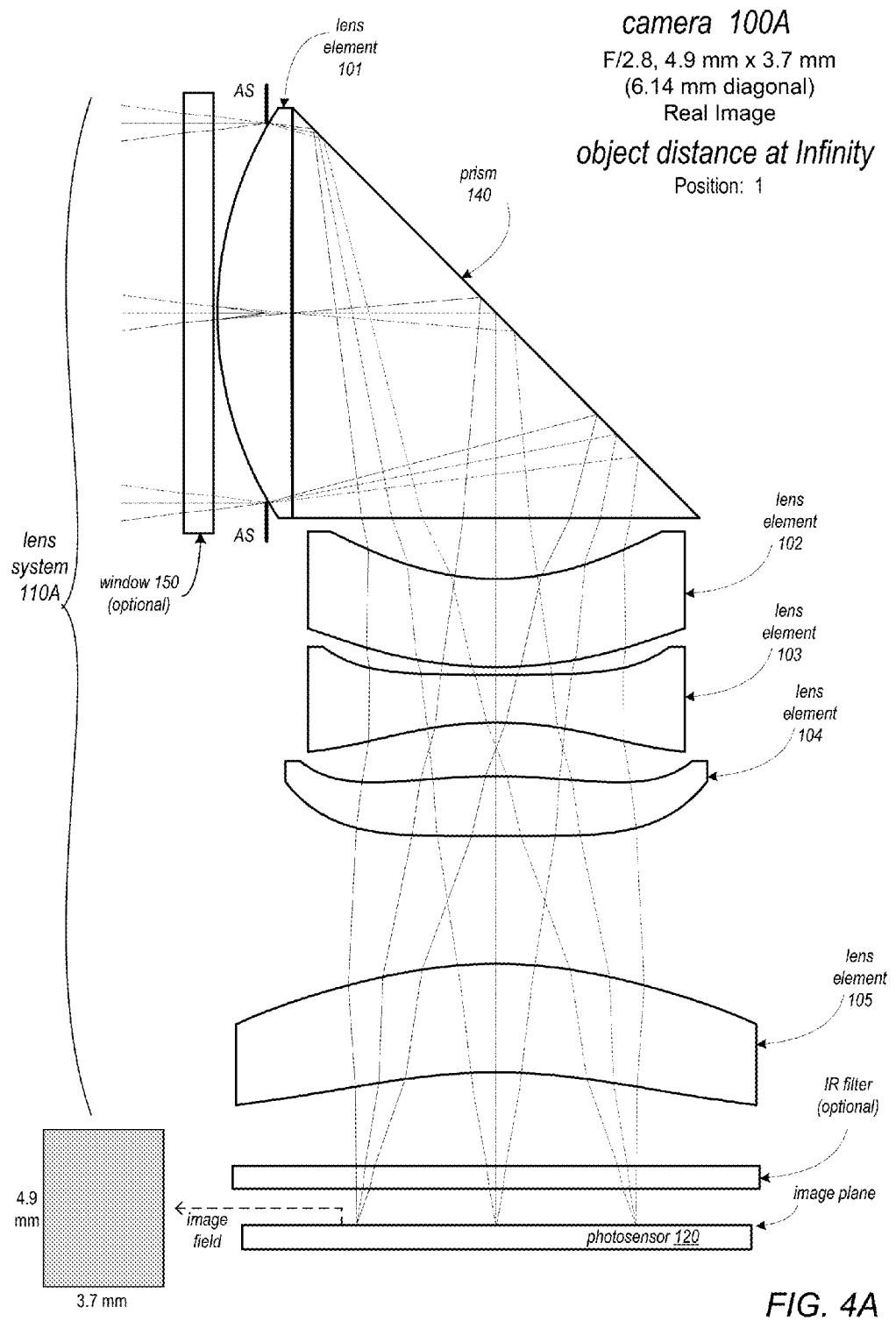
FIGS. 4A and 4B illustrate example lens orientation in a folded lens system as illustrated in FIGS. 1A and 1B for a 4.9 mm×3.7 mm image format compact camera.
Figure 4B:
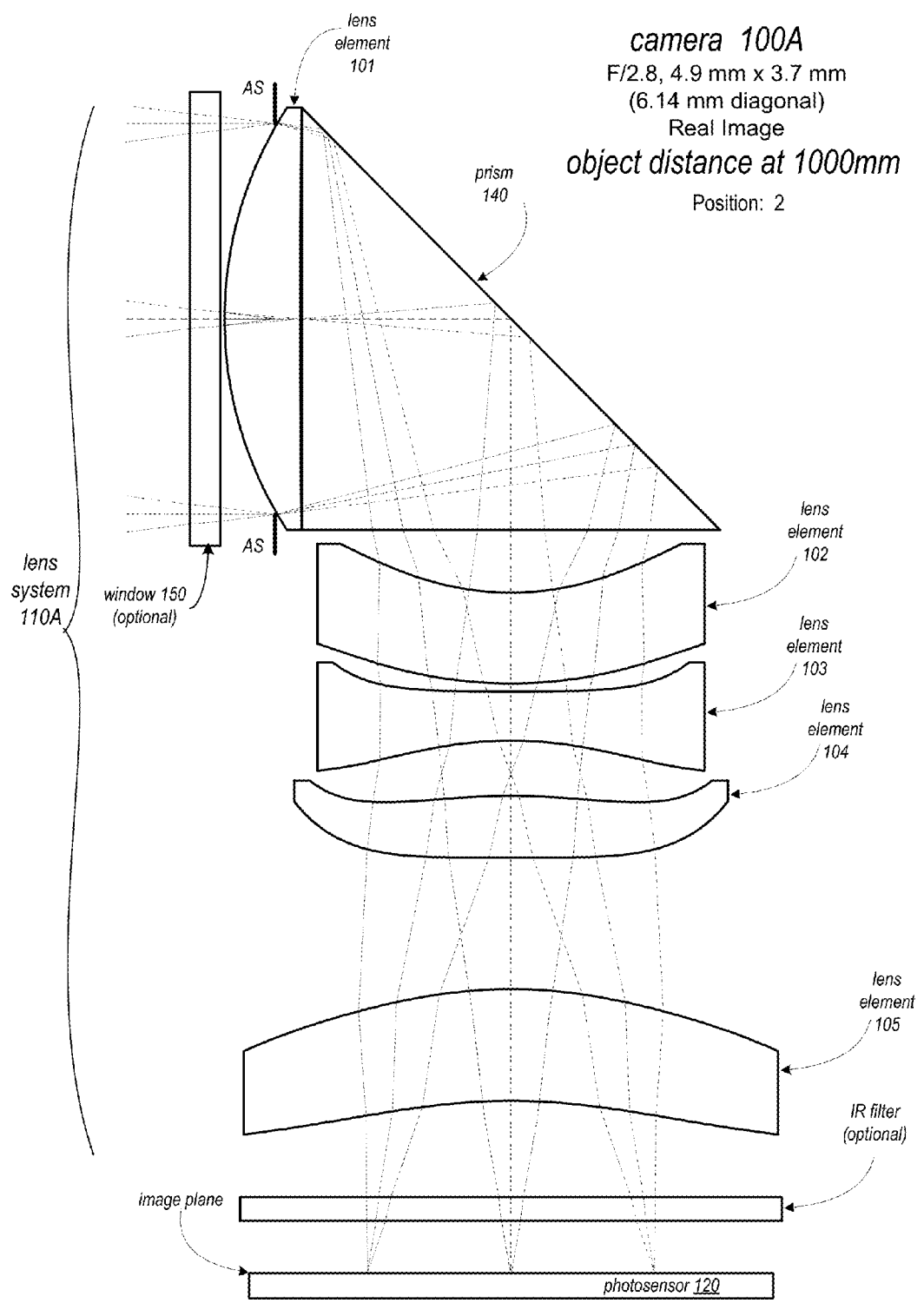

FIGS. 4A and 4B illustrate example lens orientation in a folded lens system as illustrated in FIGS. 1A and 1B for a 4.9 mm×3.7 mm (6.14 mm diagonal) image format compact camera 100A, and show the lens system 110A of camera 100A at focus position 1 (object distance at infinity) and focus position 2 (object distance at 1000 mm), respectively. The rectangle to the left of the photosensor in FIG. 4A represents orientation of the 4.9 mm×3.7 rectangular image field with respect to the camera as shown.

Tables 1A-1E provide example values of various optical and physical parameters of an example embodiment of a camera 100 and lens system 110 as illustrated in FIGS. 1A and 1B. Tables 1A-1E may be referred to as providing an optical prescription for the lens system 110. Referring to Tables 1A-1E, embodiments of lens system 110 cover applications in the visible region of the spectrum from 470 nanometers (nm) to 650 nm with reference wavelength at 555 nm. The optical prescription in Tables 1A-1E provides high image quality at F/2.8 over 470 nm to 650 nm spectrum, for an effective focal length f of 14.0 millimeters (mm), covering 26 degrees field of view (FOV) (13 degrees half FOV). The folded lens system 110, illustrated in FIGS. 1A and 1B and with optical prescription as shown in Tables 1A-1E, has total track length (TTL=TL1+TL2) of 15.7 mm and a telephoto ratio |TTL/f| of 1.1214. Lens system 110 is a compact folded imaging system designed for visible spectrum covering 470 nm to 650 nm.

In at least some embodiments, the optical elements of lens system 110 may be composed of materials with refractive indices $N_d$ and Abbe numbers $V_d$ as listed in Table 1B. In this example embodiment of a folded lens system 110, the lens element L1 may be composed of a glass material having refractive index 1.603 and Abbe number of 65.4, the lens elements L2 and L4 may be composed of a plastic material having refractive index of 1.544 and Abbe number of V1=56.1, the lens elements L3 and L5 may be composed of a plastic material with refractive index of 1.632 and Abbe number V2=23.3. Materials, refractive indices, and Abbe numbers for the window 150, prism 140, and IR filter are also given in Table 1B. The choice and application of these materials for the elements in lens system 110 may enable lens system 110 to be optimized and corrected for chromatic aberrations over the visible region. The materials may be chosen and the refractive power distribution of the lens elements may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens elements and axial separations, for example as illustrated in Table 1C, to produce well-corrected and balanced minimal residual aberrations.

Figure 3A:
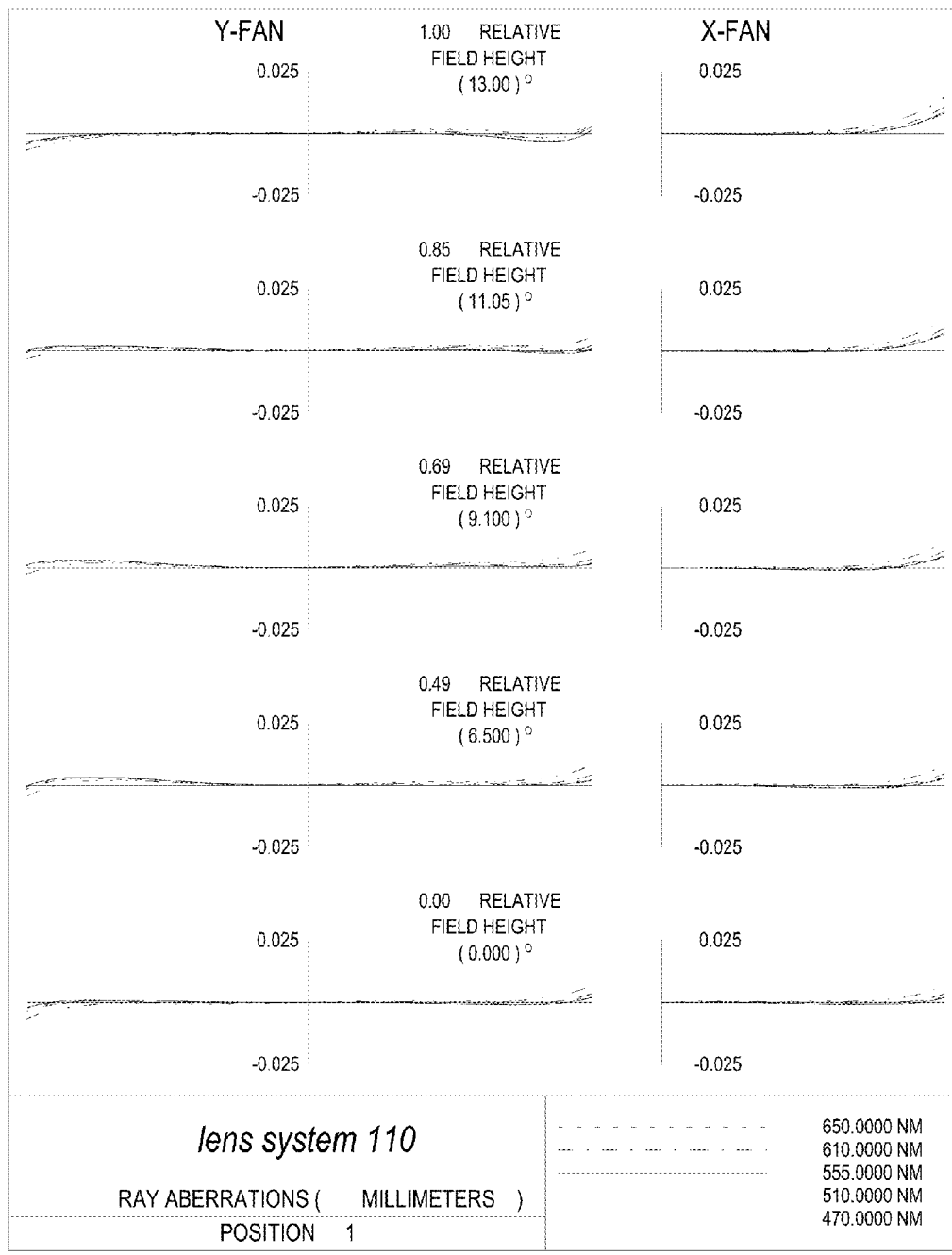
FIGS. 3A and 3B illustrate plots of the polychromatic ray aberration curves over the half field of view and over the visible spectral band ranging 470 nm to 650 nm for a folded lens system as illustrated in FIGS. 1A and 1B.
Figure 3B:
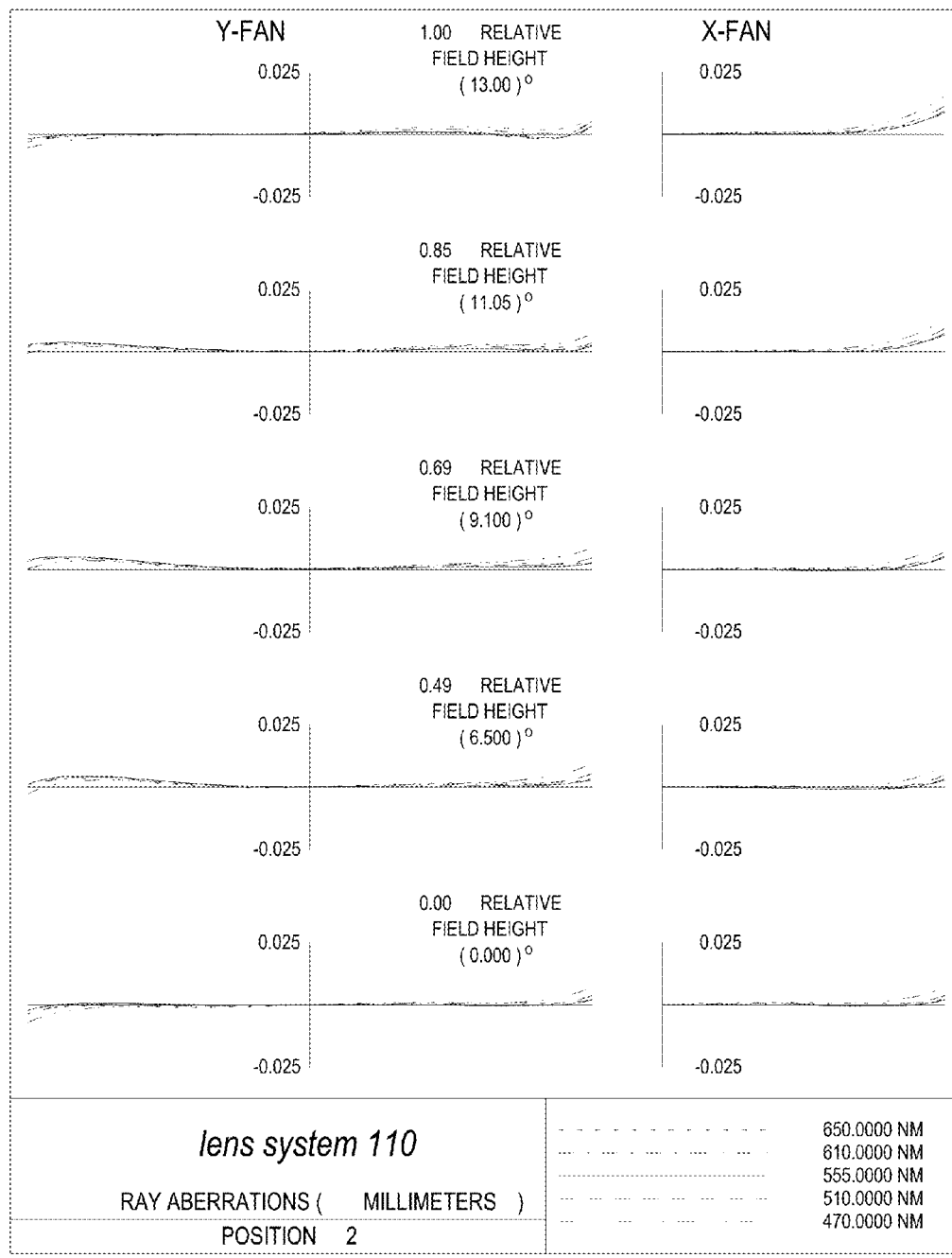

FIGS. 2A and 2B are plots of polychromatic curves of spherical aberration, astigmatism and distortion over the visible band ranging 470 nm to 650 nm for a folded lens system as illustrated in FIGS. 1A and 1B, and show the values at focus position 1 (object distance at infinity) and focus position 2 (object distance at 1000 mm) of the camera 100, respectively. FIGS. 3A and 3B illustrate plots of the polychromatic ray aberration curves over the half field of view and over the visible spectral band ranging 470 nm to 650 nm for a folded lens system as illustrated in FIGS. 1A and 1B.

Referring to Table 1D, the decentering constants of the reflecting surface in the prism element of lens system 110 are listed. The reflecting surface of the prism may be oriented 45 degrees relative to the optical axis of L1 (AX1) and thus the folded optical axis of L2-L5 (AX2) is configured to be 90 degrees relative to the AX1. However, the angular orientation of the reflecting surface of the fold mirror or prism element may be configured to a desired value to suit a desired light path direction and lens system packaging requirements.

In at least some embodiments, camera 100 may include a zooming mechanism for dynamically focusing an object scene from infinity (object distance ≥20 meters) to near object distance, <1000 mm. For example, in some embodiments, lens system 110 including the IR filter may be moved along AX2 relative to the photosensor 120, or alternatively the photosensor 120 may be moved relative to the lens system 110/IR filter, for focusing an object scene from infinity to near distance (<1 meter) at the photosensor 120. The zoom parameters for lens system 110 are listed in Table 1E, with reference to Table 1B and FIG. 1B. The zoom parameters shown in Table 1E for position 1 are the axial thickness or space separation along AX2 between the IR filter (surface 18, or S18) and the image plane at the photosensor 120 (surface 19, or S19) when the object scene distance is at infinity (the optical prescription as listed in Table 1B). The corresponding optical prescription for an object scene at 1000 mm (position 2) is the same as the prescription listed in Table 1B, except that the object distance in surface #0 is replaced by 1000 mm, and the space separation between S18 and S19 given in Table 1B (−0.4677 mm) is replaced by −0.6632 mm. As can be seen in Table 1E, the distance between photosensor 120 and the lens system/IR filter changes by about 0.1955 mm (195.5 microns) for the lens system 110 to zoom and focus an object scene from infinity to <1000 mm.

The optical prescription in Tables 1A-1E describes an example embodiment of a lens system 110 as illustrated in FIGS. 1A and 1B with refractive powers of the lens elements distributed such that the ratios of the focal lengths f1-f5 of the lens elements L1-L5 relative to the effective focal length f are |f1/f|=0.591, |f2/f|=1.632, |f3/f|=0.506, |f4/f|=1.181, and |f5/f|=2.416. The aspheric coefficients for the surfaces of the lens elements in lens system 110 in the example embodiment are listed in Table 1C. Configuring lens system 110 according to the arrangement of the power distribution of the lens elements, and adjusting the radii of curvature and aspheric coefficient as shown in Tables 1A-1E, the total track length (TTL), of the lens system 110 may be reduced, and aberration of the system may effectively be corrected to obtain optical performance of high image quality resolution, for an object scene at infinity and for an object scene located <1000 mm distance, in a small form factor camera 100.

Figure 5A:
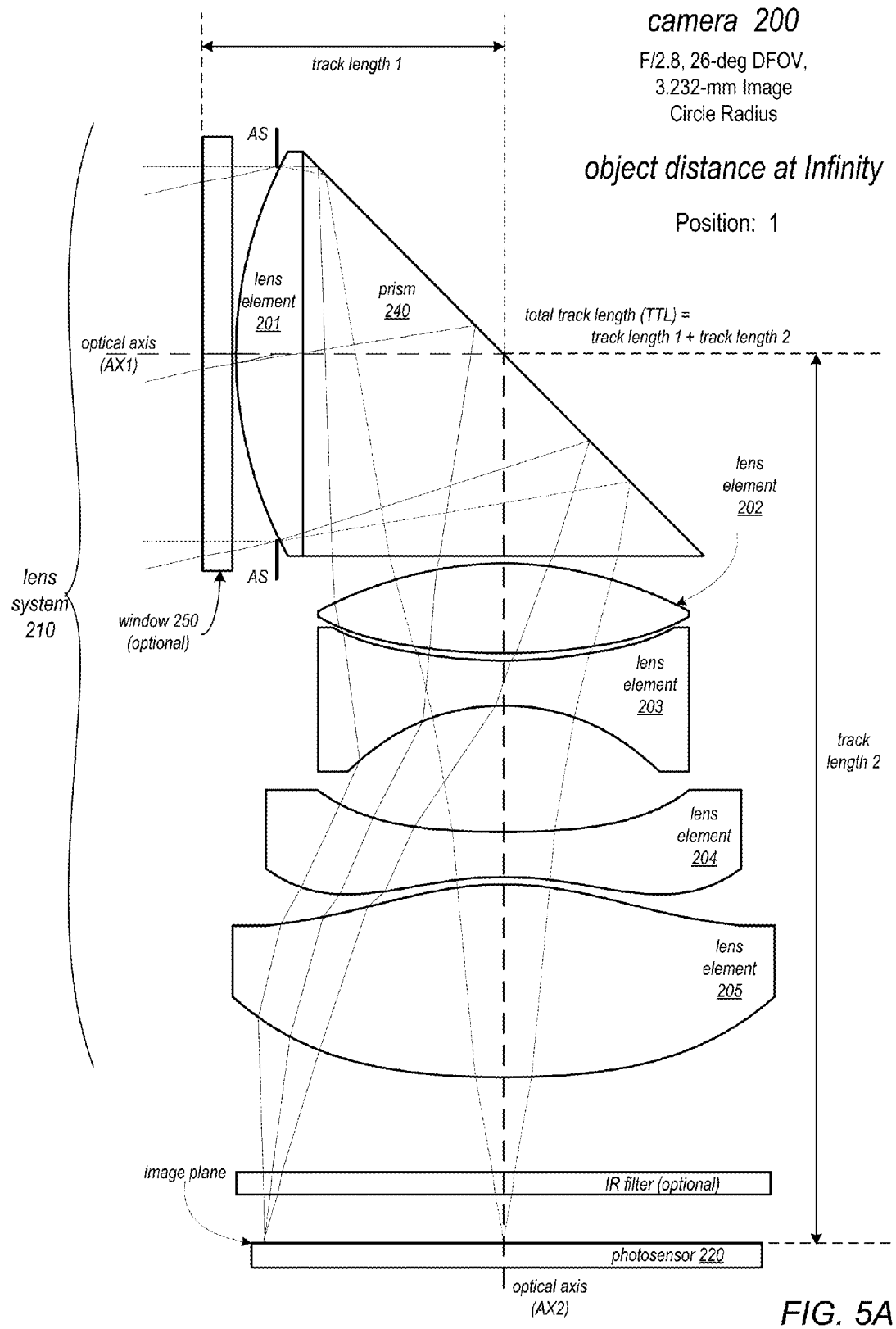
FIGS. 5A and 5B are cross-sectional illustrations of another example embodiment of a compact camera including a folded lens system that includes refractive lens elements and a light path folding element that acts to fold the optical path.
Figure 5B:
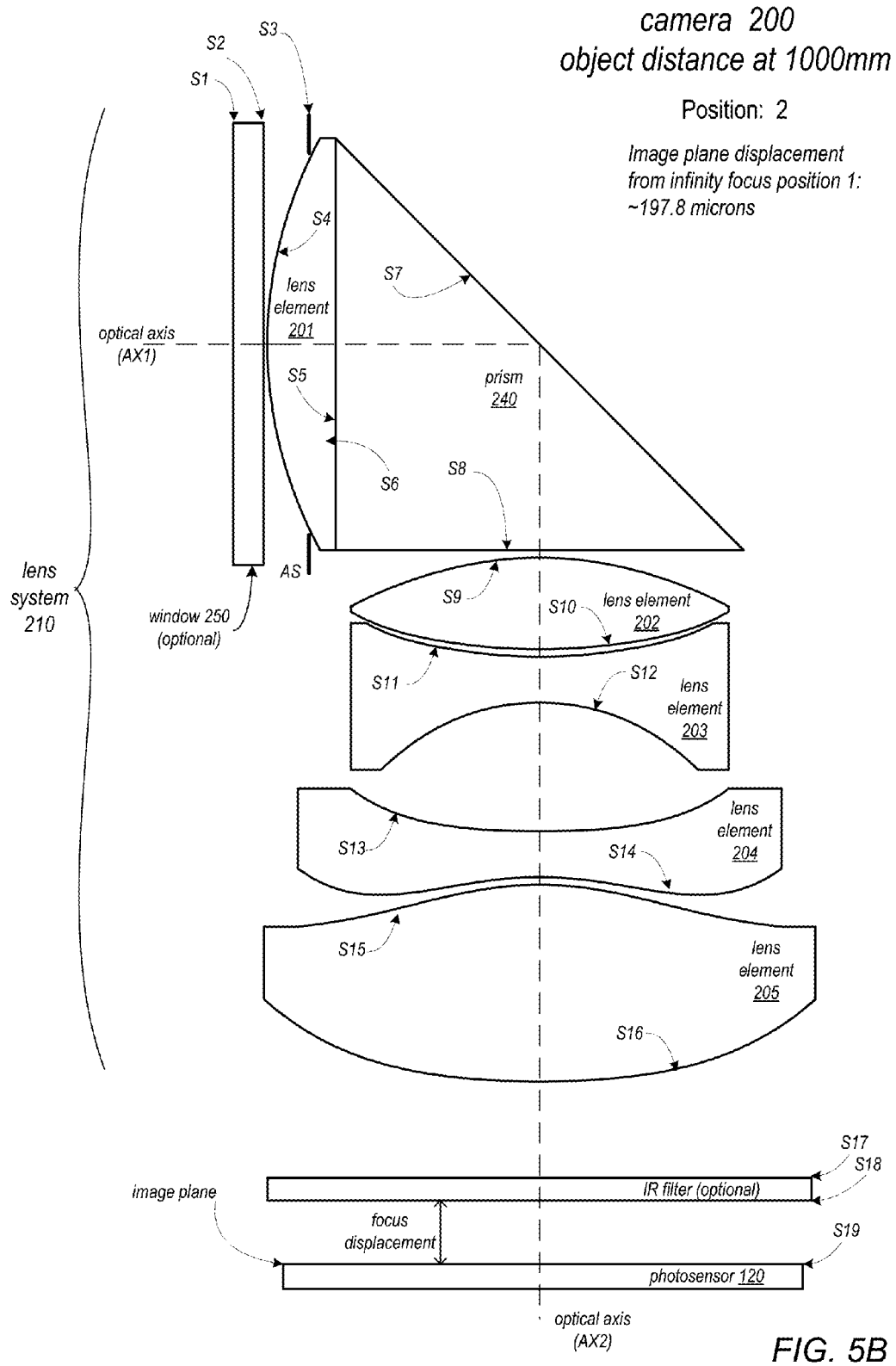

FIGS. 5A and 5B are cross-sectional illustrations of another example embodiment of a compact camera including a folded lens system that includes refractive lens elements and a light path folding element that acts to fold the optical path. FIG. 5A shows the camera 200 at focus position 1 (object distance at infinity), while FIG. 5B shows the camera 200 at focus position 2 (object distance at 1000 mm, image plane displacement from focus position 1 about 197.8 microns). Lens system 210 includes five lens elements (201-205) with refractive power. Arranged along an optical axis AX of the camera 200 from an object side (AX1) to an image side (AX2) are an aperture stop AS, a first lens element L1 (201) having a convex object side surface and focal length f1, a prism 240 that is oriented to change the direction of the incoming light path and to thus fold the optical axis from AX1 to AX2, a second lens element L2 (202) with focal length f2, a third lens element L3 (203) with focal length f3, a fourth lens element L4 (204) with focal length f4, and a fifth lens element L5 (205) with focal length f5. The lens system 210 forms an image at the surface of a photosensor 220. In some embodiments, an infrared (IR) filter may be located between the fifth lens element L5 and the photosensor 220. In some embodiments, a window 250 may be located between the first lens element L1 and the object field. FIG. 5B also shows the surface numbers (S#) of the surfaces of the elements in the camera 200 and lens system 210 as used in the corresponding Tables 2A-2E.

The effective focal length of the lens system 210 is given by f. The total track length (TTL) of the compact folded lens system 210 is the distance along the optical axes AX1 and AX2 between the object side surface of the first element L1 and the image plane, or alternatively between the object side surface of the window 250 and the image plane. Referring to FIGS. 5A and 5B, the TTL is the sum of TL1 and TL2, where TL1 is the axial distance between the front vertex of the object side surface of L1 and the reflecting surface of the prism 240, and TL2 is the axial distance between the reflecting surface of prism 240 and the image plane at photosensor 220. An aperture stop AS, which may for example be located at the front surface of lens element L1, determines the entrance pupil of the lens system 210. The lens system 210 focal ratio of f-number f# is defined as the lens system 210 effective focal length f divided by the entrance pupil diameter. The IR filter may act to block infrared radiation that could damage or adversely affect the photosensor, and may be configured so as to have no effect on the lens system 210 effective focal length f. Similarly, the window may act to protect the lens system, and may be configured so as to have little or no effect on the lens system 210 effective focal length f.

In at least some embodiments, camera 200 and folded lens system 210 are configured to provide 14-mm EFL (effective focal length), F/2.8, 26-degree diagonal field of view (DFOV), and a 3.232-mm image circle radius. In an example, non-limiting embodiment of lens system 210, TL1=~4.054 mm, TL2=~11.861 mm, and TTL=~15.915 mm. In some embodiments, folded lens system 210 includes refractive lens elements L1, L2, L3, L4, and L5 (lens elements 201-205), a prism 240; a window 250, and an IR filter arranged along the optical axes AX1 and AX2. In at least some embodiments, window 250 and the IR filter are composed of optical glass materials, and L1, L2, L3, L4, and L5 (lens elements 201-205) and prism 240 are composed of two types of optical plastic materials. In some embodiments, the L1 (201) and prism 240 elements may be composed of the same type of plastic material, and may be molded as a single combined unit or element. In at least some embodiments, window 250 is 0.4 mm thick and the IR filter is 0.3 mm thick. However, note that the values and parameters as given above are examples and are not intended to be limiting.

Figure 8A:
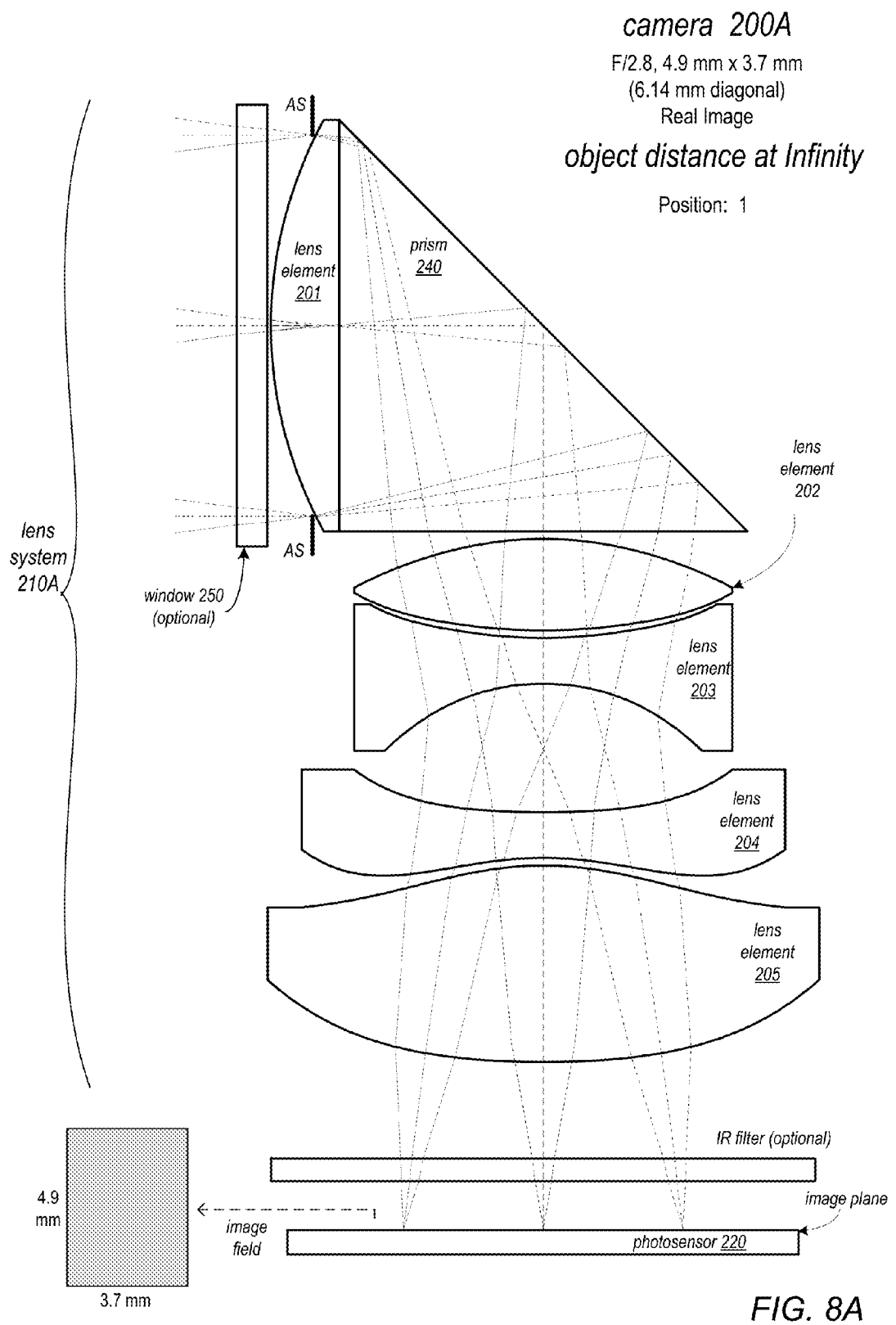
FIGS. 8A and 8B illustrate example lens orientation in a folded lens system as illustrated in FIGS. 5A and 5B for a 4.9 mm×3.7 mm image format compact camera.
Figure 8B:
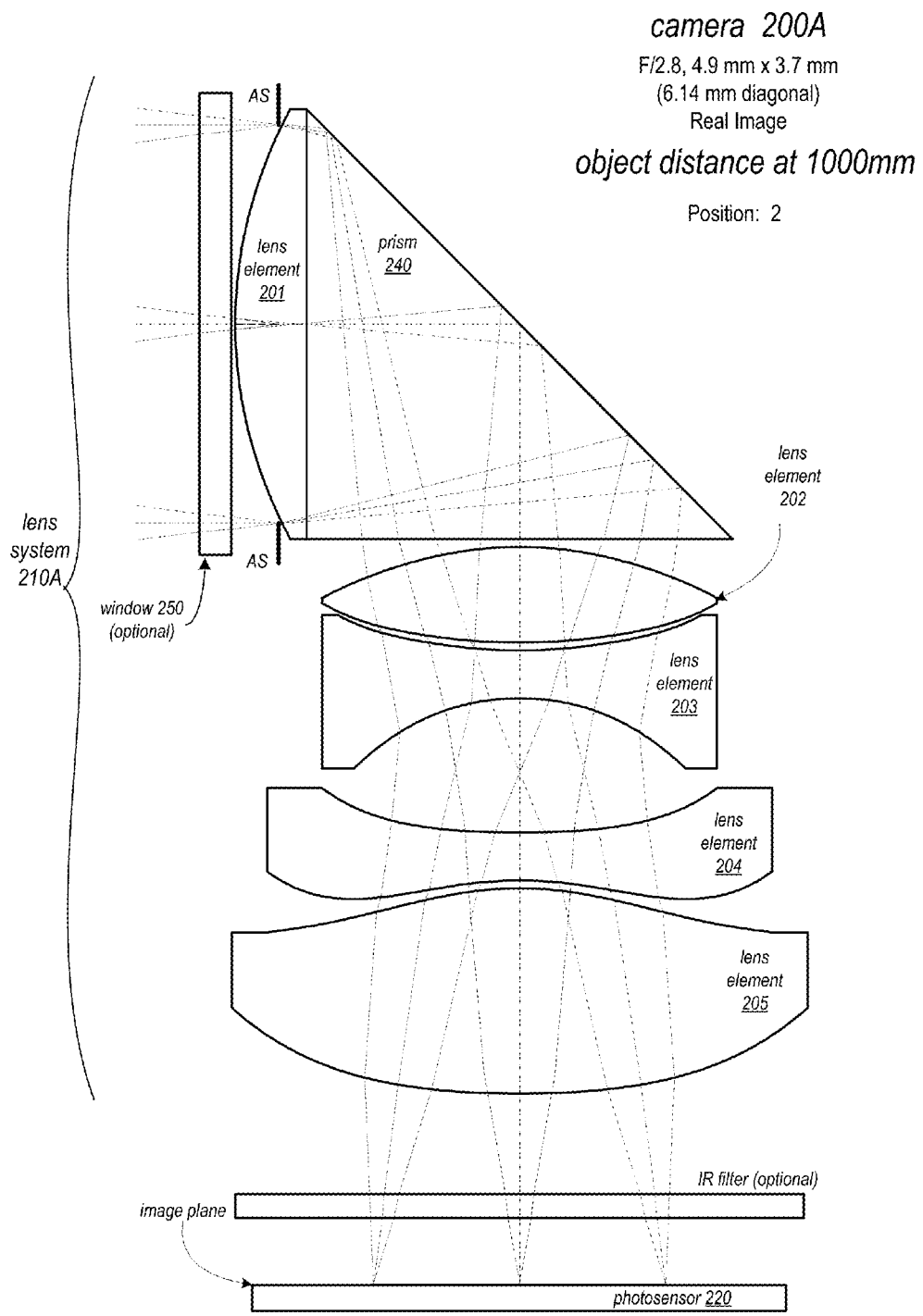

FIGS. 8A and 8B illustrate example lens orientation in a folded lens system as illustrated in FIGS. 5A and 5B for a 4.9 mm×3.7 mm (6.14 mm diagonal) image format compact camera 200A, and show the lens system 210A of camera 200A at focus position 1 (object distance at infinity) and focus position 2 (object distance at 1000 mm), respectively. The rectangle to the left of the photosensor in FIG. 8A represents orientation of the 4.9 mm×3.7 rectangular image field with respect to the camera as shown.

Tables 2A-2E provide example values of various optical and physical parameters of an example embodiment of a camera 200 and lens system 210 as illustrated in FIGS. 5A and 5B. Tables 2A-2E may be referred to as providing an optical prescription for the lens system 210. Referring to Tables 2A-2E, embodiments of lens system 210 cover applications in the visible region of the spectrum from 470 nanometers (nm) to 650 nm with reference wavelength at 555 nm. The optical prescription in Tables 2A-2E provides high image quality at F/2.8 over 470 nm to 650 nm spectrum, for an effective focal length f of 14.0 millimeters (mm), covering 26 degrees field of view (FOV) (13 degrees half FOV). The folded lens system 210, illustrated in FIGS. 5A and 5B and with optical prescription as shown in Tables 2A-2E, has total track length (TTL=TL1+TL2) of 15.465 mm and a telephoto ratio |TTL/f| of 1.105. Lens system 210 is a compact folded imaging system designed for visible spectrum covering 470 nm to 650 nm.

Materials, refractive indices, and Abbe numbers of the lens elements L1-L5 (201-205), window 250, prism 240, and IR filter are given in Table 2B. The choice and application of the materials and optical characteristics for the elements of lens system 210 may enable lens system 210 to be optimized and corrected for chromatic aberrations over the visible region. The materials may be chosen and the refractive power distribution of the elements may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens elements and axial separations, for example as illustrated in Table 2C, to produce well-corrected and balanced minimal residual aberrations.

Figure 7A:
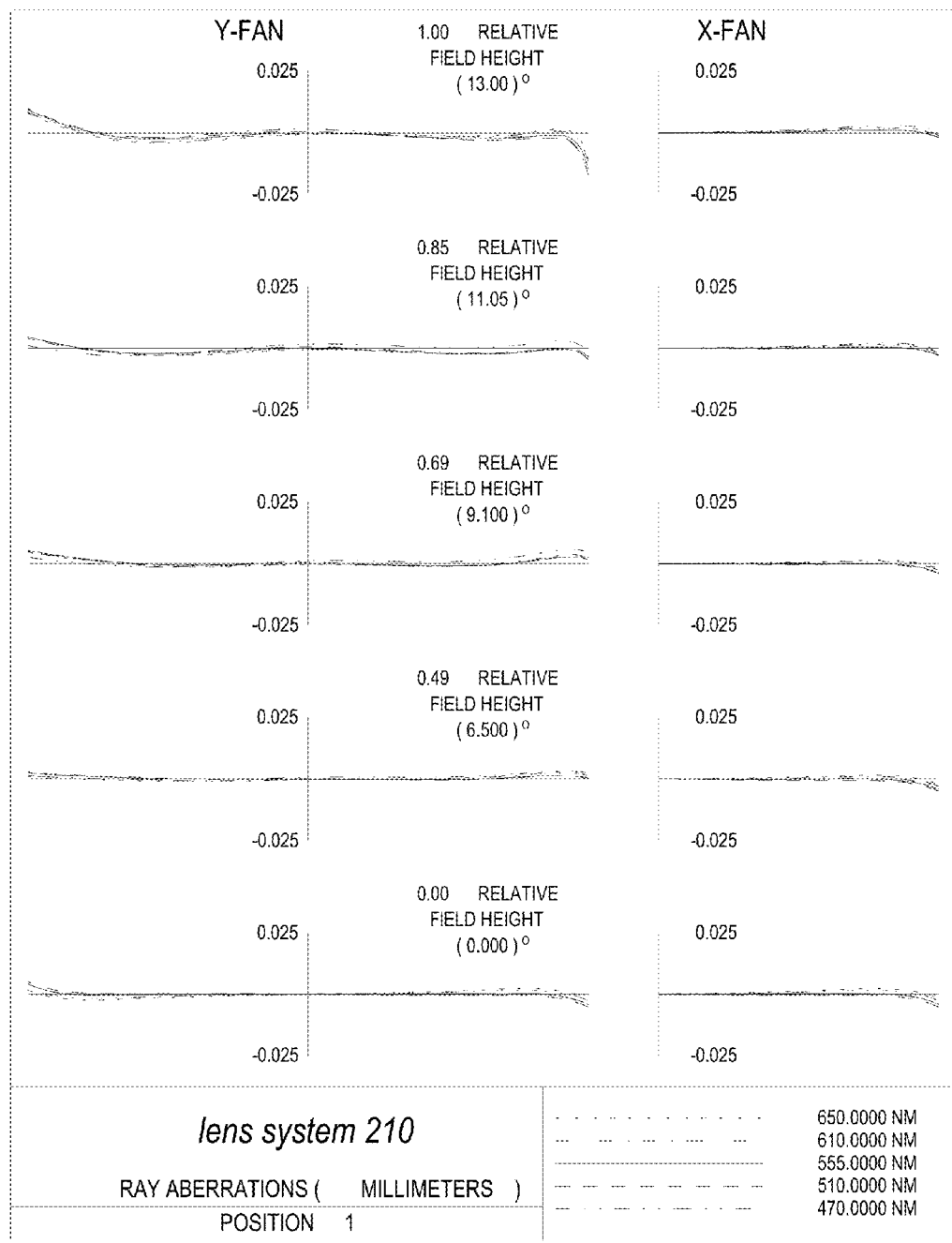
FIGS. 7A and 7B illustrate plots of the polychromatic ray aberration curves over the half field of view and over the visible spectral band ranging 470 nm to 650 nm for a folded lens system as illustrated in FIGS. 5A and 5B.
Figure 7B:
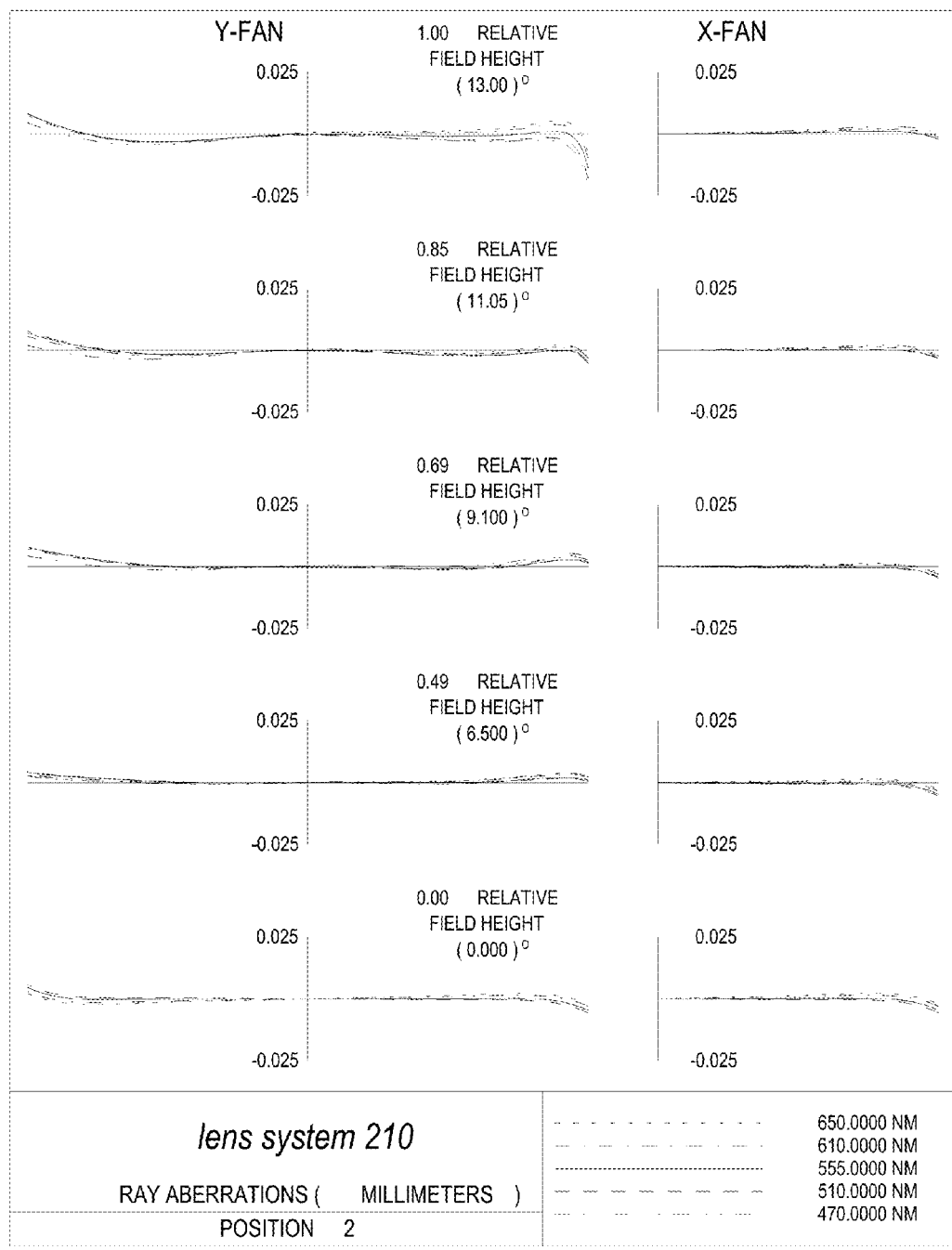

FIGS. 6A and 6B are plots of polychromatic curves of spherical aberration, astigmatism and distortion over the visible band ranging 470 nm to 650 nm for a folded lens system as illustrated in FIGS. 5A and 5B, and show the values at focus position 1 (object distance at infinity) and focus position 2 (object distance at 1000 mm) of the camera 200, respectively. FIGS. 7A and 7B illustrate plots of the polychromatic ray aberration curves over the half field of view and over the visible spectral band ranging 470 nm to 650 nm for a folded lens system as illustrated in FIGS. 5A and 5B.

Referring to Table 2D, the decentering constants of the reflecting surface in the prism element of lens system 210 are listed. The reflecting surface of the prism may be oriented 45 degrees relative to the optical axis of L1 (AX1) and thus the folded optical axis of L2-L5 (AX2) is configured to be 90 degrees relative to the AX1. However, the angular orientation of the reflecting surface of the fold mirror or prism element may be configured to a desired value to suit a desired light path direction and lens system packaging requirements.

In at least some embodiments, camera 200 may include a zooming mechanism for dynamically focusing an object scene from infinity (object distance ≥20 meters) to near object distance, <1000 mm. For example, in some embodiments, lens system 210 including the IR filter may be moved along AX2 relative to the photosensor 220, or alternatively the photosensor 220 may be moved relative to the lens system 210/IR filter, for focusing an object scene from infinity to near distance (<1 meter) at the photosensor 220. The zoom parameters for lens system 210 are listed in Table 2E, with reference to Table 2B and FIG. 5B. The zoom parameters shown in Table 2E for position 1 are the axial thickness or space separation along AX2 between the IR filter (surface 18, or S18) and the image plane at the photosensor 220 (surface 19, or S19) when the object scene distance is at infinity (the optical prescription as listed in Table 2B). The corresponding optical prescription for an object scene at 1000 mm (position 2) is the same as the prescription listed in Table 2B, except that the object distance in surface #0 is replaced by 1000 mm, and the space separation between S18 and S19 given in Table 2B (−0.6343 mm) is replaced by −0.8321 mm. As can be seen in Table 2E, the distance between photosensor 220 and the lens system/IR filter changes by about 0.1978 mm (197.8 microns) for the lens system 210 to zoom and focus an object scene from infinity to <1000 mm.

The optical prescription in Tables 2A-2E describes an example embodiment of a lens system 210 as illustrated in FIGS. 5A and 5B t with refractive powers of the lens elements distributed such that the ratios of the focal lengths f1-f5 of the lens elements L1-L5 relative to the effective focal length f are |f1/f|=0.729, |f2/f|=0.402, |f3/f|=0.218, |f4/f|=0.451, and |f5/f|=0.381. The aspheric coefficients for the surfaces of the lens elements in lens system 210 in the example embodiment are listed in Table 2C. Configuring lens system 210 according to the arrangement of the power distribution of the lens elements, and adjusting the radii of curvature and aspheric coefficient as shown in Tables 2A-2E, the total track length (TTL), of the lens system 210 may be reduced, and aberration of the system may effectively be corrected to obtain optical performance of high image quality resolution, for an object scene at infinity and for an object scene located <1000 mm distance, in a small form factor camera 200.

Figure 9A:
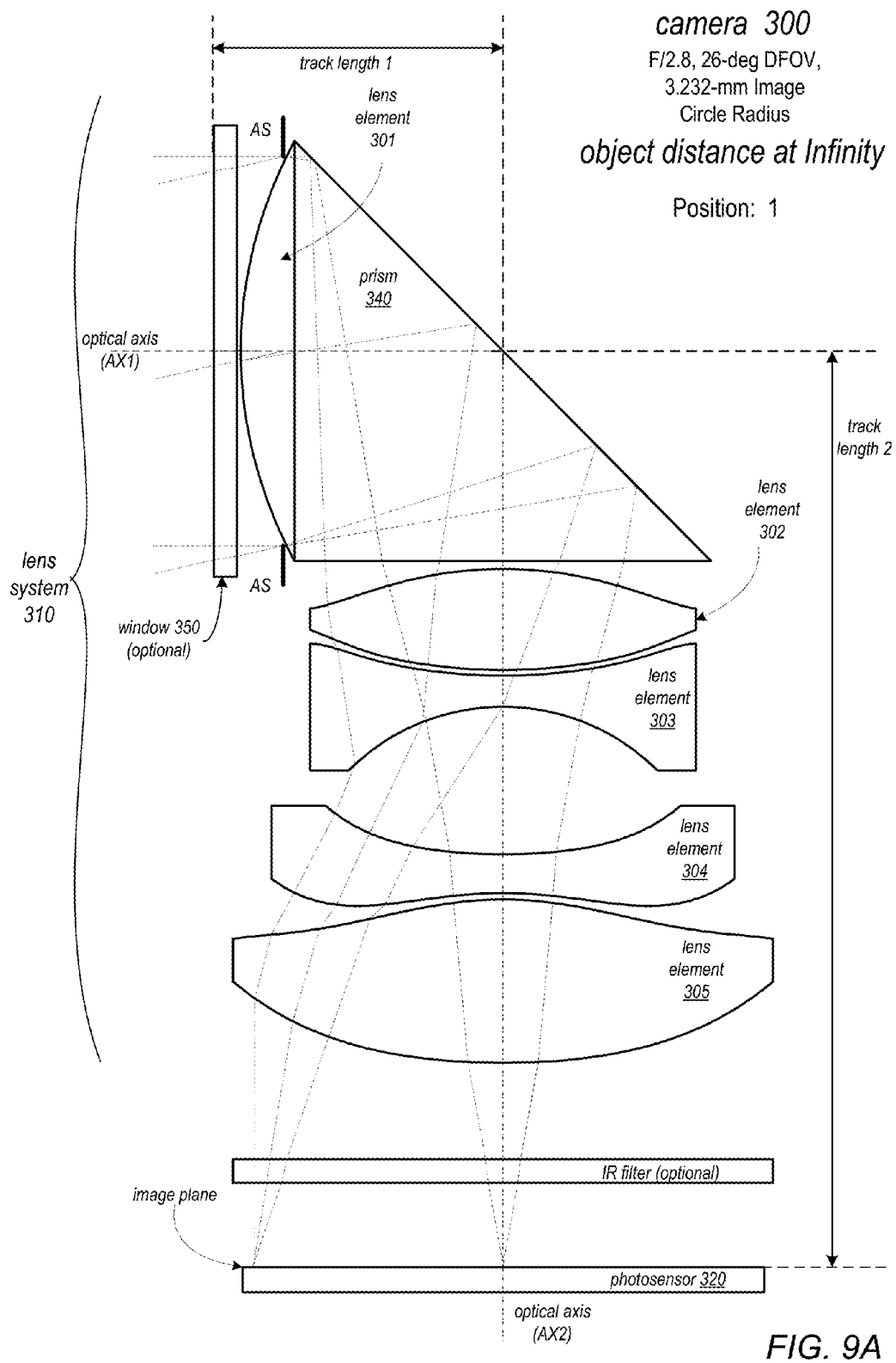
FIGS. 9A and 9B are cross-sectional illustrations of another example embodiment of a compact camera including a folded lens system that includes refractive lens elements and a light path folding element that acts to fold the optical path.
Figure 9B:
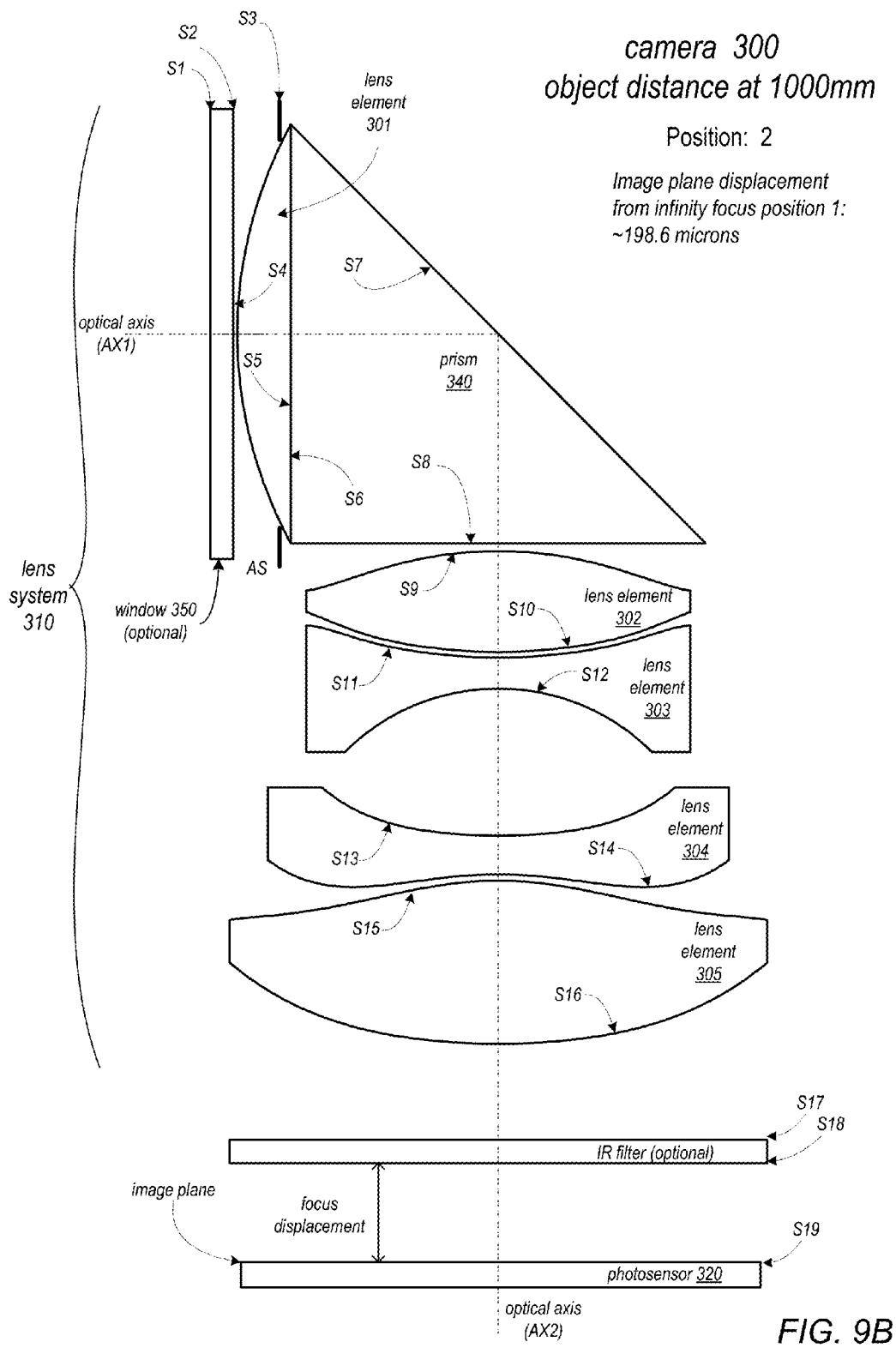

FIGS. 9A and 9B are cross-sectional illustrations of another example embodiment of a compact camera including a folded lens system that includes refractive lens elements and a light path folding element that acts to fold the optical path. FIG. 9A shows the camera 300 at focus position 1 (object distance at infinity), while FIG. 9B shows the camera 300 at focus position 2 (object distance at 1000 mm, image plane displacement from focus position 1 about 198.6 microns). Lens system 310 includes five lens elements (301-305) with refractive power. Arranged along an optical axis AX of the camera 300 from an object side (AX1) to an image side (AX2) are an aperture stop AS, a first lens element L1 (301) having a convex object side surface and focal length f1, a prism 340 that is oriented to change the direction of the incoming light path and to thus fold the optical axis from AX1 to AX2, a second lens element L2 (302) with focal length f2, a third lens element L3 (303) with focal length f3, a fourth lens element L4 (304) with focal length f4, and a fifth lens element L5 (305) with focal length f5. The lens system 310 forms an image at the surface of a photosensor 320. In some embodiments, an infrared (IR) filter may be located between the fifth lens element L5 and the photosensor 320. In some embodiments, a window 350 may be located between the first lens element L1 and the object field. FIG. 9B also shows the surface numbers (S#) of the surfaces of the elements in the camera 300 and lens system 310 as used in the corresponding Tables 3A-3E.

The effective focal length of the lens system 310 is given by f. The total track length (TTL) of the compact folded lens system 310 is the distance along the optical axes AX1 and AX2 between the object side surface of the first element L1 and the image plane, or alternatively between the object side surface of the window 350 and the image plane. Referring to FIGS. 9A and 9B, the TTL is the sum of TL1 and TL2, where TL1 is the axial distance between the front vertex of the object side surface of L1 and the reflecting surface of the prism 340, and TL2 is the axial distance between the reflecting surface of prism 340 and the image plane at photosensor 320. An aperture stop AS, which may for example be located at the front surface of lens element L1, determines the entrance pupil of the lens system 310. The lens system 310 focal ratio of f-number f# is defined as the lens system 310 effective focal length f divided by the entrance pupil diameter. The IR filter may act to block infrared radiation that could damage or adversely affect the photosensor, and may be configured so as to have no effect on the lens system 310 effective focal length f. Similarly, the window may act to protect the lens system, and may be configured so as to have little or no effect on the lens system 310 effective focal length f.

In at least some embodiments, camera 300 and folded lens system 310 are configured to provide 14-mm EFL (effective focal length), F/2.8, 26-degree diagonal field of view (DFOV), and a 3.232-mm image circle radius. In an example, non-limiting embodiment of lens system 310, TL1=~3.75 mm, TL2=~11.77 mm, and TTL=~15.52 mm. In some embodiments, folded lens system 310 includes refractive lens elements L1, L2, L3, L4, and L5 (lens elements 301-305), a prism 340; a window 350, and an IR filter arranged along the optical axes AX1 and AX2. In at least some embodiments, window 350 and the IR filter are composed of optical glass materials, and L1, L2, L3, L4, and L5 (lens elements 301-305) and prism 340 are composed of two types of optical plastic materials. In some embodiments, the L1 (301) and prism 340 elements may be composed of the same type of plastic material, and may be molded as a single combined unit or element (see, e.g., FIG. 13). In at least some embodiments, the window 350 and the IR filter are each 0.3 mm thick. However, note that the values and parameters as given above are examples and are not intended to be limiting.

Figure 12A:
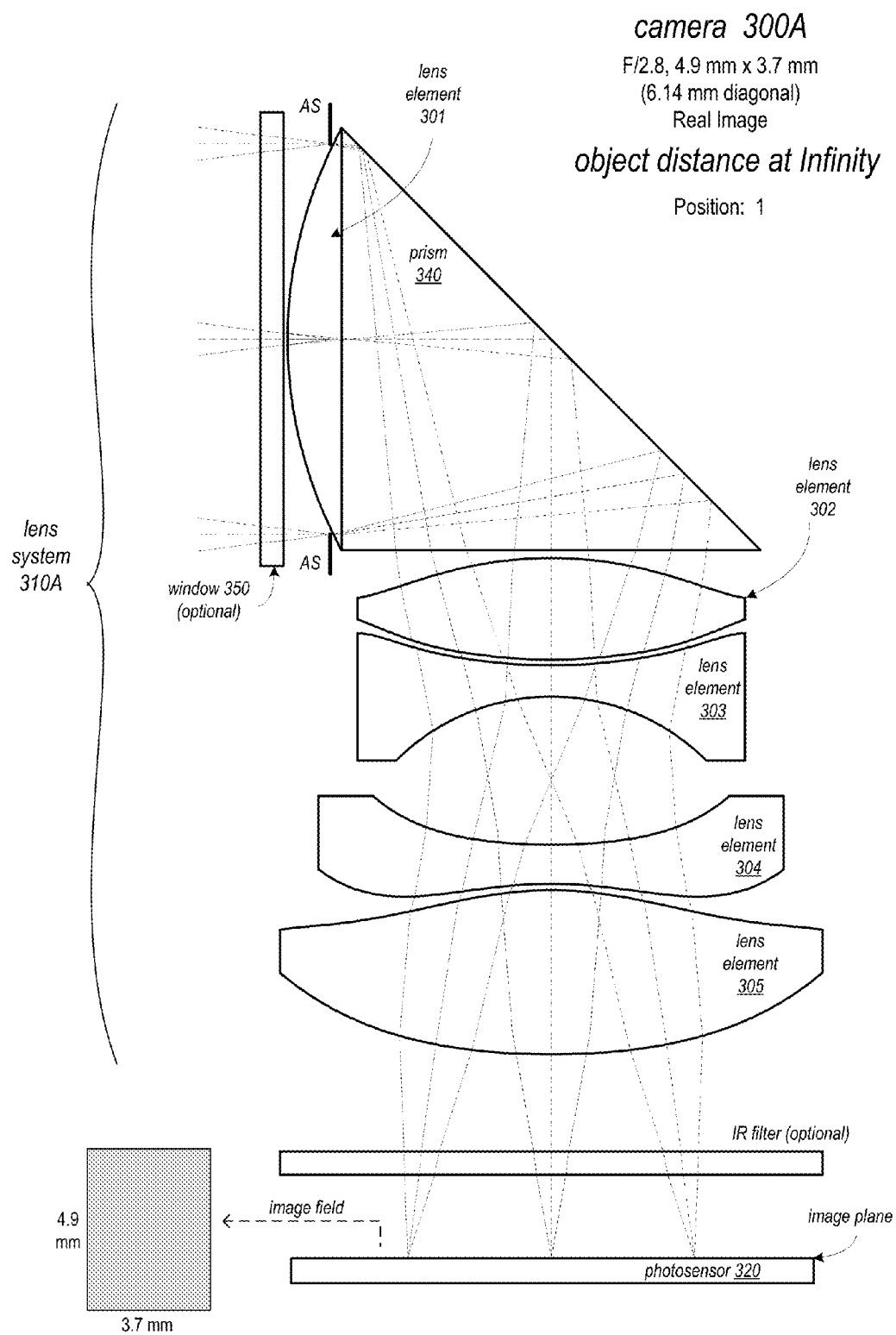
FIGS. 12A and 12B illustrate example lens orientation in a folded lens system as illustrated in FIGS. 9A and 9B for a 4.9 mm×3.7 mm image format compact camera.
Figure 12B:
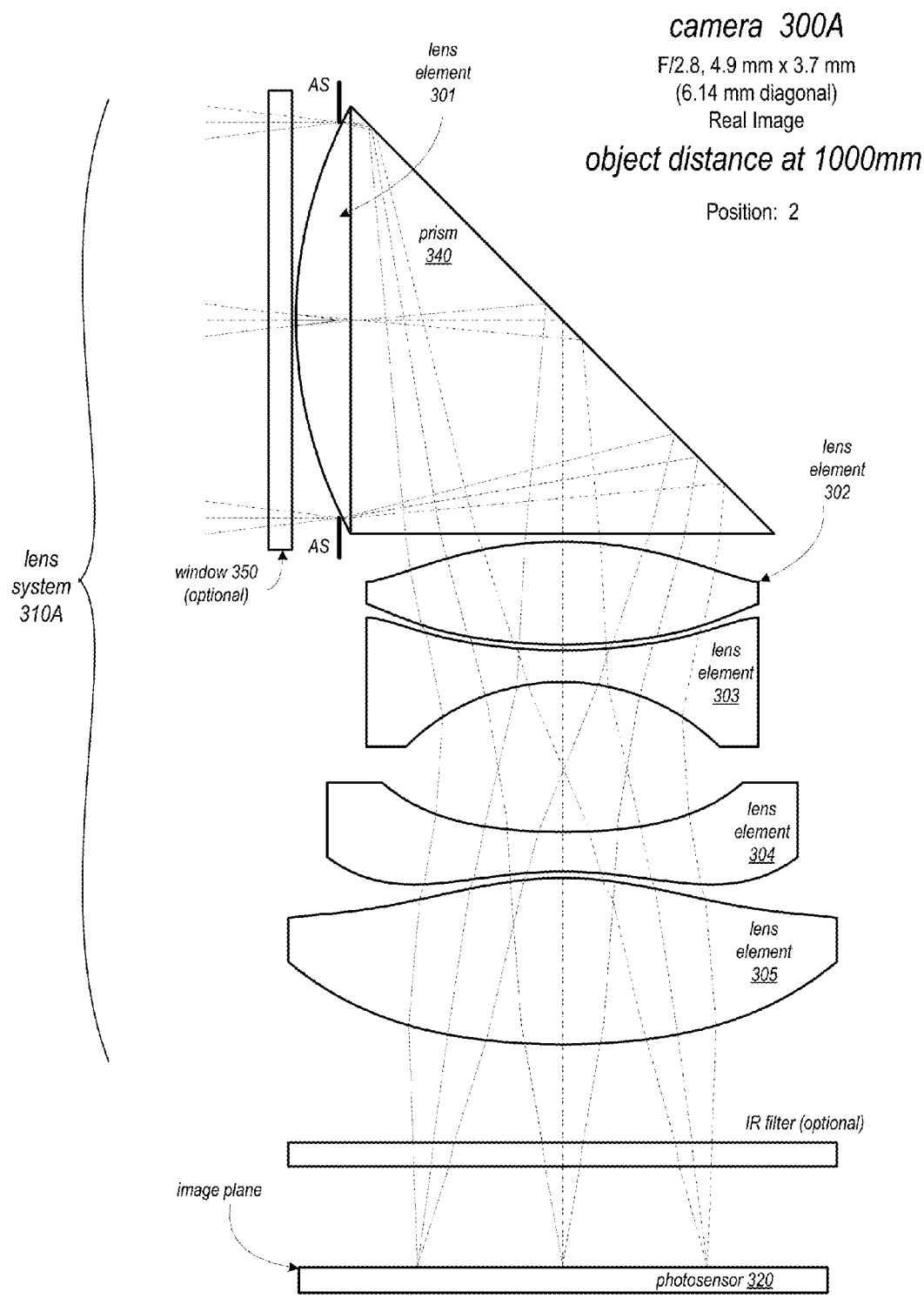

FIGS. 12A and 12B illustrate example lens orientation in a folded lens system as illustrated in FIGS. 9A and 9B for a 4.9 mm×3.7 mm (6.14 mm diagonal) image format compact camera 300A, and show the lens system 310A of camera 300A at focus position 1 (object distance at infinity) and focus position 2 (object distance at 1000 mm), respectively. The rectangle to the left of the photosensor in FIG. 12A represents orientation of the 4.9 mm×3.7 rectangular image field with respect to the camera as shown.

Tables 3A-3E provide example values of various optical and physical parameters of an example embodiment of a camera 300 and lens system 310 as illustrated in FIGS. 9A and 9B. Tables 3A-3E may be referred to as providing an optical prescription for the lens system 310. Referring to Tables 3A-3E, embodiments of lens system 310 cover applications in the visible region of the spectrum from 470 nanometers (nm) to 650 nm with reference wavelength at 555 nm. The optical prescription in Tables 3A-3E provides high image quality at F/2.8 over 470 nm to 650 nm spectrum, for an effective focal length f of 14.0 millimeters (mm), covering 26 degrees field of view (FOV) (13 degrees half FOV). The folded lens system 310, illustrated in FIGS. 9A and 9B and with optical prescription as shown in Tables 3A-3E, has total track length (TTL=TL1+TL2) of 15.166 mm and a telephoto ratio |TTL/f| of 1.083. Lens system 310 is a compact folded imaging system designed for visible spectrum covering 470 nm to 650 nm.

Materials, refractive indices, and Abbe numbers of the lens elements L1-L5 (301-305), window 350, prism 340, and IR filter are given in Table 3B. The choice and application of the materials and optical characteristics for the elements of lens system 310 may enable lens system 310 to be optimized and corrected for chromatic aberrations over the visible region. The materials may be chosen and the refractive power distribution of the elements may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens elements and axial separations, for example as illustrated in Table 3C, to produce well-corrected and balanced minimal residual aberrations.

Figure 11A:
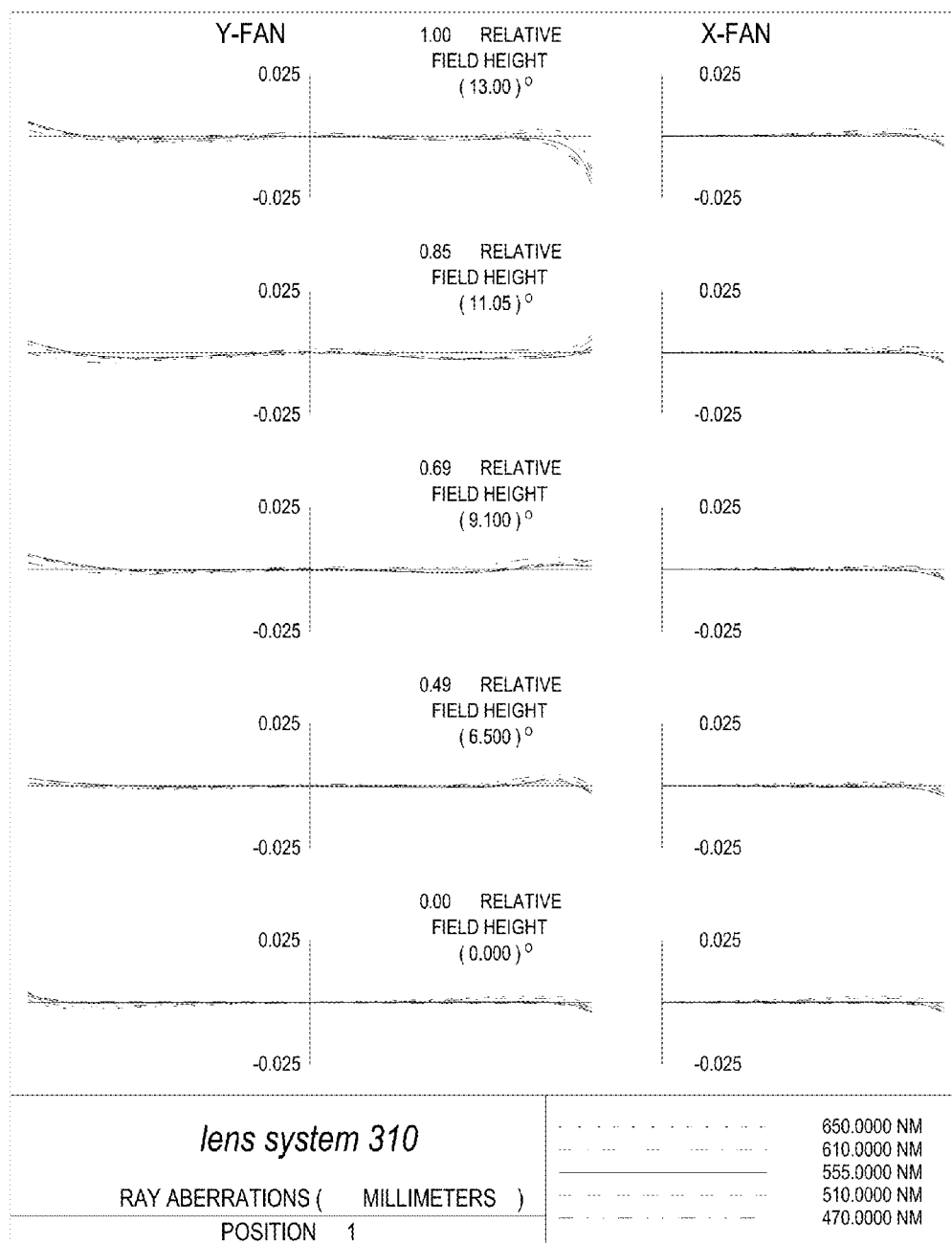
FIGS. 11A and 11B illustrate plots of the polychromatic ray aberration curves over the half field of view and over the visible spectral band ranging 470 nm to 650 nm for a folded lens system as illustrated in FIGS. 9A and 9B.
Figure 11B:
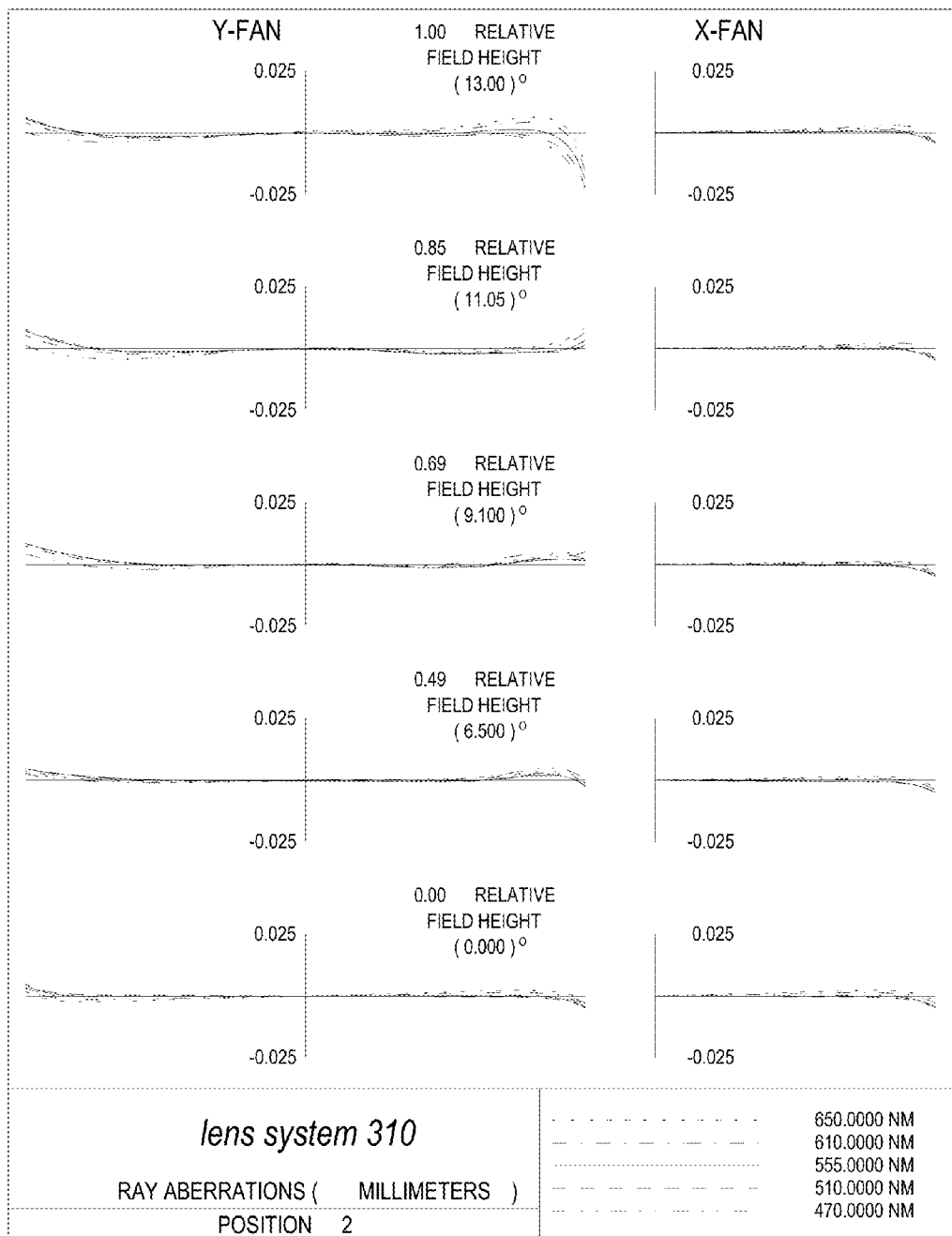

FIGS. 10A and 10B are plots of polychromatic curves of spherical aberration, astigmatism and distortion over the visible band ranging 470 nm to 650 nm for a folded lens system as illustrated in FIGS. 9A and 9B, and show the values at focus position 1 (object distance at infinity) and focus position 2 (object distance at 1000 mm) of the camera 300, respectively. FIGS. 11A and 11B illustrate plots of the polychromatic ray aberration curves over the half field of view and over the visible spectral band ranging 470 nm to 650 nm for a folded lens system as illustrated in FIGS. 9A and 9B.

Referring to Table 3D, the decentering constants of the reflecting surface in the prism element of lens system 310 are listed. The reflecting surface of the prism may be oriented 45 degrees relative to the optical axis of L1 (AX1) and thus the folded optical axis of L2-L5 (AX2) is configured to be 90 degrees relative to the AX1. However, the angular orientation of the reflecting surface of the fold mirror or prism element may be configured to a desired value to suit a desired light path direction and lens system packaging requirements.

In at least some embodiments, camera 300 may include a zooming mechanism for dynamically focusing an object scene from infinity (object distance ≥20 meters) to near object distance, <1000 mm. For example, in some embodiments, lens system 310 including the IR filter may be moved along AX2 relative to the photosensor 320, or alternatively the photosensor 320 may be moved relative to the lens system 310/IR filter, for focusing an object scene from infinity to near distance (<1 meter) at the photosensor 320. The zoom parameters for lens system 310 are listed in Table 3E, with reference to Table 3B and FIG. 9B. The zoom parameters shown in Table 3E for position 1 are the axial thickness or space separation along AX2 between the IR filter (surface 18, or S18) and the image plane at the photosensor 320 (surface 19, or S19) when the object scene distance is at infinity (the optical prescription as listed in Table 3B). The corresponding optical prescription for an object scene at 1000 mm (position 2) is the same as the prescription listed in Table 3B, except that the object distance in surface #0 is replaced by 1000 mm, and the space separation between S18 and S19 given in Table 3B (−1.0762 mm) is replaced by −1.2748 mm. As can be seen in Table 3E, the distance between photosensor 320 and the IR filter/lens system 310 changes by about 0.1986 mm (198.6 microns) for the lens system 310 to zoom and focus an object scene from infinity to <1000 mm.

The optical prescription in Tables 3A-3E describes an example embodiment of a lens system 310 as illustrated in FIGS. 9A and 9B with refractive powers of the lens elements distributed such that the ratios of the focal lengths f1-f5 of the lens elements L1-L5 relative to the effective focal length f are |f1/f|=0.716, |f2/f|=0.390, f3/f=0.221, |f4/f|=0.417, and |f5/f|=0.373. The aspheric coefficients for the surfaces of the lens elements in lens system 310 in the example embodiment are listed in Table 3C. Configuring lens system 310 according to the arrangement of the power distribution of the lens elements, and adjusting the radii of curvature and aspheric coefficient as shown in Tables 3A-3E, the total track length (TTL), of the lens system 310 may be reduced, and aberration of the system may effectively be corrected to obtain optical performance of high image quality resolution, for an object scene at infinity and for an object scene located <1000 mm distance, in a small form factor camera 300.

FIG. 13 is a cross-sectional illustration of another example embodiment of a compact camera 300B including a folded lens system 310B that includes refractive lens elements and a light path folding element that acts to fold the optical path, and is a variation of the folded lens system 310 as illustrated in FIGS. 9A and 9B. In some embodiments, one or more of the lens elements may be fused or integrated with the prism. In FIG. 13, for example, lens 301B and prism 340B are molded into a composite unit element (L1-Prism) and are used as the light path folding mechanism for folding the light optical path of the camera 300B. FIG. 13 also shows the surface numbers (S#) of the surfaces of the elements in the camera 300B and lens system 310B as used in the corresponding Tables 4A-4E.

Tables 4A-4E provide example values of various optical and physical parameters of an example embodiment of a camera 300B and lens system 310B as illustrated in FIG. 13. Tables 4A-4E may be referred to as providing an optical prescription for the lens system 310B. The optical prescription in Tables 4A-4E describes an example embodiment of a lens system 310B as illustrated in FIG. 13 with refractive powers of the lens elements distributed such that the ratios of the focal lengths f1-f5 of the lens elements L1-L5 relative to the effective focal length f are |f1/f|=0.716, |f2/f|=0.390, |f3/f|=0.221, |f4/f|=0.417, and |f5/f|=0.373. Note that Tables 4A-4E are substantially similar to Tables 3A-3E, and optical characteristics of lens systems 310 and 310B will be substantially the same, as lens system 310B of FIG. 13 is a variation of lens system 310 of FIGS. 9A-9B in which lens L1 is fused or integrated with the prism to form L1-Prism. The differences between Tables 4A-4E and Tables 3A-3E are that surfaces S5 and S6 as shown in FIG. 9B are not present in FIG. 13, and the surfaces in FIG. 13 have been renumbered as reflected in Tables 4A-4E.

Figure 14A:
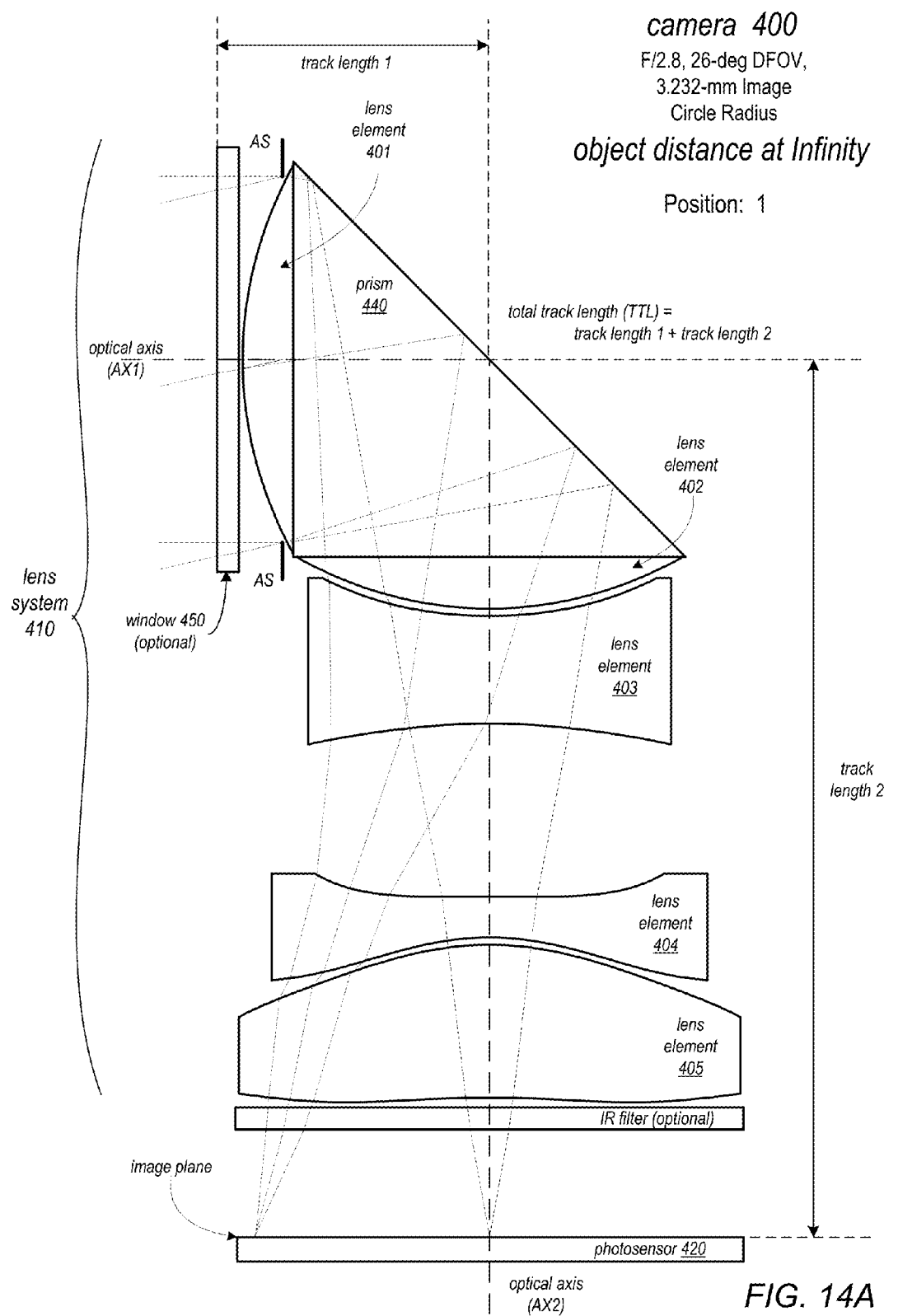
FIGS. 14A and 14B are cross-sectional illustrations of another example embodiment of a compact camera including a folded lens system that includes refractive lens elements and a light path folding element that acts to fold the optical path.
Figure 14B:
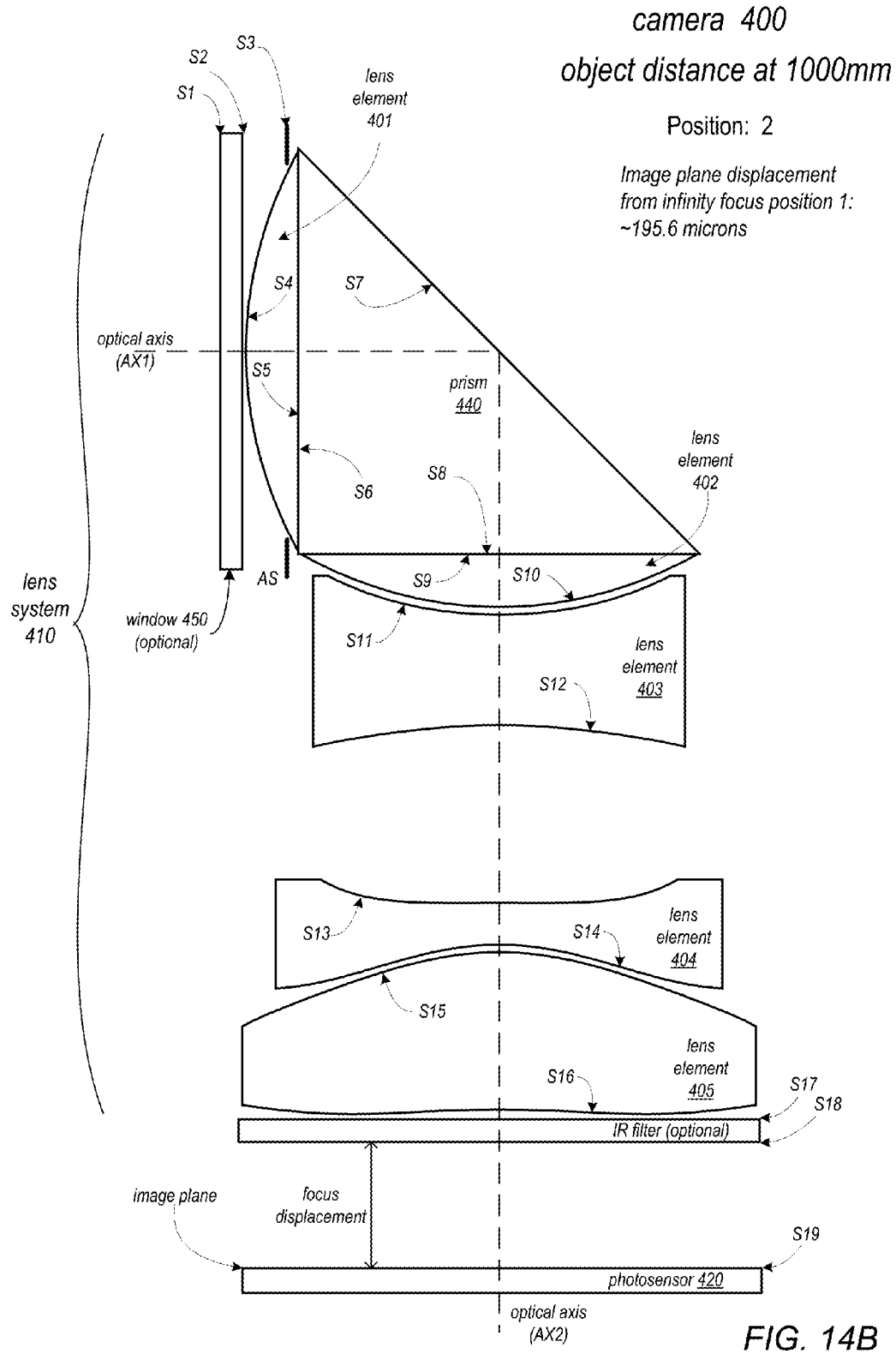

FIGS. 14A and 14B are cross-sectional illustrations of another example embodiment of a compact camera including a folded lens system that includes refractive lens elements and a light path folding element that acts to fold the optical path. FIG. 14A shows the camera 400 at focus position 1 (object distance at infinity), while FIG. 14B shows the camera 400 at focus position 2 (object distance at 1000 mm, image plane displacement from focus position 1 about 195.6 microns). Lens system 410 includes five lens elements (401-405) with refractive power. Arranged along an optical axis AX of the camera 300 from an object side (AX1) to an image side (AX2) are an aperture stop AS, a first lens element L1 (401) having a convex object side surface and focal length f1, a prism 440 that is oriented to change the direction of the incoming light path and to thus fold the optical axis from AX1 to AX2, a second lens element L2 (302) with focal length f2, a third lens element L3 (403) with focal length f3, a fourth lens element L4 (404) with focal length f4, and a fifth lens element L5 (405) with focal length f5. The lens system 410 forms an image at the surface of a photosensor 420. In some embodiments, an infrared (IR) filter may be located between the fifth lens element L5 and the photosensor 420. In some embodiments, a window 450 may be located between the first lens element L1 and the object field. FIG. 14B also shows the surface numbers (S#) of the surfaces of the elements in the camera 400 and lens system 410B as used in the corresponding Tables 5A-5E.

The effective focal length of the lens system 410 is given by f. The total track length (TTL) of the compact folded lens system 410 is the distance along the optical axes AX1 and AX2 between the object side surface of the first element L1 and the image plane, or alternatively between the object side surface of the window 450 and the image plane. Referring to FIGS. 14A and 14B, the TTL is the sum of TL1 and TL2, where TL1 is the axial distance between the front vertex of the object side surface of L1 and the reflecting surface of the prism 440, and TL2 is the axial distance between the reflecting surface of prism 440 and the image plane at photosensor 420. An aperture stop AS, which may for example be located at the front surface of lens element L1, determines the entrance pupil of the lens system 410. The lens system 410 focal ratio of f-number f# is defined as the lens system 410 effective focal length f divided by the entrance pupil diameter. The IR filter may act to block infrared radiation that could damage or adversely affect the photosensor, and may be configured so as to have no effect on the lens system 410 effective focal length f. Similarly, the window may act to protect the lens system, and may be configured so as to have little or no effect on the lens system 410 effective focal length f.

In at least some embodiments, camera 400 and folded lens system 410 are configured to provide 14-mm EFL (effective focal length), F/2.8, 26-degree diagonal field of view (DFOV), and a 3.232-mm image circle radius. In at least some embodiments of lens system 410, TTL of lens system 410 is within a range of ~8 mm to ~16 mm. In at least some embodiments, folded lens system 410 includes refractive lens elements L1, L2, L3, L4, and L5 (lens elements 401-405), a prism 440; a window 450, and an IR filter arranged along the optical axes AX1 and AX2. In at least some embodiments, window 450 and the IR filter are composed of optical glass materials, and L1, L2, L3, L4, and L5 (lens elements 401-405) and prism 440 are composed of two types of optical plastic materials. In some embodiments, L1 (401) and L2 (402) may be substantially identical in shape and size. In some embodiments, the L1 (401), L2 (402), and prism 440 elements may be composed of the same type of plastic material, and may be molded as a single combined unit or element (see, e.g., FIG. 18). In at least some embodiments, the composite molded piece of L1 (401), L2 (402), and prism 440 may be viewed as a modified half of a ball lens. In at least some embodiments, the window 450 and the IR filter are each 0.3 mm thick. However, note that the values and parameters as given above are examples and are not intended to be limiting.

Figure 17A:
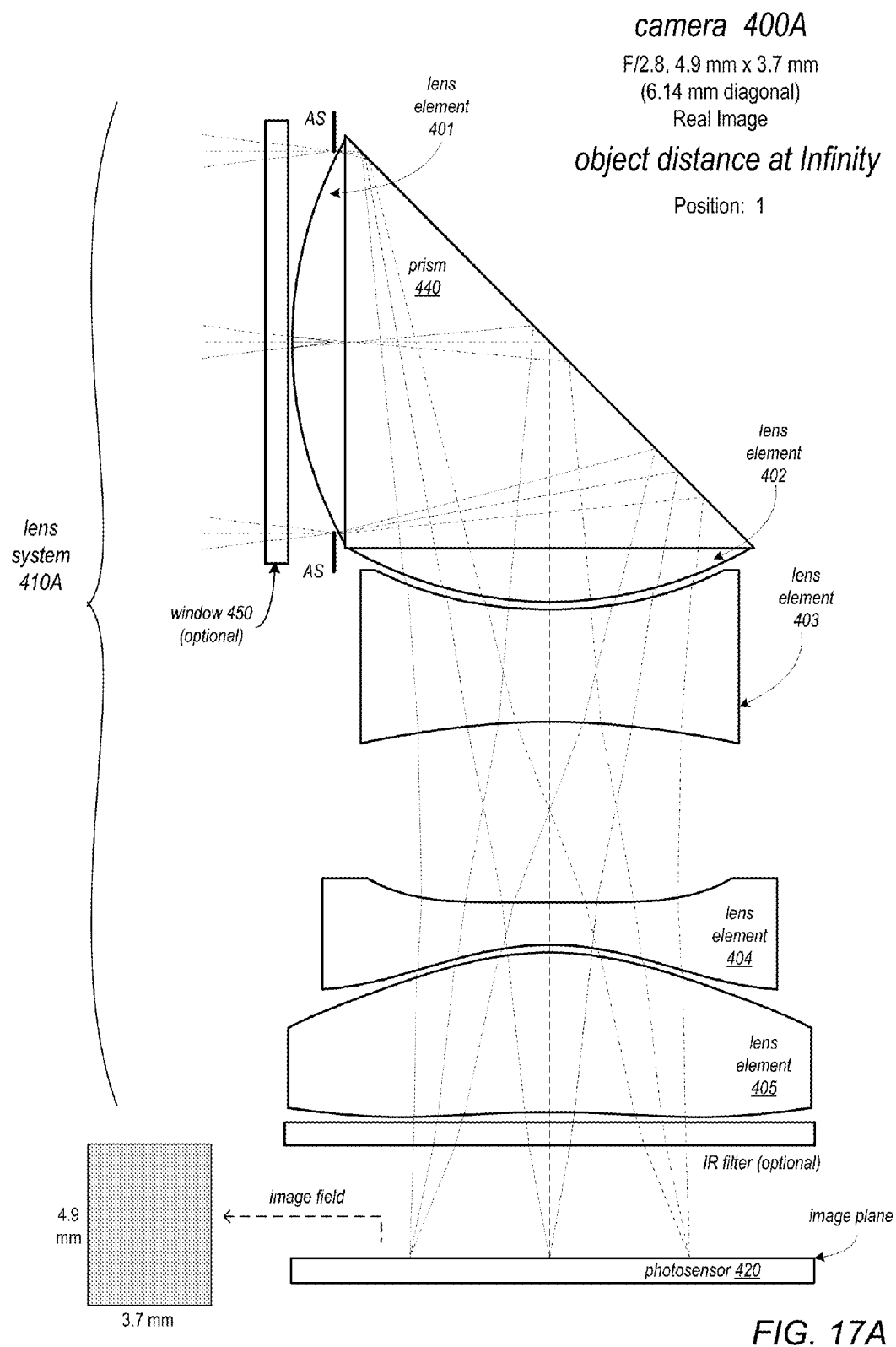
FIGS. 17A and 17B illustrate example lens orientation in a folded lens system as illustrated in FIGS. 14A and 14B for a 4.9 mm×3.7 mm image format compact camera.
Figure 17B:
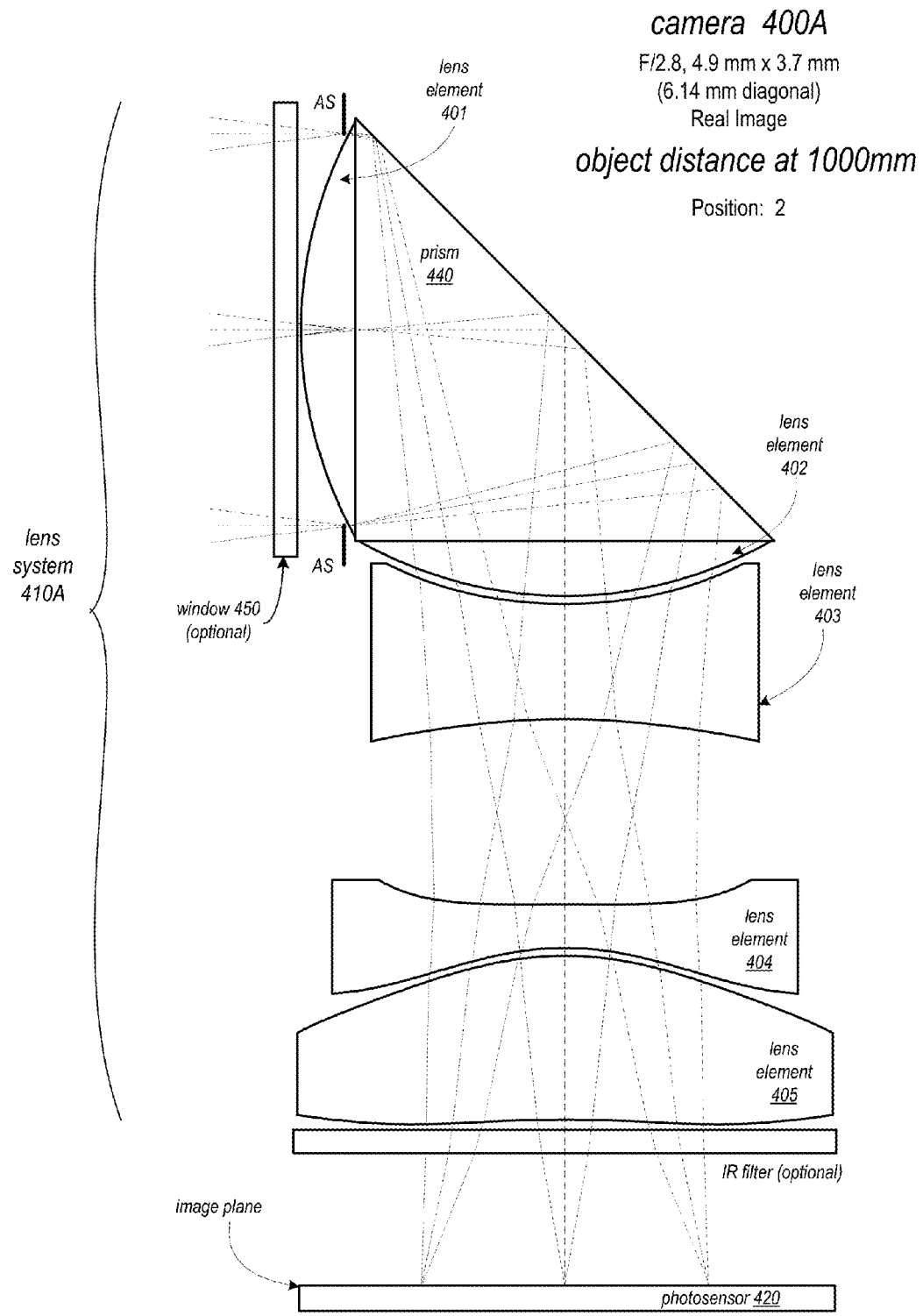

FIGS. 17A and 17B illustrate example lens orientation in a folded lens system as illustrated in FIGS. 14A and 14B for a 4.9 mm×3.7 mm (6.14 mm diagonal) image format compact camera 400A, and show the lens system 410a of camera 400A at focus position 1 (object distance at infinity) and focus position 2 (object distance at 1000 mm), respectively. The rectangle to the left of the photosensor in FIG. 17A represents orientation of the 4.9 mm×3.7 rectangular image field with respect to the camera as shown.

Tables 5A-5E provide example values of various optical and physical parameters of an example embodiment of a camera 400 and lens system 410 as illustrated in FIGS. 14A and 14B. Tables 5A-5E may be referred to as providing an optical prescription for the lens system 410. Referring to Tables 5A-5E, embodiments of lens system 410 cover applications in the visible region of the spectrum from 470 nanometers (nm) to 650 nm with reference wavelength at 555 nm. The optical prescription in Tables 5A-5E provides high image quality at F/2.8 over 470 nm to 650 nm spectrum, for an effective focal length f of 14.0 millimeters (mm), covering 26 degrees field of view (FOV) (13 degrees half FOV). The folded lens system 410, illustrated in FIGS. 14A and 14B and with optical prescription as shown in Tables 5A-5E, has total track length (TTL=TL1+TL2) of 15.4 mm and a telephoto ratio |TTL/f| of 1.100. Lens system 410 is a compact folded imaging system designed for visible spectrum covering 470 nm to 650 nm.

Materials, refractive indices, and Abbe numbers of the lens elements L1-L5 (401-405), window 450, prism 440, and IR filter are given in Table 5B. The choice and application of the materials and optical characteristics for the elements of lens system 410 may enable lens system 410 to be optimized and corrected for chromatic aberrations over the visible region. The materials may be chosen and the refractive power distribution of the elements may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens elements and axial separations, for example as illustrated in Table 5C, to produce well-corrected and balanced minimal residual aberrations.

Figure 16A:
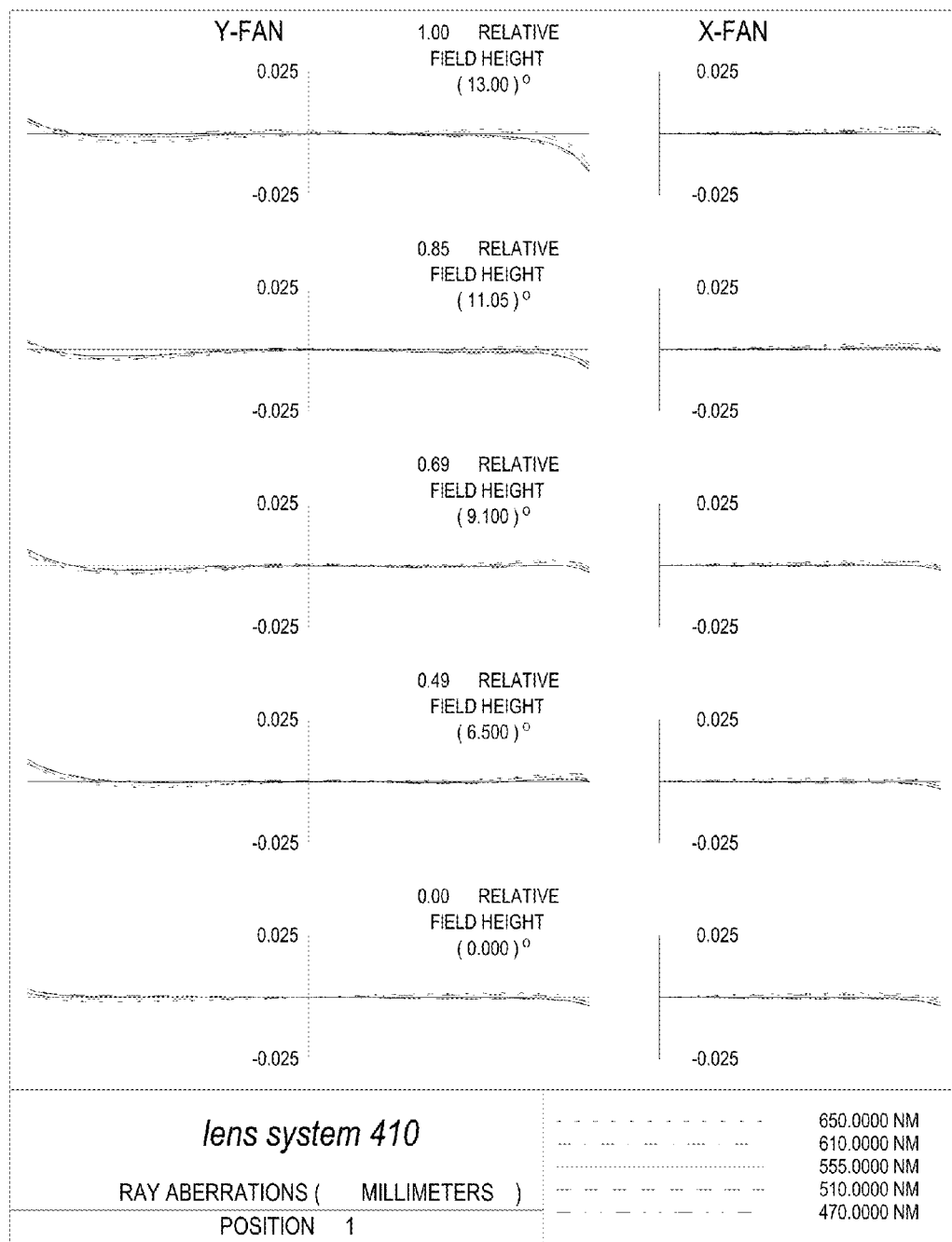
FIGS. 16A and 16B illustrate plots of the polychromatic ray aberration curves over the half field of view and over the visible spectral band ranging 470 nm to 650 nm for a folded lens system as illustrated in FIGS. 14A and 14B.
Figure 16B:
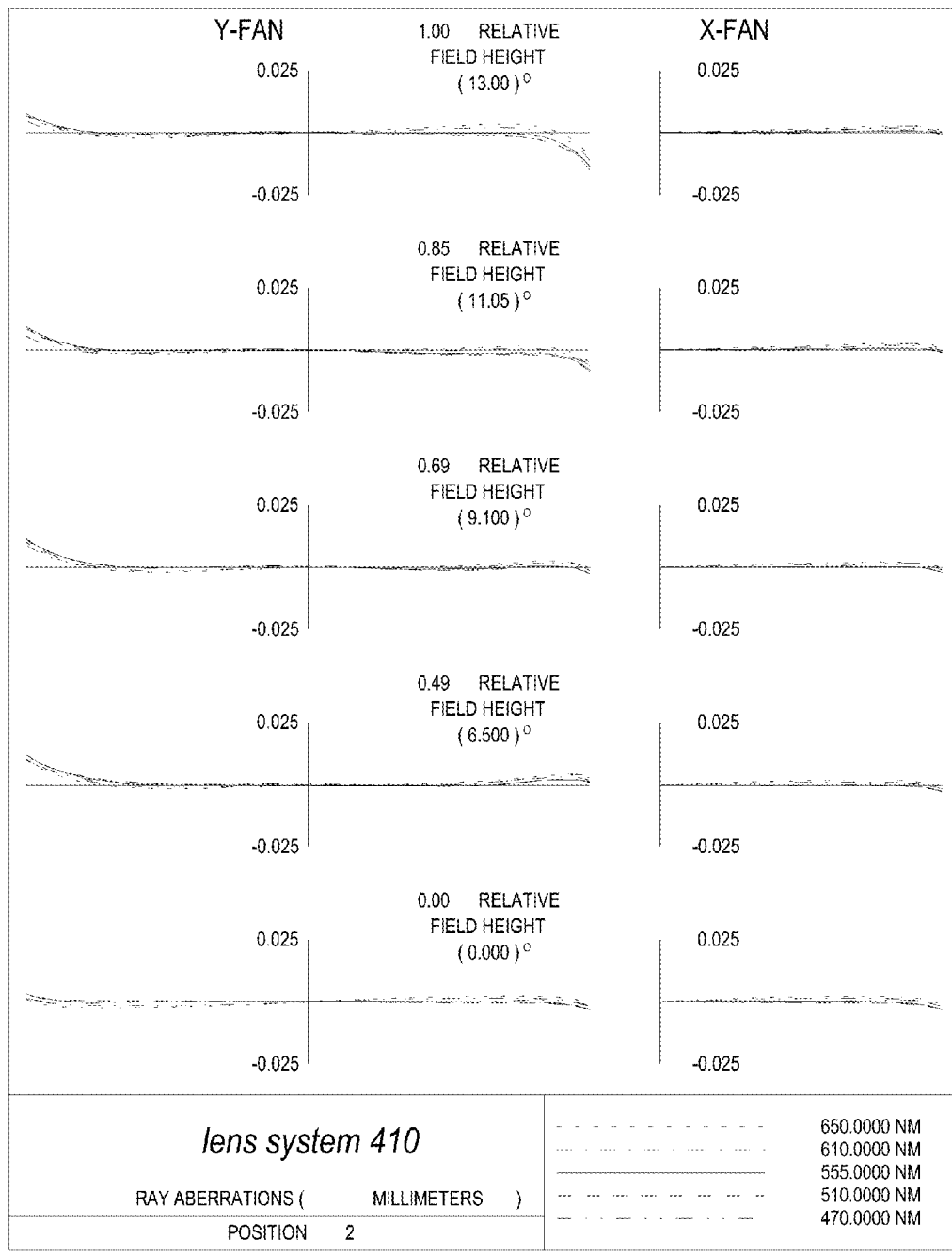

FIGS. 15A and 15B are plots of polychromatic curves of spherical aberration, astigmatism and distortion over the visible band ranging 470 nm to 650 nm for a folded lens system as illustrated in FIGS. 14A and 14B, and show the values at focus position 1 (object distance at infinity) and focus position 2 (object distance at 1000 mm) of the camera 100, respectively. FIGS. 16A and 16B illustrate plots of the polychromatic ray aberration curves over the half field of view and over the visible spectral band ranging 470 nm to 650 nm for a folded lens system as illustrated in FIGS. 14A and 14B.

Referring to Table 5D, the decentering constants of the reflecting surface in the prism element of lens system 410 are listed. The reflecting surface of the prism may be oriented 45 degrees relative to the optical axis of L1 (AX1) and thus the folded optical axis of L2-L5 (AX2) is configured to be 90 degrees relative to the AX1. However, the angular orientation of the reflecting surface of the fold mirror or prism element may be configured to a desired value to suit a desired light path direction and lens system packaging requirements.

In at least some embodiments, camera 400 may include a zooming mechanism for dynamically focusing an object scene from infinity (object distance ≥20 meters) to near object distance, <1000 mm. For example, in some embodiments, lens system 410 including the IR filter may be moved along AX2 relative to the photosensor 420, or alternatively the photosensor 420 may be moved relative to the lens system 410/IR filter, for focusing an object scene from infinity to near distance (<1 meter) at the photosensor 420. The zoom parameters for lens system 410 are listed in Table 5E, with reference to Table 5B and FIG. 14B. The zoom parameters shown in Table 5E for position 1 are the axial thickness or space separation along AX2 between the IR filter (surface 18, or S18) and the image plane at the photosensor 420 (surface 19, or S19) when the object scene distance is at infinity (the optical prescription as listed in Table 5B). The corresponding optical prescription for an object scene at 1000 mm (position 2) is the same as the prescription listed in Table 5B, except that the object distance in surface #0 is replaced by 1000 mm, and the space separation between S18 and S19 given in Table 5B (−1.4854 mm) is replaced by −1.6810 mm. As can be seen in Table 3E, the distance between photosensor 320 and the IR filter/lens system 310 changes by about 0.1956 mm (195.6 microns) for the lens system 310 to zoom and focus an object scene from infinity to <1000 mm.

The optical prescription in Tables 5A-5E describes an example embodiment of a lens system 410 as illustrated in FIGS. 14A and 14B with refractive powers of the lens elements distributed such that the ratios of the focal lengths f1-f5 of the lens elements L1-L5 relative to the effective focal length f are |f1/f|=0.693, |f2/f|=0.693, f3/f=0.400, |f4/f|=0.515, and f5/f|=0.614. The aspheric coefficients for the surfaces of the lens elements in lens system 410 in the example embodiment are listed in Table 5C. Configuring lens system 410 according to the arrangement of the power distribution of the lens elements, and adjusting the radii of curvature and aspheric coefficient as shown in Tables 5A-5E, the total track length (TTL), of the lens system 410 may be reduced, and aberration of the system may effectively be corrected to obtain optical performance of high image quality resolution, for an object scene at infinity and for an object scene located <1000 mm distance, in a small form factor camera 400.

FIG. 18 is a cross-sectional illustration of another example embodiment of a compact camera 400B including a folded lens system 410B that includes refractive lens elements and a light path folding element that acts to fold the optical path, and is a variation of the folded lens system 410 as illustrated in FIGS. 14A and 14B. In some embodiments, one or more of the lens elements may be fused or integrated with the prism. In FIG. 18, lenses 401B, 402B and prism 440B are molded into a composite unit element and are used as the light path folding mechanism for folding the light optical path. In at least some embodiments, L1 (401B) and L2 (402B) may be substantially identical in shape and size. In some embodiments, the L1 (401B), L2 (402B), and prism 440B elements may be composed of the same type of plastic material, and may be molded as a single combined unit or element. In at least some embodiments, the composite molded piece of L1 (401B), L2 (402B), and prism 440B may be viewed as a modified half of a ball lens. FIG. 18 also shows the surface numbers (S#) of the surfaces of the elements in the camera 400B and lens system 410B as used in the corresponding Tables 6A-6E.

Tables 6A-6E provide example values of various optical and physical parameters of an example embodiment of a camera 400B and lens system 410B as illustrated in FIG. 18. Tables 6A-6E may be referred to as providing an optical prescription for the lens system 410B. The optical prescription in Tables 6A-6E describes an example embodiment of a lens system 410B as illustrated in FIG. 18 with refractive powers of the lens elements distributed such that the ratios of the focal lengths f1-f5 of the lens elements L1-L5 relative to the effective focal length f are |f1/f|=0.693, |f2/f|=0.693, |f3/f|=0.400, |f4/f|=0.515, and f5/f|=0.614. Note that Tables 6A-6E are substantially similar to Tables 5A-5E, and optical characteristics of lens systems 410 and 410B will be substantially the same, as lens system 410B of FIG. 18 is a variation of lens system 410 of FIGS. 14A-14B in which L1, L2, and the prism are fused to form L1-Prism-L2. The differences between Tables 6A-6E and Tables 5A-5E are that surfaces S5, S6, S8 and S9 as shown in FIG. 14B are not present in FIG. 18, and the surfaces in FIG. 18 have been renumbered as reflected in Tables 6A-6E.

FIGS. 19A through 19E are cross-sectional illustrations of another example embodiment of a compact camera including a folded lens system that includes refractive lens elements and a light path folding element that acts to fold the optical path, and that also includes an adjustable aperture stop. As illustrated by the example camera 500 in FIGS. 19A through 19E, some embodiments of a folded lens system 510 may include an adjustable aperture (labeled as AA in FIGS. 19A through 19E), for example located in front of the first lens element (L1). In the example camera 500 shown in FIGS. 19A through 19E, the aperture may be adjustable to provide an F/# within the range of F/2.8 to F/4. However, the F/# range may be different depending on the range of the iris opening provided by the adjustable aperture. For example, in some embodiments, the aperture may be adjustable to provide an F/# higher than F/4.

Figure 19B:
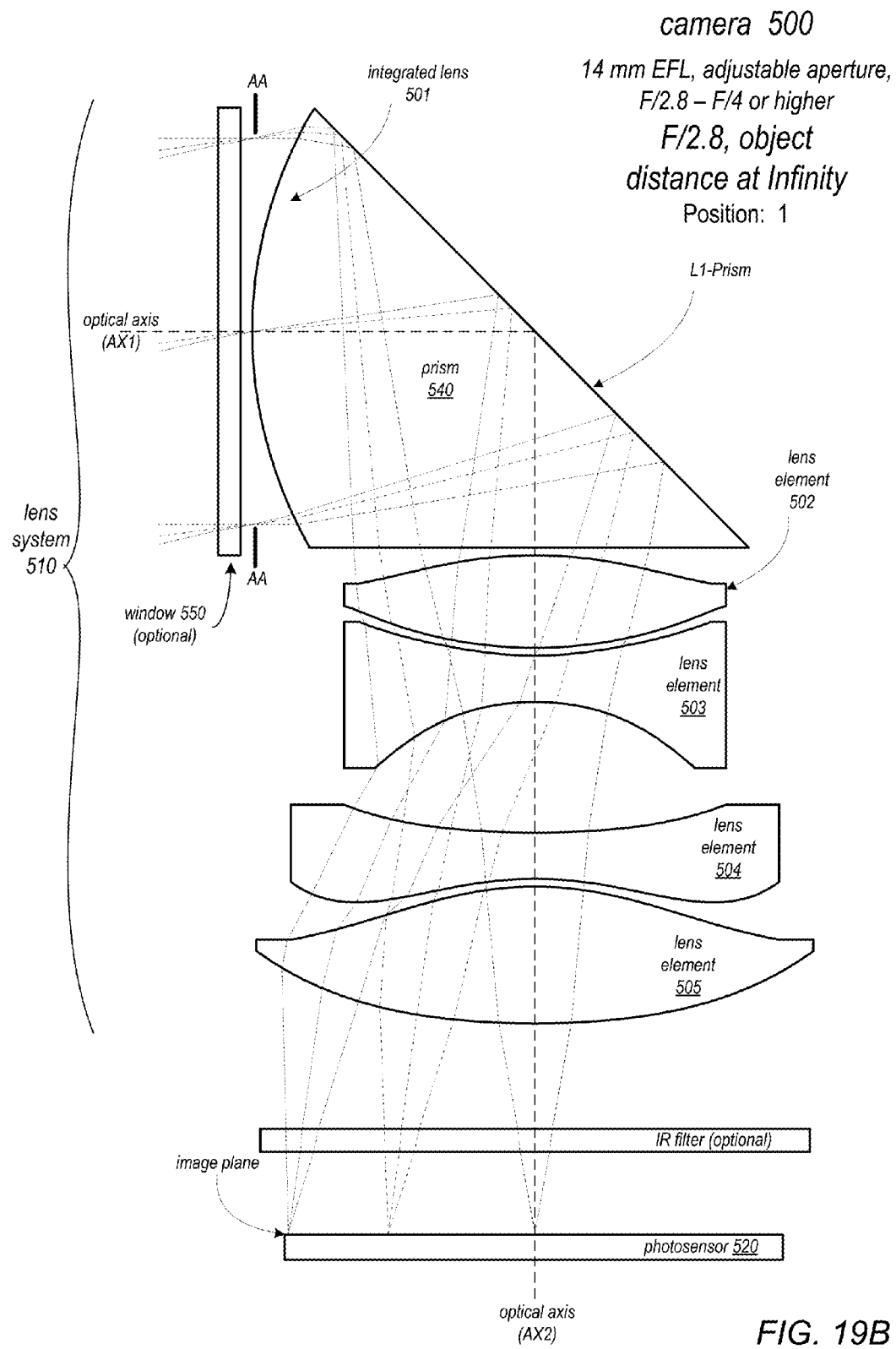
Figure 19C:
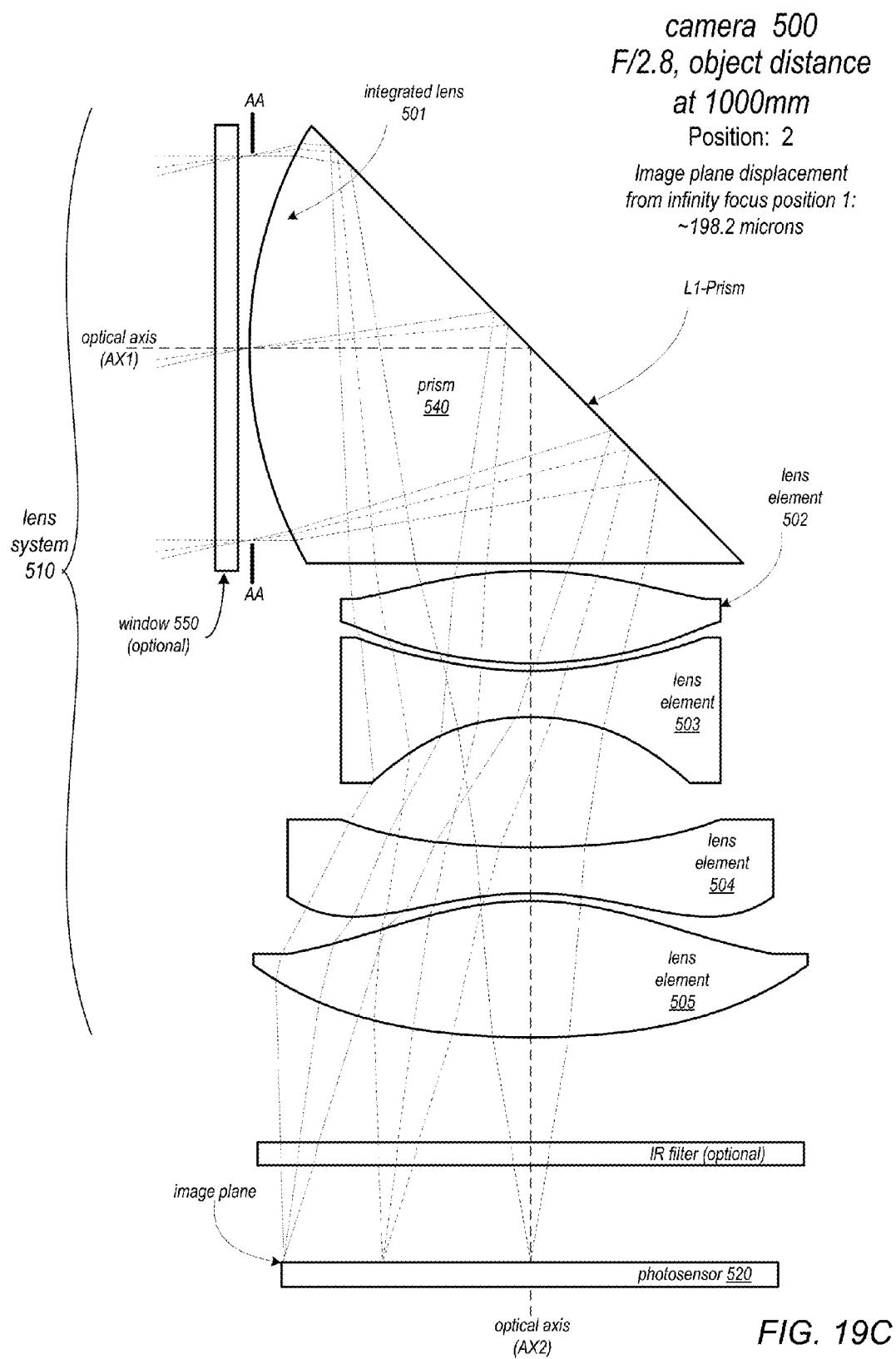
Figure 19D:
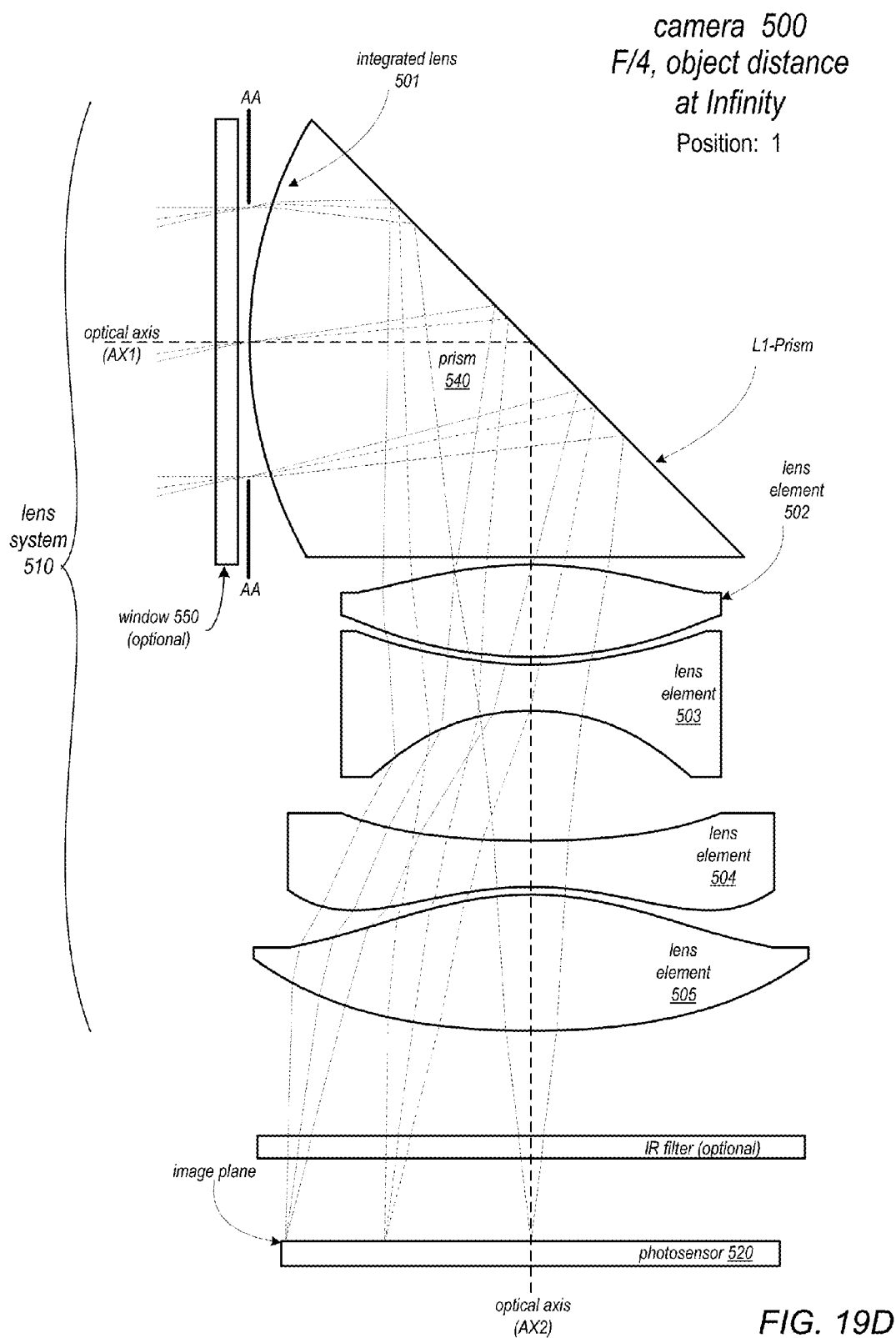
Figure 19E:
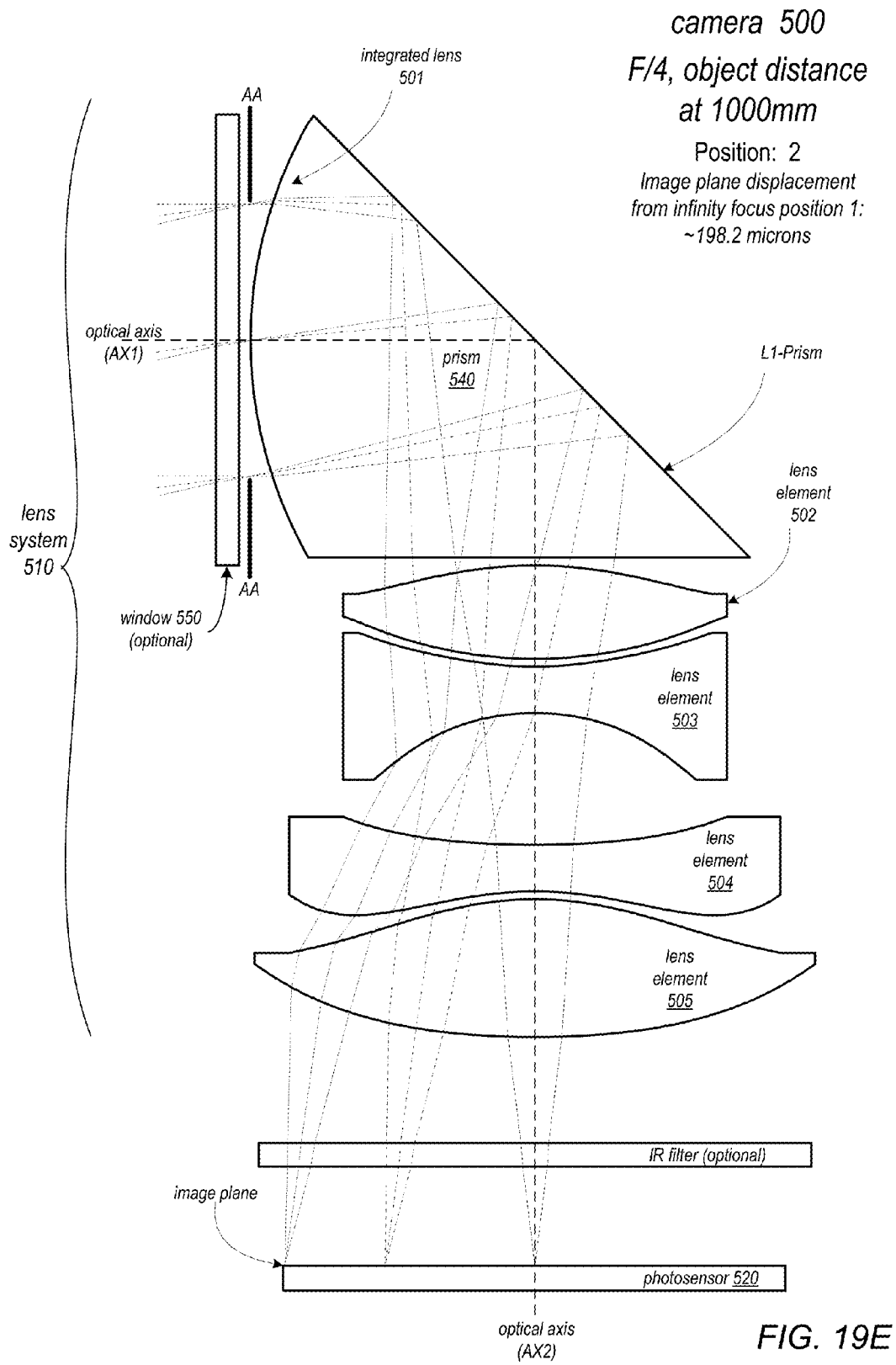
Figure 20A:
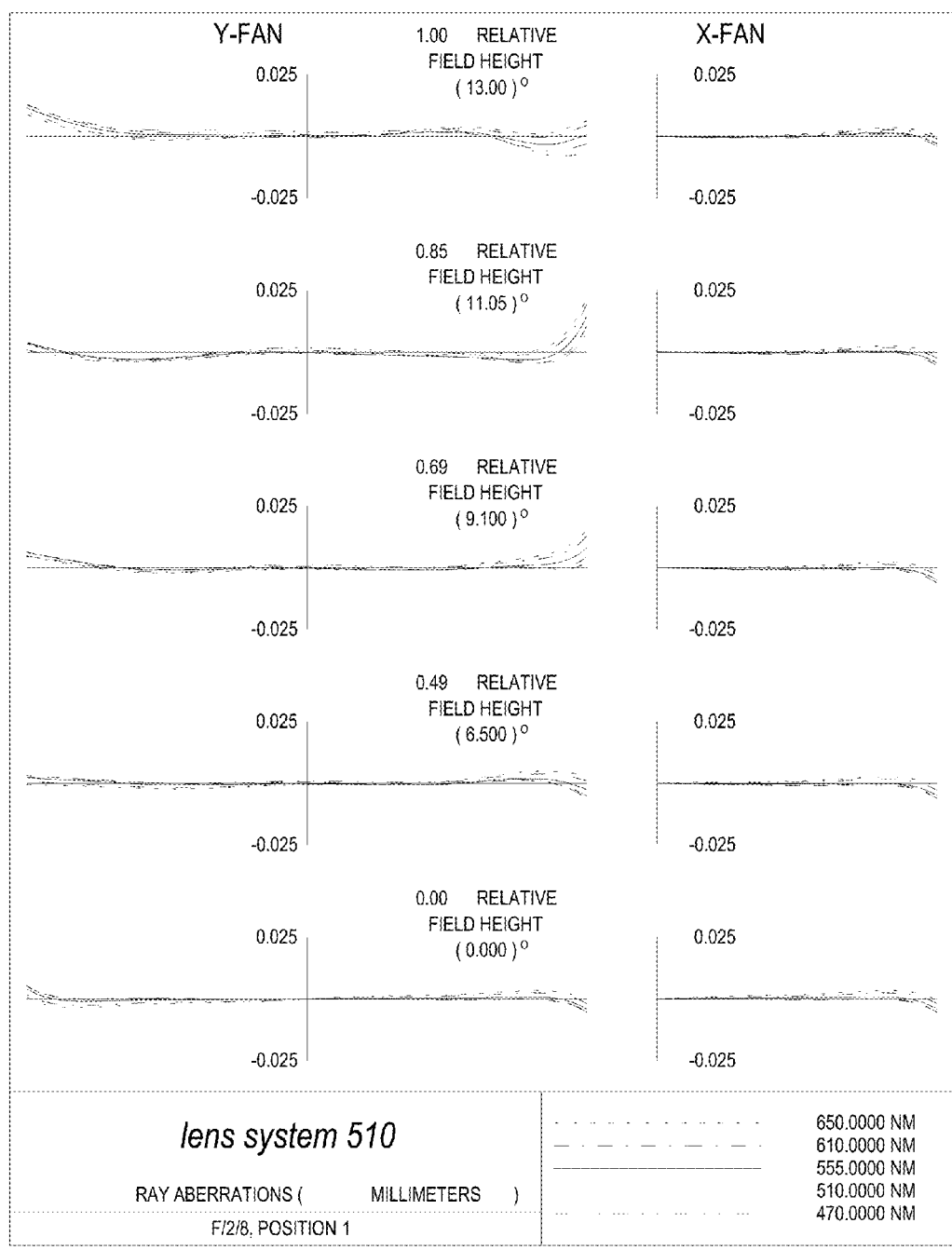
FIGS. 20A through 20D illustrate plots of the polychromatic ray aberration curves over the half field of view and over the visible spectral band ranging 470 nm to 650 nm for a folded lens system as illustrated in FIGS. 19B through 19E.
Figure 20B:
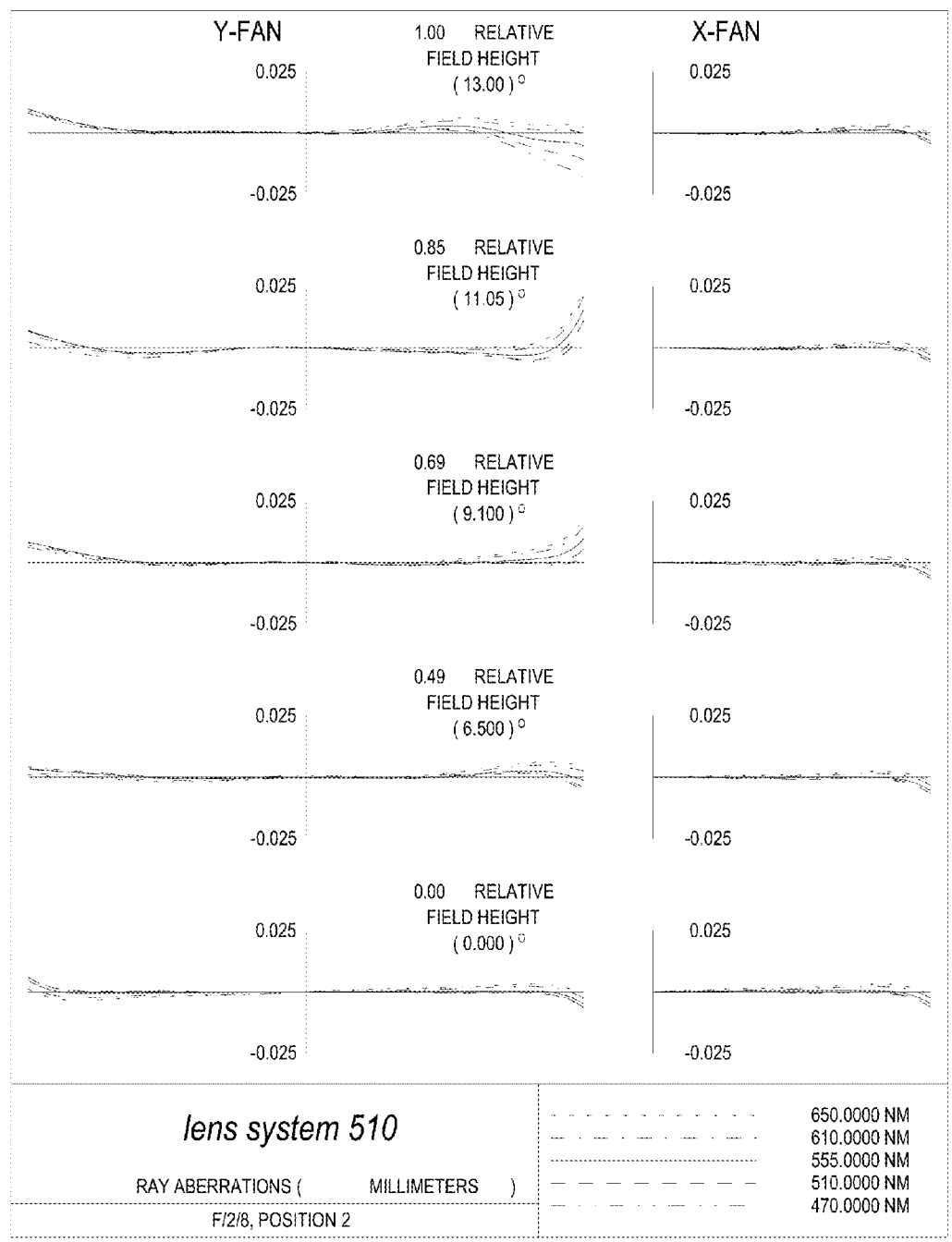
Figure 20C:
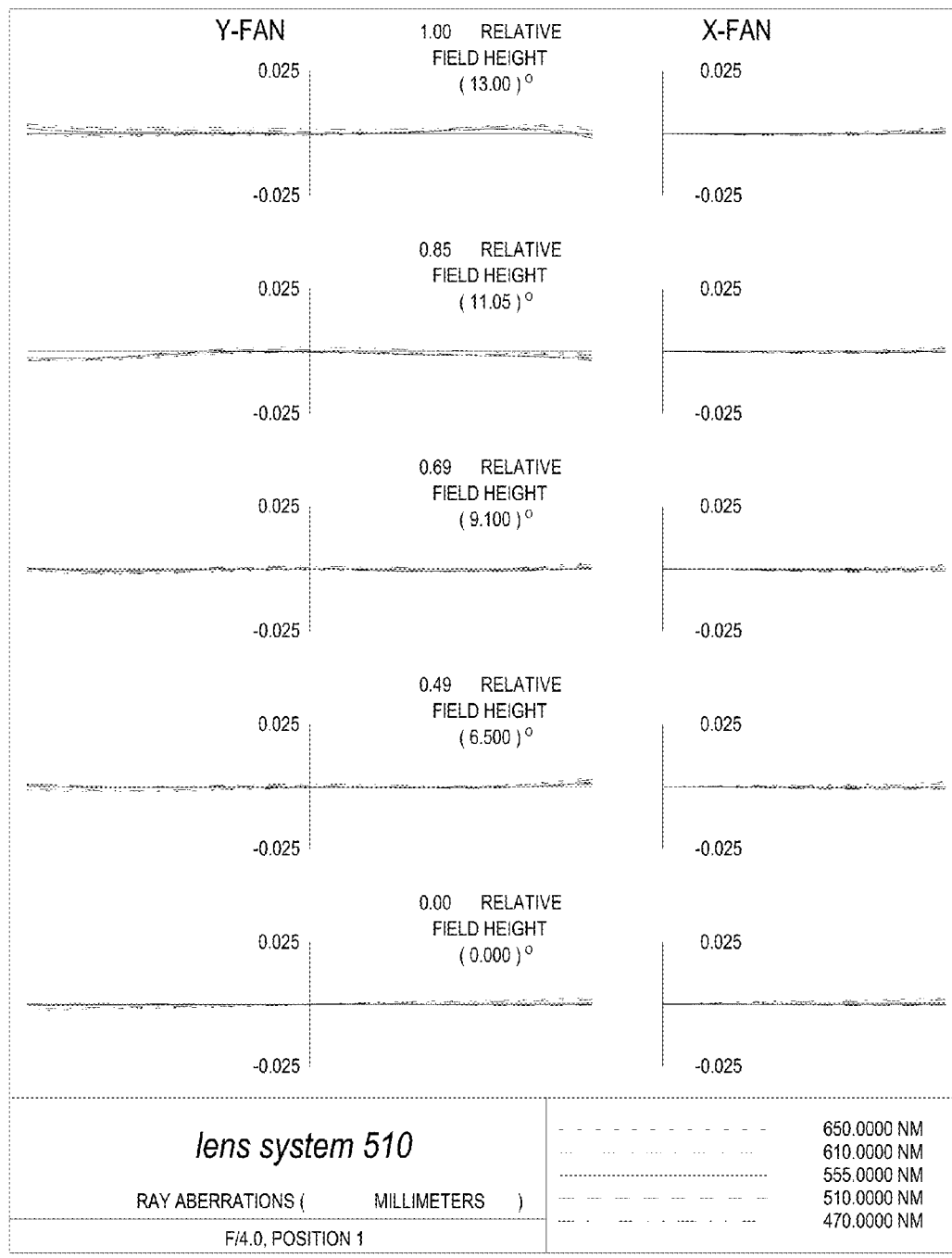
Figure 20D:
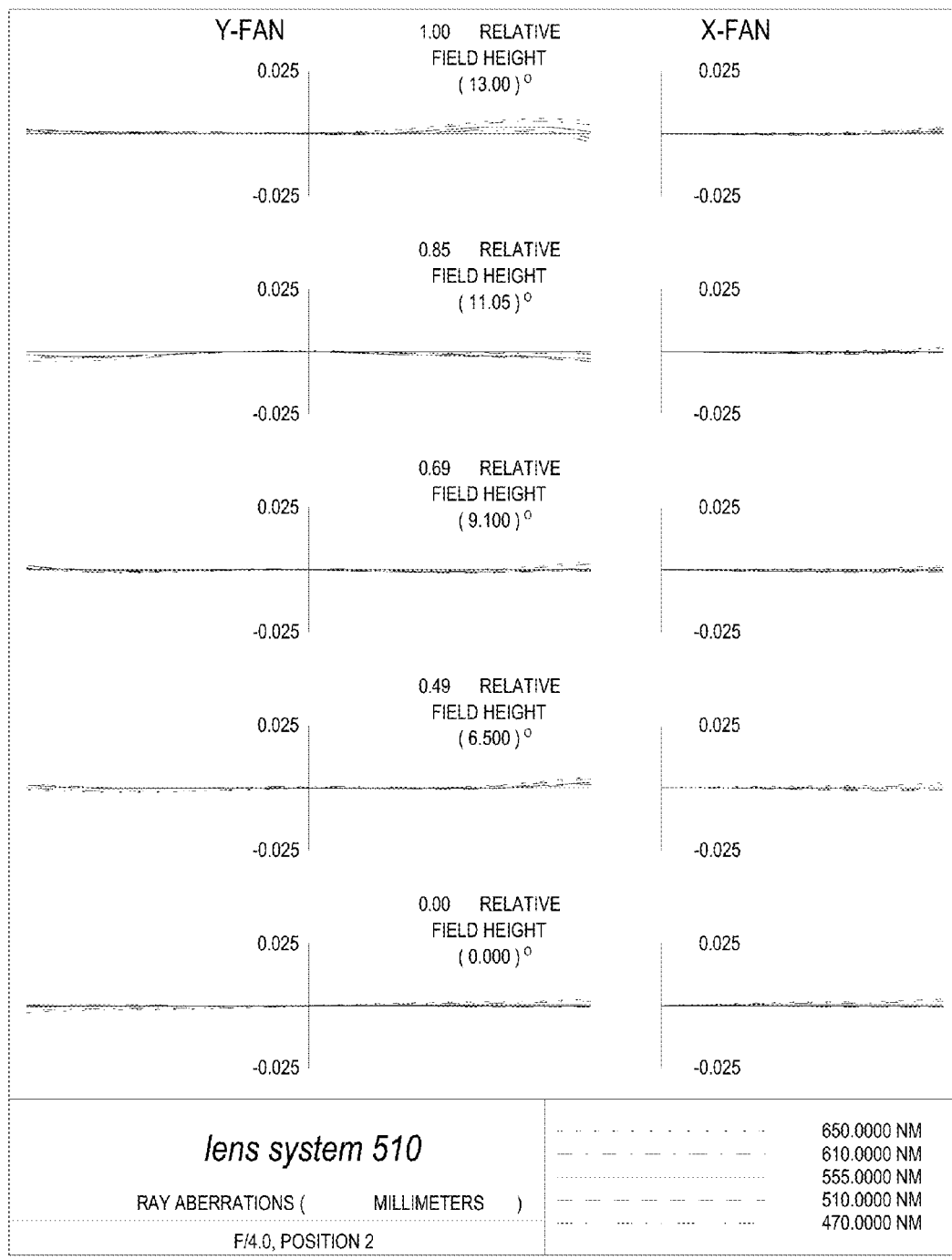

FIG. 19A generally illustrates an example camera 500 and lens system 510 with adjustable aperture AA, and shows the surface numbers (S#) of the surfaces of the elements in the camera 500 and lens system 510 as shown in the corresponding Tables 7A-7E. FIG. 19B shows the camera 500 set at F/2.8, focus position 1 (object distance at infinity), while FIG. 19C shows the camera 500 set at F/2.8, focus position 2 (object distance at 1000 mm, image plane displacement from F/2.8, focus position 1 about 198.2 microns). FIG. 19D shows the camera 500 set at F/4, focus position 1 (object distance at infinity), while FIG. 19E shows the camera 500 set at F/4, focus position 2 (object distance at 1000 mm, image plane displacement from F/4, focus position 1 about 198.2 microns). Note that the F/# settings for camera 500 shown in FIGS. 19B through 19E are given by way of example. Other F/# settings, for example F/3.11 and F/3.5, may be obtained with camera 500 by appropriately adjusting the aperture stop.

As shown in FIGS. 19A-19E, lens system 510 includes five lens elements (501-505) with refractive power. Arranged along an optical axis AX of the camera 500 from an object side (AX1) to an image side (AX2) are an adjustable aperture AA, a first lens element L1 (501) having a convex object side surface and focal length f1, and a prism 540 that is oriented to change the direction of the incoming light path and to thus fold the optical axis from AX1 to AX2, a second lens element L2 (502) with focal length f2, a third lens element L3 (503) with focal length f3, a fourth lens element L4 (504) with focal length f4, and a fifth lens element L5 (505) with focal length f5. The lens system 510 forms an image at the surface of a photosensor 520. In some embodiments, an infrared (IR) filter may be located between the fifth lens element L5 and the photosensor 520. In some embodiments, a window 550 may be located between the first lens element L1 and the object field. In some embodiments, as shown in FIGS. 19A-19E, the L1 (501) and prism 540 elements may be composed of the same type of material (e.g., a plastic material), and may be molded as a single combined unit or element, shown as L1-Prism in FIGS. 19A-19E.

The effective focal length of the lens system 510 is given by f. The total track length (TTL) of the compact folded lens system 510 is the distance along the optical axes AX1 and AX2 between the object side surface of the first element L1 and the image plane, or alternatively between the object side surface of the window 550 and the image plane. Adjustable aperture AA, which may for example be located in front of lens element L1, determines the entrance pupil of the lens system 510. The lens system 310 focal ratio of f-number f# is defined as the lens system 310 effective focal length f divided by the entrance pupil diameter. In the example camera 500 shown in FIG. 19A, the aperture may be adjustable to provide an F/# within the range of F/2.8 to F/4. However, the F/# range may be different depending on the range of the iris opening provided by the adjustable aperture stop. For example, in some embodiments, the aperture may be adjustable to provide an F/# higher than F/4. The IR filter may act to block infrared radiation that could damage or adversely affect the photosensor, and may be configured so as to have no effect on the lens system 510 effective focal length f. Similarly, the window may act to protect the lens system, and may be configured so as to have little or no effect on the lens system 510 effective focal length f.

In at least some embodiments, camera 500 and folded lens system 510 are configured to provide 14-mm EFL (effective focal length), an F/# within the range of F/2.8 to F/4, 26-degree diagonal field of view (DFOV), and a 3.232-mm image circle radius. In some embodiments, folded lens system 510 includes refractive lens elements L1, L2, L3, L4, and L5 (lens elements 501-505), a prism 540; a window 550, and an IR filter arranged along the optical axes AX1 and AX2. In at least some embodiments, window 550 and the IR filter are composed of optical glass materials, and L1, L2, L3, L4, and L5 (lens elements 501-505) and prism 540 are composed of two types of optical plastic materials. In some embodiments, as shown in FIGS. 19A-19E, the L1 (501) and prism 540 elements may be composed of the same type of plastic material, and may be molded as a single combined unit or element (L1-Prism). In at least some embodiments, the window 550 and the IR filter are each 0.3 mm thick. However, note that the values and parameters as given above are examples and are not intended to be limiting.

FIGS. 20A through 20D illustrate plots of the polychromatic ray aberration curves over the half field of view and over the visible spectral band ranging 470 nm to 650 nm for a folded lens system as illustrated in FIGS. 19B through 19E, respectively.

Tables 7A-7E provide example values of various optical and physical parameters of an example embodiment of a camera 500 and lens system 510 as illustrated in FIGS. 19A-19E. Tables 7A-7E may be referred to as providing an optical prescription for the lens system 500. Referring to Tables 7A-7E, embodiments of lens system 510 cover applications in the visible region of the spectrum from 470 nanometers (nm) to 650 nm with reference wavelength at 555 nm. The optical prescription in Tables 7A-7E provides high image quality over a range from F/2.8 to F/4.0 over 470 nm to 650 nm spectrum, for an effective focal length f of 14.0 millimeters (mm), covering 26 degrees field of view (FOV) (13 degrees half FOV). The example folded lens system 510, illustrated in FIGS. 19A-19E and with optical prescription as shown in Tables 7A-7E, has total track length (TTL=TL1+TL2) of 15.404 mm and a telephoto ratio |TTL/ f| of 1.100. Lens system 510 is a compact folded imaging system designed for visible spectrum covering 470 nm to 650 nm.

Materials, refractive indices, and Abbe numbers of the lens elements L1-L5 (501-505), window 550, prism 540, and IR filter are given in Table 7B. The choice and application of the materials and optical characteristics for the elements of lens system 710 may enable lens system 710 to be optimized and corrected for chromatic aberrations over the visible region. The materials may be chosen and the refractive power distribution of the elements may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens elements and axial separations, for example as illustrated in Table 7C, to produce well-corrected and balanced minimal residual aberrations.

FIGS. 20A through 20D illustrate plots of the polychromatic ray aberration curves over the half field of view and over the visible spectral band ranging 470 nm to 650 nm for a folded lens system as illustrated in FIGS. 19B through 19E, respectively.

Referring to Table 7D, the decentering constants of the reflecting surface in the prism element of lens system 510 are listed. The reflecting surface of the prism may be oriented 45 degrees relative to the optical axis of L1 (AX1) and thus the folded optical axis of L2-L5 (AX2) is configured to be 90 degrees relative to the AX1. However, the angular orientation of the reflecting surface of the prism element 540 may be configured to a desired value to suit a desired light path direction and lens system packaging requirements.

In at least some embodiments, camera 500 may include a zooming mechanism for dynamically focusing an object scene from infinity (object distance ≥20 meters) to near object distance, <1000 mm. For example, in some embodiments, lens system 510 including the IR filter may be moved along AX2 relative to the photosensor 520, or alternatively the photosensor 520 may be moved relative to the lens system 510/IR filter, for focusing an object scene from infinity to near distance (<1 meter) at the photosensor 520. The zoom parameters for lens system 510 are listed in Table 7E, with reference to Table 7B and FIGS. 19A-19E. The zoom parameters shown in Table 7E for F/2.8, zoom position 1 and F/4, zoom position 1 are the axial thickness or space separation along AX2 between the IR filter (surface 16, or S16) and the image plane at the photosensor 520 (surface 17, or S17) when the object scene distance is at infinity (the optical prescription as listed in Table 7B). The zoom parameters shown in Table 7E for F/2.8, zoom position 2 and F/4, zoom position 2 are the axial thickness or space separation along AX2 between the IR filter (surface 16, or S16) and the image plane at the photosensor 520 (surface 17, or S17) when the object scene distance is at 1000 mm or less. As can be seen in Table 7E, the distance between photosensor 520 and the lens system/IR filter changes by about 0.1982 mm (198.2 microns) for the lens system 510 to zoom and focus an object scene from infinity to <1000 mm. Note that the distances between photosensor 520 and the lens system/IR filter may vary at different F/# settings.

The optical prescription in Tables 7A-7E describes an example embodiment of a lens system 510 as illustrated in FIGS. 19A-19E with refractive powers of the lens elements distributed such that the ratios of the focal lengths f1-f5 of the lens elements L1-L5 relative to the effective focal length f are |f1/f|=0.727, |f2/f|=0.383, |f4/f|=0.209, |f4/f|=0.457, and |f5/f|=0.365. The aspheric coefficients for the surfaces of the lens elements in lens system 510 in the example embodiment are listed in Table 7C. Configuring lens system 510 according to the arrangement of the power distribution of the lens elements, and adjusting the radii of curvature and aspheric coefficient as shown in Tables 7A-7E, the total track length (TTL), of the lens system 510 may be reduced, and aberration of the system may effectively be corrected to obtain optical performance of high image quality resolution, for an object scene at infinity and for an object scene located <1000 mm distance, in a small form factor camera 500.

Figure 21:
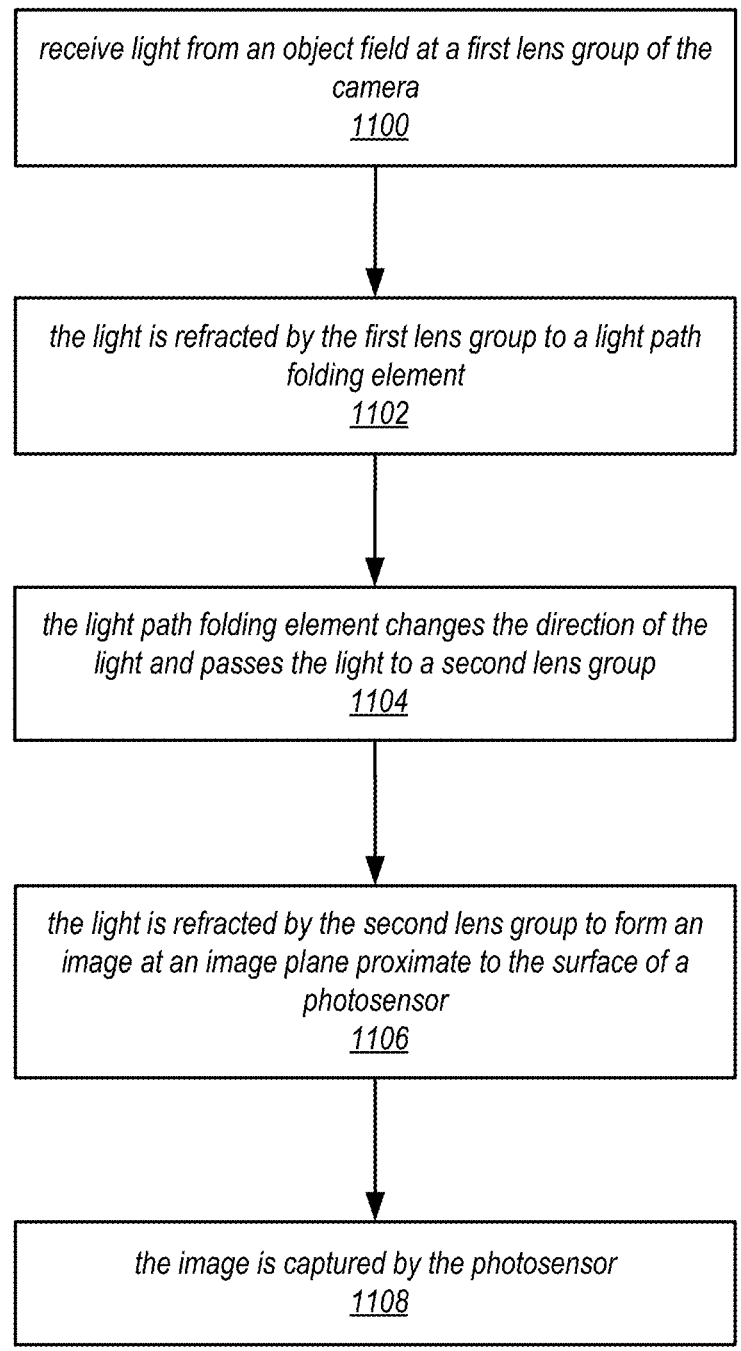
FIG. 21 is a high-level flowchart of a method for capturing images using a camera including a folded lens system as illustrated in FIGS. 1A through 19, according to at least some embodiments.

FIG. 21 is a high-level flowchart of a method for capturing images using a camera with a folded lens system as illustrated in FIGS. 1A through 18, according to at least some embodiments. As indicated at 1100, light from an object field in front of the camera is received at a first lens group of the camera. In at least some embodiments, the first lens group includes a first lens element L1. However, the first lens group may also include a window element, for example located between the first lens element and the object plane. In some embodiments, an aperture stop may be located at or in front of the first lens element. However, the stop may be located elsewhere in the lens system, for example between the first lens element and the prism. In some embodiments, the aperture stop may be fixed. However, in some embodiments, the aperture stop may be adjustable over a range, for example from F/2.8 to F/4.0 or higher, as illustrated by camera 500 and lens system 510 in FIGS. 19A through 19E. As indicated at 1102, the first lens group refracts the light to a light path folding element with a reflecting surface (e. g., a prism or plane mirror). As indicated at 1104, the light path folding element changes the direction of the light to direct the light to a second lens group. In at least some embodiments, the second lens group includes second through fifth lens elements L2 through L5. In some embodiments the second lens group may also include an IR filter, for example located between the fifth lens element and the photosensor. As indicated at 1106, the light is refracted by the second lens group to form an image at an image plane at or near the surface of a photosensor. As indicated at 1108, the image may be captured by the photosensor.

Summarizing, the incoming light from the object field passes through the refracting optical surfaces of the optical element(s) located on a first optical axis, AX1 (the first lens group). A reflecting surface of the light path folding element (e.g., a prism) changes the direction of the incoming light from the first optical axis AX1 to a second optical axis, AX2, and the incoming light on the second optical axis passes through the optical elements in the second lens group to the image plane at or near the photosensor on the second optical axis.

In some embodiments, the optical elements may be configured as illustrated in FIGS. 1A and 1B. Alternatively, the optical elements may be configured as illustrated in FIGS. 5A and 5B. As yet another alternative, the optical elements may be configured as illustrated in FIGS. 9A and 9B. As yet another alternative, the optical elements may be configured as illustrated in FIG. 13. As yet another alternative, the optical elements may be configured as illustrated in FIGS. 14A and 14B. As yet another alternative, the optical elements may be configured as illustrated in FIG. 18. However, note that variations on the examples given in the Figures are possible while achieving similar optical results.

Example Lens System Tables

The following Tables provide example values for various optical and physical parameters of example embodiments of the folded lens systems and cameras as described herein in reference to FIGS. 1A through 18. Tables 1A-1E correspond to an example embodiment of a folded lens system 110-110A as illustrated in FIGS. 1A-4B. Tables 2A-2E correspond to an example embodiment of a folded lens system 210-210A as illustrated in FIGS. 5A-8B. Tables 3A-3E correspond to an example embodiment of a folded lens system 310-310A as illustrated in FIGS. 9A-12B. Tables 4A-4E correspond to an example embodiment of a folded lens system 310B as illustrated in FIG. 13. Tables 5A-5E correspond to an example embodiment of a folded lens system 410-410A as illustrated in FIGS. 14A-17B. Tables 6A-6E correspond to an example embodiment of a folded lens system 410B as illustrated in FIG. 18. Tables 7A-7E correspond to an example embodiment of a folded lens system 510 as illustrated in FIGS. 19A-19E.

In the Tables, all dimensions are in millimeters (mm) unless otherwise specified. "S#" stands for surface number. A positive radius indicates that the center of curvature is to the right of the surface. A negative radius indicates that the center of curvature is to the left of the surface. "INF" stands for infinity (as used in optics). "ASP" indicates an aspheric surface, and "FLT" indicates a flat surface. The thickness (or separation) is the axial distance to the next surface. The design wavelengths represent wavelengths in the spectral band of the imaging optical system.

In the Tables, note the following sign convention on the optical parameters (e.g., radii of curvature and axial thickness or separation, focal lengths) when the direction of the light path change after reflecting from the mirror surface or prism surface. Following a reflecting surface element, a positive radius indicates that the center of curvature is to the left of the surface, a negative radius indicates that the center of curvature is to the right of the surface, and the thickness or axial separation has negative sign. This sign convention is well known to those skilled in the art of optical design. In the Tables the absolute value of the system effective focal length f is listed.

For the materials of the lens elements and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d=(N_d-1)/(N_F-N_C),$$

where $N_F$ and $N_C$ are the refractive index values of the material at the F and C lines of hydrogen, respectively.

Referring to the Tables of aspheric constants, the aspheric equation describing an aspherical surface may be given by:

$$Z = \frac{cr^2}{1+\sqrt{1-(1+K)c^2r^2}} + Ar^4 + Br^6 + Cr^8 + Dr^{10} + Er^{12} + Fr^{14} + Gr^{16} + Hr^{18} + \ldots$$

where Z is the sag of the surface parallel to the Z-axis (for all embodiments the Z-axis coincide with the optical axis), c is the curvature of the surface (the reciprocal of the radius of curvature of the surface), K is the conic constant, and A, B, C, D, E, F, G, and H are the aspheric coefficients. In the Tables "E" denotes exponential notation (powers of 10).

Referring to the Tables of decentering constants, the decentering constants of the reflecting surface in the light path folding element (e.g., prism) are listed for the example embodiments. As shown in Tables 1D-7D, the reflecting surface of the light path folding element (e.g., prism) is oriented 45 degrees relative to the optical axis of L1 and thus the folded optical axis of L2-L5 is configured to be 90 degrees relative to the optical axis of L1. However, the angular orientation of the reflecting surface of the light path folding element may be configured to a desired value to suit a desired light path direction and lens system packaging requirements.

Note that the values given in the following Tables for the various parameters in the various embodiments of the folded lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some of the values in the Tables may be scaled up or down for larger or smaller implementations of a camera using an embodiment of a folded lens system as described herein.

Further note that the surface numbers (S#) of the elements in the various embodiments of the folded lens system as shown in the Tables and illustrated in corresponding Figures are listed from the first surface 0 at the object plane to the last surface at the image plane. Since number and location of elements may vary in embodiments, the surface number(s) that correspond to some elements may vary in the different Tables and Figures. In particular, note that where reference is given to the radius of curvature (R#) of the surfaces of the lens element (L#) in this document, the reference (R#) used (e.g., R1 and R2 for the surfaces of lens element L1) are the same for all of the embodiments, and may but do not necessarily correspond to the surface numbers of the lens elements as given in the Tables and Figures.

In at least some embodiments the folded lens system is a zoom system equipped and configured with a movable lens group, lens element, and/or photosensor for focusing/zooming. The zoom parameters of the example embodiments are denoted by an asterisk (*) in Tables 1B-7B and also listed in the Tables for zoom parameters (Tables 1E-7E). The zoom parameters are the axial separation or space separation that changes when the lens system is zoomed to focus from an object scene at infinity (e.g., object distance ≥20 meters), referred to herein as position 1, to a nearby object scene, e.g. located at <1 meter from the camera, referred to herein as position 2. Note that the object distance or focus displacement range of the focusing lens group may be scaled up or down for larger or smaller implementations of a camera using an embodiment of a folded lens system as described herein.

TABLE 1A

| | |
|---|---|
| Focal length (f) | 14.0 mm |
| F-Number | 2.8 |
| Half FOV | 13.0° |
| Total track length TTL | 15.700 |
| Telephoto ratio ∣ TTL/f ∣ | 1.1214 |
| Design wavelengths | 650 nm, 610 nm, 555 nm, 510 nm, 470 nm |

TABLE 1B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| Window | 1 | INF | FLT | 0.4000 | | 1.516 | 64.1 |
| | 2 | INF | FLT | 0.7000 | | | |
| Aperture Stop | 3 | INF | FLT | −0.6500 | | | |
| L1 | 4 | 4.919 | SPH | 0.9794 | Glass | 1.603 | 65.5 |
| | 5 | 283.626 | SPH | 0.0200 | | | |
| | 6 | INF | FLT | 2.7000 | Glass | 1.755 | 27.5 |
| | Decenter (1) | | | | | | |
| Prism | 7 | INF | FLT | −2.700 | Refl | | |
| | Bend (1) | | | | | | |
| | 8 | INF | FLT | −0.800 | | | |
| L2 | 9 | 3.738 | ASP | −1.1615 | Plastic | 1.544 | 56.1 |
| | 10 | 5.923 | ASP | −0.1032 | | | |
| L3 | 11 | 56.277 | ASP | −0.6277 | Plastic | 1.632 | 23.3 |
| | 12 | −4.926 | ASP | −0.7070 | | | |
| L4 | 13 | −8.441 | ASP | −0.7873 | Plastic | 1.544 | 56.1 |
| | 14 | −125.744 | ASP | −1.6835 | | | |
| L5 | 15 | −6.125 | ASP | −1.4306 | Plastic | 1.632 | 23.1 |
| | 16 | −7.777 | ASP | −1.2315 | | | |
| IR filter | 17 | INF | FLT | −0.3000 | Glass | 1.516 | 64.1 |
| | 18 | INF | FLT | −0.4677 *2 | | | |
| Image plane | 19 | | | | | | |

TABLE 1C

ASPHERIC CONSTANTS

| S# | Curvature (c) | K | A E | B F | C G | D H |
|---|---|---|---|---|---|---|
| 9 | 0.26752484 | 0.00000000 | 4.95235E−04 | −1.26188E−03 | 6.91030E−05 | 0.00000E+00 |
| | | | 0.00000E+00 | 0.00000E+00 | 0.00000E+00 | 0.00000E+00 |
| 10 | 0.16883720 | 0.00000000 | 6.74443E−04 | −2.09695E−04 | −1.34439E−05 | 0.00000E+00 |
| | | | 0.00000E+00 | 0.00000E+00 | 0.00000E+00 | 0.00000E+00 |

TABLE 1C-continued

ASPHERIC CONSTANTS

| S# | Curvature (c) | K | A E | B F | C G | D H |
|---|---|---|---|---|---|---|
| 11 | 0.01776917 | 0.00000000 | 4.08217E−03 | 1.55920E−03 | −2.68747E−05 | 0.00000E+00 |
|  |  |  | 0.00000E+00 | 0.00000E+00 | 0.00000E+00 | 0.00000E+00 |
| 12 | −0.20300283 | 0.00000000 | 5.01441E−03 | 6.37899E−04 | −3.48487E−05 | 0.00000E+00 |
|  |  |  | 0.00000E+00 | 0.00000E+00 | 0.00000E+00 | 0.00000E+00 |
| 13 | −0.11846774 | 0.00000000 | 1.03487E−02 | 7.26540E−05 | 5.34079E−05 | 0.00000E+00 |
|  |  |  | 0.00000E+00 | 0.00000E+00 | 0.00000E+00 | 0.00000E+00 |
| 14 | −0.795268E−02 | 0.00000000 | 9.09323E−03 | 1.55078E−04 | 3.02572E−05 | 0.00000E+00 |
|  |  |  | 0.00000E+00 | 0.00000E+00 | 0.00000E+00 | 0.00000E+00 |
| 15 | −0.16326319 | 0.00000000 | 3.06668E−03 | −9.82521E−05 | 0.00000E+00 | 0.00000E+00 |
|  |  |  | 0.00000E+00 | 0.00000E+00 | 0.00000E+00 | 0.00000E+00 |
| 16 | −0.12858759 | 0.00000000 | 3.50948E−03 | −7.05343E−05 | 0.00000E+00 | 0.00000E+00 |
|  |  |  | 0.00000E+00 | 0.00000E+00 | 0.00000E+00 | 0.00000E+00 |

TABLE 1D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 1E

ZOOM PARAMETERS

| *Zoom Parameters | Position: 1 | Position: 2 |
|---|---|---|
| *1 | INF | 1000 mm |
| *2 | −0.4677 mm | −0.6632 mm |

TABLE 2A

| | |
|---|---|
| Focal length (f) | 14.0 mm |
| F-Number | 2.8 |
| Half FOV | 13.0° |
| Total track length TTL | 15.465 |
| Telephoto ratio \|TTL/f\| | 1.105 |
| Design wavelengths | 650 nm, 610 nm, 555 nm, 510 nm, 470 nm |

TABLE 2B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 |  |  |  |
| Window | 1 | INF | FLT | 0.4000 |  | 1.516 | 64.1 |
|  | 2 | INF | FLT | 0.6000 |  |  |  |
| Aperture Stop | 3 | INF | FLT | −0.5500 |  |  |  |
| L1 | 4 | 5.473 | ASP | 0.9043 | Plastic | 1.535 | 55.7 |
|  | 5 | INF | FLT | 0.0000 |  |  |  |
|  | 6 | INF | FLT | 2.7000 | Plastic | 1.535 | 55.7 |
| Decenter (1) |  |  |  |  |  |  |  |
| Prism | 7 | INF | FLT | −2.700 | Refl |  |  |
| Bend (1) |  |  |  |  |  |  |  |
|  | 8 | INF | FLT | −0.1000 |  |  |  |
| L2 | 9 | −4.870 | ASP | −1.2000 | Plastic | 1.535 | 57.7 |
|  | 10 | 7.241 | ASP | −0.1000 |  |  |  |
| L3 | 11 | 5.858 | ASP | −0.6000 | Plastic | 1.639 | 23.3 |
|  | 12 | −3.076 | ASP | −1.6867 |  |  |  |
| L4 | 13 | 12.779 | ASP | −0.6000 | Plastic | 1.535 | 57.7 |
|  | 14 | −4.681 | ASP | −0.1000 |  |  |  |
| L5 | 15 | −4.370 | ASP | −2.5781 | Plastic | 1.639 | 23.3 |
|  | 16 | 12.333 | ASP | −1.2623 |  |  |  |
| IR filter | 17 | INF | FLT | −0.3000 | Glass | 1.516 | 64.1 |
|  | 18 | INF | FLT | −0.6343 *2 |  |  |  |
| Image plane | 19 |  |  |  |  |  |  |

TABLE 2C

ASPHERIC CONSTANTS

| S# | Curvature (c) | K | A<br>E | B<br>F | C<br>G | D<br>H |
|---|---|---|---|---|---|---|
| 4 | 0.18272875 | −0.28629376 | 0.00000E+00<br>0.00000E+00 | 0.00000E+00<br>0.00000E+00 | 0.00000E+00<br>0.00000E+00 | 0.00000E+00<br>0.00000E+00 |
| 9 | −0.20533993 | 0.00000000 | 4.06043E−04<br>0.00000E+00 | 4.42225E−04<br>0.00000E+00 | −4.79237E−05<br>0.00000E+00 | 0.00000E+00<br>0.00000E+00 |
| 10 | 0.13810372 | 0.00000000 | −7.14370E−03<br>0.00000E+00 | 2.31717E−03<br>0.00000E+00 | −2.06661E−04<br>0.00000E+00 | 8.00876E−06<br>0.00000E+00 |
| 11 | 0.17070530 | 0.00000000 | −1.20673E−02<br>0.00000E+00 | 2.79971E−03<br>0.00000E+00 | −1.31854E−04<br>0.00000E+00 | 0.00000E+00<br>0.00000E+00 |
| 12 | −0.32513510 | 0.00000000 | −6.22474E−03<br>0.00000E+00 | 6.10401E−04<br>0.00000E+00 | 4.58721E−05<br>0.00000E+00 | 0.00000E+00<br>0.00000E+00 |
| 13 | 0.07825189 | 0.00000000 | 6.26273E−03<br>0.00000E+00 | 2.72738E−04<br>0.00000E+00 | 0.00000E+00<br>0.00000E+00 | 0.00000E+00<br>0.00000E+00 |
| 14 | −0.21364924 | 0.00000000 | 1.38907E−02<br>0.00000E+00 | −7.31448E−05<br>0.00000E+00 | 0.00000E+00<br>0.00000E+00 | 0.00000E+00<br>0.00000E+00 |
| 15 | −0.22885300 | 0.00000000 | 9.59849E−03<br>0.00000E+00 | −1.51839E−04<br>0.00000E+00 | 0.00000E+00<br>0.00000E+00 | 0.00000E+00<br>0.00000E+00 |
| 16 | 0.08108161 | 0.00000000 | 2.96605E−03<br>0.00000E+00 | 0.00000E+00<br>0.00000E+00 | 0.00000E+00<br>0.00000E+00 | 0.00000E+00<br>0.00000E+00 |

TABLE 2D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 2E

ZOOM PARAMETERS

| *Zoom Parameters | Position: 1 | Position: 2 |
|---|---|---|
| *1 | INF | 1000 mm |
| *2 | −0.6343 mm | −0.8321 mm |

TABLE 3A

| | |
|---|---|
| Focal length (f) | 14.0 mm |
| F-Number | 2.8 |
| Half FOV | 13.0° |
| Total track length TTL | 15.166 |
| Telephoto ratio \| TTL/f \| | 1.083 |
| Design wavelengths | 650 nm, 610 nm, 555 nm, 510 nm, 470 nm |

TABLE 3B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| Window | 1 | INF | FLT | 0.3000 | | 1.516 | 64.1 |
| | 2 | INF | FLT | 0.6000 | | | |
| Aperture Stop | 3 | INF | FLT | −0.5500 | | | |
| L1 | 4 | 5.473 | ASP | 0.7000 | Plastic | 1.544 | 56.1 |
| | 5 | INF | FLT | 0.0000 | | | |
| | 6 | INF | FLT | 2.7000 | Plastic | 1.544 | 56.1 |
| Decenter (1) | | | | | | | |
| Prism | 7 | INF | FLT | −2.700 | Refl | | |
| Bend (1) | | | | | | | |
| | 8 | INF | FLT | −0.1000 | | | |
| L2 | 9 | −5.127 | ASP | −1.3000 | Plastic | 1.544 | 56.1 |
| | 10 | 6.486 | ASP | −0.0731 | | | |
| L3 | 11 | 6.673 | ASP | −0.4000 | Plastic | 1.632 | 23.3 |
| | 12 | −2.865 | ASP | −1.8947 | | | |
| L4 | 13 | 7.975 | ASP | −0.5000 | Plastic | 1.544 | 56.1 |
| | 14 | −5.428 | ASP | −0.0821 | | | |
| L5 | 15 | −4.644 | ASP | −2.1000 | Plastic | 1.632 | 23.3 |
| | 16 | 9.689 | ASP | −1.2395 | | | |
| IR filter | 17 | INF | FLT | −0.3000 | Glass | 1.516 | 64.1 |
| | 18 | INF | FLT | −1.0762 *2 | | | |
| Image plane | 19 | | | | | | |

TABLE 3C

| | | | ASPHERIC CONSTANTS | | | |
|---|---|---|---|---|---|---|
| S# | Curvature (c) | K | A<br>E | B<br>F | C<br>G | D<br>H |
| 4 | 0.18272875 | −0.32967850 | 0.00000E+00<br>0.00000E+00 | 0.00000E+00<br>0.00000E+00 | 0.00000E+00<br>0.00000E+00 | 0.00000E+00<br>0.00000E+00 |
| 9 | −0.19503469 | 0.00000000 | 2.93124E−04<br>0.00000E+00 | 1.57318E−04<br>0.00000E+00 | 5.83985E−05<br>0.00000E+00 | 0.00000E+00<br>0.00000E+00 |
| 10 | 0.15416692 | 0.00000000 | −1.17742E−02<br>0.00000E+00 | 5.96776E−03<br>0.00000E+00 | −9.14015E−04<br>0.00000E+00 | 8.00876E−06<br>0.00000E+00 |
| 11 | 0.14985814 | 0.00000000 | −7.64372E−03<br>0.00000E+00 | 3.33244E−03<br>0.00000E+00 | −3.87296E−04<br>0.00000E+00 | 0.00000E+00<br>0.00000E+00 |
| 12 | −0.34901743 | 0.00000000 | 3.44686E−03<br>0.00000E+00 | −2.08644E−03<br>0.00000E+00 | 2.96448E−04<br>0.00000E+00 | 0.00000E+00<br>0.00000E+00 |
| 13 | 0.12539327 | 0.00000000 | 7.49496E−03<br>0.00000E+00 | 5.07218E−04<br>0.00000E+00 | 0.00000E+00<br>0.00000E+00 | 0.00000E+00<br>0.00000E+00 |
| 14 | −0.18424628 | 0.00000000 | 1.41886E−02<br>0.00000E+00 | −8.29060E−05<br>0.00000E+00 | 0.00000E+00<br>0.00000E+00 | 0.00000E+00<br>0.00000E+00 |
| 15 | −0.21531616 | 0.00000000 | 1.00119E−02<br>0.00000E+00 | −2.26296E−04<br>0.00000E+00 | 0.00000E+00<br>0.00000E+00 | 0.00000E+00<br>0.00000E+00 |
| 16 | 0.10320982 | 0.00000000 | 2.60443E−03<br>0.00000E+00 | 0.00000E+00<br>0.00000E+00 | 0.00000E+00<br>0.00000E+00 | 0.00000E+00<br>0.00000E+00 |

TABLE 3D

| | | DECENTERING CONSTANTS | | | | |
|---|---|---|---|---|---|---|
| Decenter | X | Y | Z | Alpha (degrees) | Beta (degrees) | Gamma (degrees) |
| D(1) and Bend (1) | 0.000 | 0.000 | 0.000 | 45.000 | 0.000 | 0.000 |

TABLE 3E

| | ZOOM PARAMETERS | |
|---|---|---|
| *Zoom Parameters | Position: 1 | Position: 2 |
| *1 | INF | 1000 mm |
| *2 | −1.0762 mm | −1.2748 mm |

TABLE 4A

| | |
|---|---|
| Focal length (f) | 14.0 mm |
| F-Number | 2.8 |
| Half FOV | 13.0° |
| Total track length TTL | 15.166 |
| Telephoto ratio \| TTL/f \| | 1.083 |
| Design wavelengths | 650 nm, 610 nm, 555 nm, 510 nm, 470 nm |

TABLE 4B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| Window | 1 | INF | FLT | 0.3000 | | 1.516 | 64.1 |
| | 2 | INF | FLT | 0.6000 | | | |
| Aperture Stop | 3 | INF | FLT | −0.5500 | | | |
| L1-Prism | 4 | 5.473 | ASP | 3.4000 | Plastic | 1.544 | 56.1 |
| Decenter (1) | | | | | | | |
| | 5 | INF | FLT | −2.700 | Refl | | |
| Bend (1) | | | | | | | |
| | 6 | INF | FLT | −0.1000 | | | |
| L2 | 7 | −5.127 | ASP | −1.3000 | Plastic | 1.544 | 56.1 |
| | 8 | 6.486 | ASP | −0.0731 | | | |
| L3 | 9 | 6.673 | ASP | −0.4000 | Plastic | 1.632 | 23.3 |
| | 10 | −2.865 | ASP | −1.8947 | | | |
| L4 | 11 | 7.975 | ASP | −0.5000 | Plastic | 1.544 | 56.1 |
| | 12 | −5.428 | ASP | −0.0821 | | | |
| L5 | 13 | −4.644 | ASP | −2.1000 | Plastic | 1.632 | 23.3 |
| | 14 | 9.689 | ASP | −1.2395 | | | |
| IR filter | 15 | INF | FLT | −0.3000 | Glass | 1.516 | 64.1 |
| | 16 | INF | FLT | −1.0762 *2 | | | |
| Image plane | 17 | | | | | | |

TABLE 4C

ASPHERIC CONSTANTS

| S# | Curvature (c) | K | A<br>E | B<br>F | C<br>G | D<br>H |
|---|---|---|---|---|---|---|
| 4 | 0.18272875 | −0.32967850 | 0.00000E+00<br>0.00000E+00 | 0.00000E+00<br>0.00000E+00 | 0.00000E+00<br>0.00000E+00 | 0.00000E+00<br>0.00000E+00 |
| 7 | −0.19503469 | 0.00000000 | 2.93124E−04<br>0.00000E+00 | 1.57318E−04<br>0.00000E+00 | 5.83985E−05<br>0.00000E+00 | 0.00000E+00<br>0.00000E+00 |
| 8 | 0.15416692 | 0.00000000 | −1.17742E−02<br>0.00000E+00 | 5.96776E−03<br>0.00000E+00 | −9.14015E−04<br>0.00000E+00 | 8.00876E−06<br>0.00000E+00 |
| 9 | 0.14985814 | 0.00000000 | −7.64372E−03<br>0.00000E+00 | 3.33244E−03<br>0.00000E+00 | −3.87296E−04<br>0.00000E+00 | 0.00000E+00<br>0.00000E+00 |
| 10 | −0.34901743 | 0.00000000 | 3.44686E−03<br>0.00000E+00 | −2.08644E−03<br>0.00000E+00 | 2.96448E−04<br>0.00000E+00 | 0.00000E+00<br>0.00000E+00 |
| 11 | 0.12539327 | 0.00000000 | 7.49496E−03<br>0.00000E+00 | 5.07218E−04<br>0.00000E+00 | 0.00000E+00<br>0.00000E+00 | 0.00000E+00<br>0.00000E+00 |
| 12 | −0.18424628 | 0.00000000 | 1.41886E−02<br>0.00000E+00 | −8.29060E−05<br>0.00000E+00 | 0.00000E+00<br>0.00000E+00 | 0.00000E+00<br>0.00000E+00 |
| 13 | −0.21531616 | 0.00000000 | 1.00119E−02<br>0.00000E+00 | −2.26296E−04<br>0.00000E+00 | 0.00000E+00<br>0.00000E+00 | 0.00000E+00<br>0.00000E+00 |
| 14 | 0.10320982 | 0.00000000 | 2.60443E−03<br>0.00000E+00 | 0.00000E+00<br>0.00000E+00 | 0.00000E+00<br>0.00000E+00 | 0.00000E+00<br>0.00000E+00 |

TABLE 4D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 4E

ZOOM PARAMETERS

| *Zoom Parameters | Position: 1 | Position: 2 |
|---|---|---|
| *1 | INF | 1000 mm |
| *2 | −1.0762 mm | −1.2748 mm |

TABLE 5A

| | |
|---|---|
| Focal length (f) | 14.0 mm |
| F-Number | 2.8 |
| Half FOV | 13.0° |
| Total track length TTL | 15.40 |
| Telephoto ratio |TTL/f| | 1.100 |
| Design wavelengths | 650 nm, 610 nm, 555 nm, 510 nm, 470 nm |

TABLE 5B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| Window | 1 | INF | FLT | 0.3000 | | 1.516 | 64.1 |
| | 2 | INF | FLT | 0.6000 | | | |
| Aperture Stop | 3 | INF | FLT | −0.5500 | | | |
| L1 | 4 | 5.297 | ASP | 0.7000 | Plastic | 1.544 | 56.1 |
| | 5 | INF | FLT | 0.0000 | | | |
| | 6 | INF | FLT | 2.7000 | Plastic | 1.544 | 56.1 |
| Decenter (1) | | | | | | | |
| Prism | 7 | INF | FLT | −2.700 | Refl | | |
| Bend (1) | | | | | | | |
| | 8 | INF | FLT | 0.0000 | | | |
| L2 | 9 | INF | FLT | −0.7000 | Plastic | 1.544 | 56.1 |
| | 10 | 5.297 | ASP | −0.1000 | | | |
| L3 | 11 | 6.222 | ASP | −1.4722 | Plastic | 1.632 | 23.3 |
| | 12 | −9.165 | ASP | −2.3621 | | | |
| L4 | 13 | −86.850 | ASP | −0.5582 | Plastic | 1.544 | 56.1 |
| | 14 | −3.760 | ASP | −0.1000 | | | |
| L5 | 15 | −4.205 | ASP | −2.0900 | Plastic | 1.632 | 23.3 |
| | 16 | −14.539 | ASP | −0.1320 | | | |
| IR filter | 17 | INF | FLT | −0.3000 | Glass | 1.516 | 64.1 |
| | 18 | INF | FLT | −1.4854 *2 | | | |
| Image plane | 19 | | | | | | |

TABLE 5C

ASPHERIC CONSTANTS

| S# | Curvature (c) | K | A<br>E | B<br>F | C<br>G | D<br>H |
|---|---|---|---|---|---|---|
| 4 | 0.18878796 | −0.25714254 | 0.00000E+00<br>0.00000E+00 | 0.00000E+00<br>0.00000E+00 | 0.00000E+00<br>0.00000E+00 | 0.00000E+00<br>0.00000E+00 |
| 10 | 0.18878796 | −0.25714254 | 0.00000E+00<br>0.00000E+00 | 0.00000E+00<br>0.00000E+00 | 0.00000E+00<br>0.00000E+00 | 0.00000E+00<br>0.00000E+00 |
| 11 | 0.16073253 | 0.00000000 | 3.57501E−03<br>0.00000E+00 | −1.78739E−04<br>0.00000E+00 | 0.00000E+00<br>0.00000E+00 | 8.00876E−06<br>0.00000E+00 |
| 12 | −0.10911116 | 0.00000000 | 3.03774E−03<br>0.00000E+00 | −2.29538E−04<br>0.00000E+00 | 0.00000E+00<br>0.00000E+00 | 0.00000E+00<br>0.00000E+00 |
| 13 | −0.01151408 | 0.00000000 | 8.89471E−03<br>0.00000E+00 | 2.56115E−04<br>0.00000E+00 | 0.00000E+00<br>0.00000E+00 | 0.00000E+00<br>0.00000E+00 |
| 14 | −0.26597906 | 0.00000000 | 1.08250E−02<br>0.00000E+00 | 4.49265E−05<br>0.00000E+00 | 0.00000E+00<br>0.00000E+00 | 0.00000E+00<br>0.00000E+00 |
| 15 | −0.23780382 | 0.00000000 | 6.45228E−03<br>0.00000E+00 | −5.85058E−05<br>0.00000E+00 | 0.00000E+00<br>0.00000E+00 | 0.00000E+00<br>0.00000E+00 |
| 16 | −0.06878286 | 0.00000000 | 5.54503E−03<br>0.00000E+00 | −1.86420E−04<br>0.00000E+00 | 0.00000E+00<br>0.00000E+00 | 0.00000E+00<br>0.00000E+00 |

TABLE 5D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 5E

ZOOM PARAMETERS

| *Zoom Parameters | Position: 1 | Position: 2 |
|---|---|---|
| *1 | INF | 1000 mm |
| *2 | −1.4854 mm | −1.6810 mm |

TABLE 6A

| | |
|---|---|
| Focal length (f) | 14.0 mm |
| F-Number | 2.8 |
| Half FOV | 13.0° |
| Total track length TTL | 15.40 |
| Telephoto ratio \|TTL/f\| | 1.100 |
| Design wavelengths | 650 nm, 610 nm, 555 nm, 510 nm, 470 nm |

TABLE 6B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| Window | 1 | INF | FLT | 0.3000 | | 1.516 | 64.1 |
| | 2 | INF | FLT | 0.6000 | | | |
| Aperture Stop | 3 | INF | FLT | −0.5500 | | | |
| L1, Prism, L2 | 4 | 5.297 | ASP | 3.4000 | Plastic | 1.544 | 56.1 |
| Decenter (1) | | | | | | | |
| | 5 | INF | FLT | −3.700 | Refl | | |
| Bend (1) | | | | | | | |
| | 6 | 5.297 | ASP | −0.1000 | | | |
| L3 | 7 | 6.222 | ASP | −1.4722 | Plastic | 1.632 | 23.3 |
| | 8 | −9.165 | ASP | −2.3621 | | | |
| L4 | 9 | −86.850 | ASP | −0.5582 | Plastic | 1.544 | 56.1 |
| | 10 | −3.760 | ASP | −0.1000 | | | |
| L5 | 11 | −4.205 | ASP | −2.0900 | Plastic | 1.632 | 23.3 |
| | 12 | −14.539 | ASP | −0.1320 | | | |
| IR filter | 13 | INF | FLT | −0.3000 | Glass | 1.516 | 64.1 |
| | 14 | INF | FLT | −1.4854 *2 | | | |
| Image plane | 15 | | | | | | |

TABLE 6C

ASPHERIC CONSTANTS

| S# | Curvature (c) | K | A<br>E | B<br>F | C<br>G | D<br>H |
|---|---|---|---|---|---|---|
| 4 | 0.18878796 | −0.25714254 | 0.00000E+00<br>0.00000E+00 | 0.00000E+00<br>0.00000E+00 | 0.00000E+00<br>0.00000E+00 | 0.00000E+00<br>0.00000E+00 |
| 6 | 0.18878796 | −0.25714254 | 0.00000E+00<br>0.00000E+00 | 0.00000E+00<br>0.00000E+00 | 0.00000E+00<br>0.00000E+00 | 0.00000E+00<br>0.00000E+00 |
| 7 | 0.16073253 | 0.00000000 | 3.57501E−03<br>0.00000E+00 | −1.78739E−04<br>0.00000E+00 | 0.00000E+00<br>0.00000E+00 | 8.00876E−06<br>0.00000E+00 |
| 8 | −0.10911116 | 0.00000000 | 3.03774E−03<br>0.00000E+00 | −2.29538E−04<br>0.00000E+00 | 0.00000E+00<br>0.00000E+00 | 0.00000E+00<br>0.00000E+00 |
| 9 | −0.01151408 | 0.00000000 | 8.89471E−03<br>0.00000E+00 | 2.56115E−04<br>0.00000E+00 | 0.00000E+00<br>0.00000E+00 | 0.00000E+00<br>0.00000E+00 |
| 10 | −0.26597906 | 0.00000000 | 1.08250E−02<br>0.00000E+00 | 4.49265E−05<br>0.00000E+00 | 0.00000E+00<br>0.00000E+00 | 0.00000E+00<br>0.00000E+00 |
| 11 | −0.23780382 | 0.00000000 | 6.45228E−03<br>0.00000E+00 | −5.85058E−05<br>0.00000E+00 | 0.00000E+00<br>0.00000E+00 | 0.00000E+00<br>0.00000E+00 |
| 12 | −0.06878286 | 0.00000000 | 5.54503E−03<br>0.00000E+00 | −1.86420E−04<br>0.00000E+00 | 0.00000E+00<br>0.00000E+00 | 0.00000E+00<br>0.00000E+00 |

TABLE 6D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 6E

ZOOM PARAMETERS

| *Zoom Parameters | Position: 1 | Position: 2 |
|---|---|---|
| *1 | INF | 1000 mm |
| *2 | −1.4854 mm | −1.6810 mm |

TABLE 7A

| | |
|---|---|
| Focal length (f) | 14.0 mm |
| F-Number | 2.8 to 4.0 |
| Half FOV | 13.0° |
| Total track length TTL | 15.404 |
| Telephoto ratio \|TTL/f\| | 1.100 |
| Design wavelengths | 650 nm, 610 nm, 555 nm, 510 nm, 470 nm |

TABLE 7B

| Element | Surface (S#) | Radius R | Shape | Thickness Or Separation | Material | Refractive Index $N_d$ | Abbe Number $V_d$ |
|---|---|---|---|---|---|---|---|
| Object plane | 0 | INF | FLT | INF *1 | | | |
| Window | 1 | INF | FLT | 0.3000 | | 1.516 | 64.1 |
| | 2 | INF | FLT | 0.15 | | | |
| Aperture Stop | 3 | INF | FLT | 0.0000 | | | |
| L1, Prism | 4 | 5.473 | ASP | 3.7043 | Plastic | 1.535 | 56.3 |
| Decenter (1) | | | | | | | |
| | 5 | INF | FLT | −2.800 | Refl | | |
| Bend (1) | | | | | | | |
| | 6 | INF | FLT | −0.1000 | | | |
| L2 | 7 | −5.578 | ASP | −1.2007 | Plastic | 1.535 | 56.3 |
| | 8 | 5.507 | ASP | −0.1000 | | | |
| L3 | 9 | 4.623 | ASP | −0.6000 | Plastic | 1.636 | 23.9 |
| | 10 | −3.322 | ASP | −1.6922 | | | |
| L4 | 11 | 13.334 | ASP | −0.6000 | Plastic | 1.535 | 56.3 |
| | 12 | −4.709 | ASP | −0.1320 | | | |
| L5 | 13 | −4.257 | ASP | −1.7729 | Plastic | 1.636 | 23.9 |
| | 14 | 11.813 | ASP | −1.3651 | | | |
| IR filter | 15 | INF | FLT | −0.3000 | Glass | 1.516 | 64.1 |
| | 16 | INF | FLT | −1.0691 *2 | | | |
| Image plane | | | | | | | |

TABLE 7C

ASPHERIC CONSTANTS

| S# | Curvature (c) | K | A / E | B / F | C / G | D / H |
|---|---|---|---|---|---|---|
| 4 | 0.18272875 | −0.27892828 | 0.00000E+00 | 0.00000E+00 | 0.00000E+00 | 0.00000E+00 |
|   |   |   | 0.00000E+00 | 0.00000E+00 | 0.00000E+00 | 0.00000E+00 |
| 7 | −0.17926675 | 0.00000000 | 1.25872E−03 | 1.03563E−03 | −7.46783E−05 | 0.00000E+00 |
|   |   |   | 0.00000E+00 | 0.00000E+00 | 0.00000E+00 | 0.00000E+00 |
| 8 | 0.18157533 | 0.00000000 | −5.05715E−03 | 1.68662E−03 | −1.76494E−04 | 0.00000E+00 |
|   |   |   | 0.00000E+00 | 0.00000E+00 | 0.00000E+00 | 0.00000E+00 |
| 9 | 0.21631610 | 0.00000000 | −1.71304E−02 | 3.29521E−03 | −2.38173E−04 | 0.00000E+00 |
|   |   |   | 0.00000E+00 | 0.00000E+00 | 0.00000E+00 | 0.00000E+00 |
| 10 | −0.30102911 | 0.00000000 | −1.34325E−02 | 1.49704E−03 | 5.95490E−05 | 0.00000E+00 |
|   |   |   | 0.00000E+00 | 0.00000E+00 | 0.00000E+00 | 0.00000E+00 |
| 11 | 0.07499727 | 0.00000000 | 3.12338E−03 | 5.98911E−06 | 0.00000E+00 | 0.00000E+00 |
|   |   |   | 0.00000E+00 | 0.00000E+00 | 0.00000E+00 | 0.00000E+00 |
| 12 | −0.21235449 | 0.00000000 | 9.41394E−03 | 2.13253E−04 | 0.00000E+00 | 0.00000E+00 |
|   |   |   | 0.00000E+00 | 0.00000E+00 | 0.00000E+00 | 0.00000E+00 |
| 13 | −0.23491850 | 0.00000000 | 7.26998E−03 | −2.85259E−06 | 0.00000E+00 | 0.00000E+00 |
|   |   |   | 0.00000E+00 | 0.00000E+00 | 0.00000E+00 | 0.00000E+00 |
| 14 | 0.08465321 | 0.00000000 | 2.03721E−03 | 0.00000E+00 | 0.00000E+00 | 0.00000E+00 |
|   |   |   | 0.00000E+00 | 0.00000E+00 | 0.00000E+00 | 0.00000E+00 |

TABLE 7D

DECENTERING CONSTANTS

| Decenter | X | Y | Z | Alpha (degrees) | Beta (degrees) | Gamma (degrees) |
|---|---|---|---|---|---|---|
| D(1) and Bend (1) | 0.000 | 0.000 | 0.000 | 45.000 | 0.000 | 0.000 |

TABLE 7E

ZOOM PARAMETERS

| *Zoom Parameters | F/2.8, Position 1 | F/2.8, Position 2 | F/4, Position 1 | F/4, Position 2 |
|---|---|---|---|---|
| *1 | INF | 1000 mm | INF | 1000 mm |
| *2 | −1.0691 mm | −1.2673 mm | −1.0699 mm | −1.2681 mm |

Example Computing Device

Figure 22:
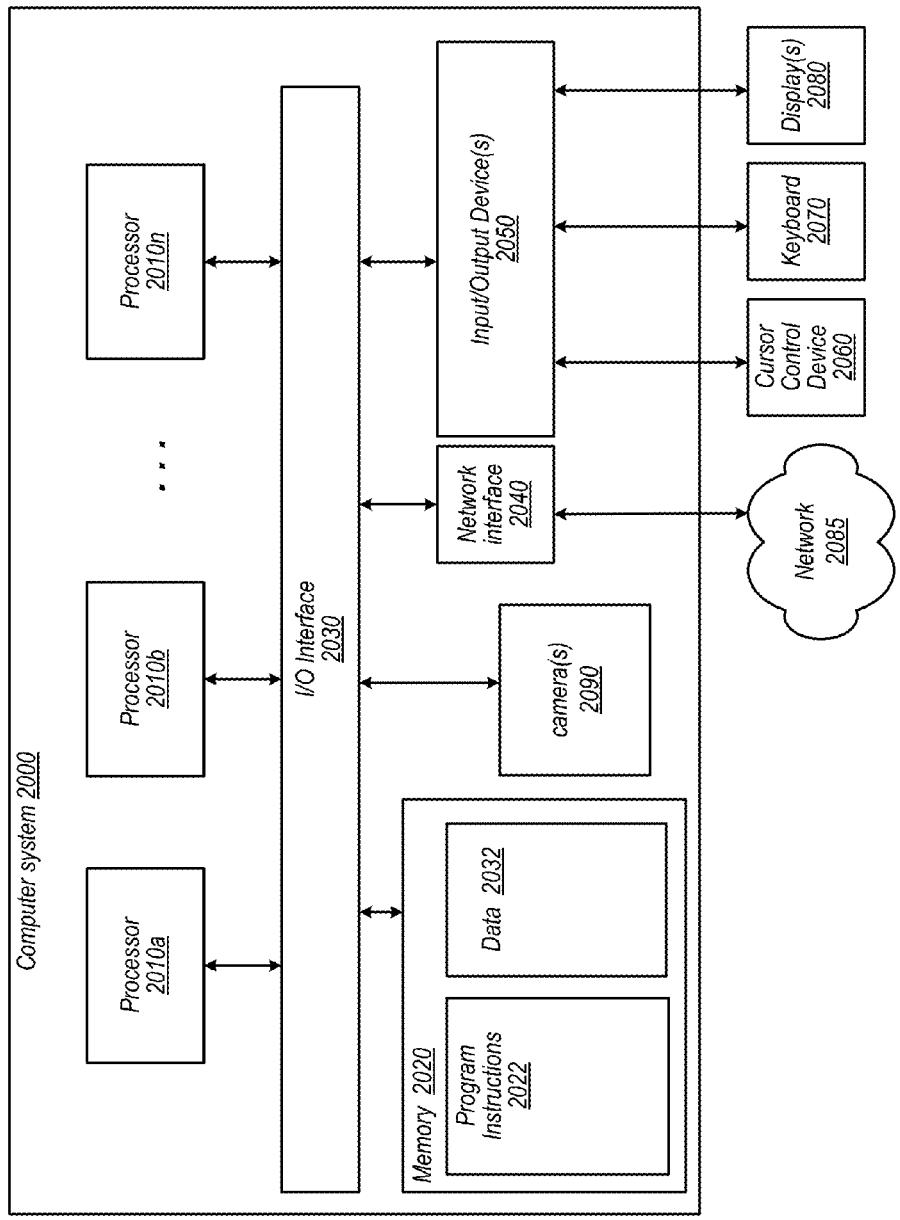
FIG. 22 illustrates an example computer system that may be used in embodiments.

FIG. 22 illustrates an example computing device, referred to as computer system 2000, that may include or host embodiments of the camera as illustrated in FIGS. 1A through 19. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1A through 19, which may also be coupled to I/O interface 2030, or one or more cameras as described above with respect to FIGS. 1A through 19 along with one or more other cameras such as wide-field and/or telephoto cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 22, memory 2020 may include program instructions 2022, which may be processor-executable to implement any element or action to support integrated camera 2090, including but not limited to image processing software and interface software for controlling camera 2090. In at least some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
    a photosensor configured to capture light projected onto a surface of the photosensor; and
    a folded lens system comprising a plurality of optical elements arranged along a first optical axis and a second optical axis of the camera and configured to:
        refract light from an object field located in front of the camera along the first optical axis;

redirect the light on to the second optical axis; and refract the light on the second optical axis to form an image of a scene at an image plane at or near the surface of the photosensor;

wherein the plurality of optical elements includes at least two and at most five refractive lens elements, wherein the refractive lens elements include:

a first refractive lens element on the first optical axis; and at least one and at most four refractive lens elements on the second optical axis; and wherein the folded lens system has effective focal length f and total track length TTL, and wherein telephoto ratio |TTL/f| of the folded lens system is within a range of 0.8 to 1.2.

2. The camera as recited in claim 1, wherein, to redirect the light on to the second optical axis, the folded lens system includes a light path folding element configured to reflect the light from the first optical axis on to the second optical axis.

3. The camera as recited in claim 2, wherein the light path folding element is a prism.

4. The camera as recited in claim 2, wherein the folded lens system further includes an aperture stop located at or in front of the first refractive lens element or between the first refractive lens element and a reflecting surface of the light path folding element.

5. The camera as recited in claim 4, wherein the aperture stop is adjustable to provide a focal ratio within a range of 2.4 to 10.

6. The camera as recited in claim 1, wherein at least one surface of at least one of the refractive lens elements is aspheric.

7. The camera as recited in claim 1, wherein at least one of the refractive lens elements is composed of a first plastic material, and wherein at least one other of the refractive lens elements is composed of a second plastic material with different optical characteristics than the first plastic material.

8. The camera as recited in claim 1, wherein at least one of the plurality of optical elements is configured to translate or move along a respective optical axis to adjust focus of the image of the scene at the photosensor.

9. The camera as recited in claim 1, wherein the photosensor is configured to translate or move along a respective optical axis to adjust focus of the image of the scene at the photosensor.

10. The camera as recited in claim 1, wherein total track length (TTL) of the folded lens system is 16.0 millimeters or less.

11. The camera as recited in claim 1, wherein effective focal length f of the folded lens system is within a range of 8.0 millimeters to 14 millimeters, and wherein focal ratio of the folded lens system is within a range of 2.4 to 10.

12. The camera as recited in claim 1, wherein the plurality of optical elements includes, in order along the first and second optical axes from an object side of the camera to an image side of the camera:

the first refractive lens element on the first optical axis with positive refractive power having a convex object side surface;

a second refractive lens element on the second optical axis;

a third refractive lens element on the second optical axis;

a fourth refractive lens element on the second optical axis; and a fifth refractive lens element on the second optical axis.

13. The camera as recited in claim 12, wherein focal length f1 of the first refractive lens element satisfies the condition 0.5<|f1/f|<0.8, wherein focal length f2 of the second refractive lens element satisfies the condition 0.3<|f2/f|<2.0, wherein focal length f3 of the third refractive lens element satisfies the condition 0.2<|f3/f|<0.6, wherein focal length f4 of the fourth refractive lens element satisfies the condition 0.4<|f4/f|<1.5, and wherein focal length f5 of the fifth refractive lens element satisfies the condition 0.3<|f5/f|<3.0.

14. The camera as recited in claim 12, wherein the plurality of optical elements further includes a prism located between the first refractive lens element and the second refractive lens element and configured to redirect the light from the first optical axis on to the second optical axis.

15. The camera as recited in claim 14, wherein at least one of the first refractive lens element or the second refractive lens element is combined with the prism to form a single optical element.

16. A folded lens system, comprising:

at least two and at most five refractive lens elements arranged along a folded optical axis of the folded lens system, wherein at least one surface of at least one of the refractive lens elements is aspheric;

wherein the folded lens system has effective focal length f and total track length (TTL), and wherein the folded lens system is adjustable to provide a telephoto ratio |TTL/f| within a range of 0.8 to 1.2; and wherein at least one of the refractive lens elements is composed of a first material, and wherein at least one other of the refractive lens elements is composed of a second material with different optical characteristics than the first material.

17. The folded lens system as recited in claim 16, wherein total track length (TTL) of the folded lens system is 16 millimeters or less.

18. The folded lens system as recited in claim 16, wherein f is within a range of 8.0 millimeters to 14 millimeters.

19. The folded lens system as recited in claim 16, wherein the folded lens system includes, in order along the folded optical axis from an object side of the folded lens system to an image side of the folded lens system:

a first refractive lens element on a first optical path of the folded optical axis with positive refractive power having a convex object side surface;

a light path folding element configured to redirect light from the first optical path of the folded optical axis on to a second optical path of the folded optical axis;

a second refractive lens element on the second optical path;

a third refractive lens element on the second optical path;

a fourth refractive lens element on the second optical path; and a fifth refractive lens element on the second optical path.

20. The folded lens system as recited in claim 19, wherein the light path folding element is one of a mirror or a prism.

21. The folded lens system as recited in claim 19, wherein the light path folding element is a prism, and wherein at least one of the first lens element or the second lens element is combined with the prism to form a single optical element.

22. A device, comprising:

one or more processors;

one or more cameras; and a memory comprising program instructions executable by at least one of the one or more processors to control operations of the one or more cameras;

wherein at least one of the one or more cameras is a small form factor camera comprising:
  a photosensor configured to capture light projected onto a surface of the photosensor; and
  a folded lens system configured to:
    refract light from an object field located in front of the camera along a first optical axis;
    redirect the light onto a second optical axis; and
    refract the light on the second optical axis to form an image of a scene at an image plane at or near the surface of the photosensor;
wherein the folded lens system includes at least two and at most five refractive lens elements, wherein the refractive lens elements include:
  a first refractive lens element on the first optical axis; and
  at least one and at most four refractive lens elements on the second optical axis; and
wherein the folded lens system has effective focal length f, wherein total track length (TTL) of the folded lens system is 16.0 millimeters or less, and wherein telephoto ratio |TTL/f| of the folded lens system is within a range of 0.8 to 1.2.

* * * * *